US011975956B1

(12) United States Patent
Ourada

(10) Patent No.: US 11,975,956 B1
(45) Date of Patent: May 7, 2024

(54) SYSTEM AND METHOD FOR A MULTIFUNCTIONAL, INTELLIGENT TELESCOPING BOOM

(71) Applicant: Teletrax Equipment, LLC, Cedar Rapids, IA (US)

(72) Inventor: Tim Ourada, Mascotte, FL (US)

(73) Assignee: Teletrax Equipment, LLC, Cedar Rapids, IA (US)

( * ) Notice: Subject to any disclaimer, the term of this patent is extended or adjusted under 35 U.S.C. 154(b) by 0 days.

(21) Appl. No.: 17/021,267

(22) Filed: Sep. 15, 2020

(51) Int. Cl.
| | | |
|---|---|---|
| *B66F 9/22* | (2006.01) | |
| *A01D 34/00* | (2006.01) | |
| *A01G 23/081* | (2006.01) | |
| *B66F 9/065* | (2006.01) | |
| *B66F 9/075* | (2006.01) | |
| *E01C 19/22* | (2006.01) | |
| *F15B 11/16* | (2006.01) | |

(Continued)

(52) U.S. Cl.
CPC .............. *B66F 9/22* (2013.01); *B66F 9/0655* (2013.01); *B66F 9/075* (2013.01); *B66F 9/0759* (2013.01); *E01C 19/22* (2013.01); *F15B 11/16* (2013.01); *F15B 13/06* (2013.01); *F15B 21/02* (2013.01); *A01D 34/001* (2013.01); *A01G 23/081* (2013.01); *B66F 11/046* (2013.01); *E01C 2301/16* (2013.01); *E02F 3/38* (2013.01); *E02F 3/80* (2013.01); *F15B 2211/20538* (2013.01); *F15B 2211/6652* (2013.01)

(58) Field of Classification Search
CPC ... A01D 34/001; A01G 23/081; B66F 9/0655; B66F 9/075; B66F 9/0759; B66F 9/22; B66F 11/046; F15B 13/08; F15B 2211/20538
See application file for complete search history.

(56) References Cited

U.S. PATENT DOCUMENTS 3,498,411 A * 3/1970 Worden .................. F15B 13/08
182/148
3,664,391 A * 5/1972 Coffey ................. A01G 23/081
144/34.1

(Continued)

*Primary Examiner* — Kenneth Bomberg
*Assistant Examiner* — Matthew Wiblin
(74) *Attorney, Agent, or Firm* — Smith Tempel Blaha LLC; Matthew T. Hoots

(57) ABSTRACT

Disclosed are various embodiments, aspects and features a multifunction, intelligent telescoping boom system. The system may comprise a hydraulic circuit with a continuous, circulating flow through a circuit that includes a hydraulic pump and a configurable valve bank. Valves in the valve bank may be designated to given components of any of a multitude of implement attachments. In this way, the continuous flow of hydraulic fluid through the valve bank may be distributed, via the valves, to the hydraulic components of implements. Hydraulic flow in excess of the demand created by the hydraulic components moves on through the valve bank and returns to the pump to continue the circulation. Also returning to the pump from the valve bank is any hydraulic fluid returning to the valve bank from the hydraulic components. Advantageously, because the system provides a continuous circulation of pressurized hydraulic fluid through the bank, implements with a mix of linear and rotating hydraulic components may be simultaneously powered from the same source of pressurized flow.

10 Claims, 38 Drawing Sheets

(51) Int. Cl.
*F15B 13/06* (2006.01)
*F15B 21/02* (2006.01)
*B66F 11/04* (2006.01)
*E02F 3/38* (2006.01)
*E02F 3/80* (2006.01)

(56) References Cited

U.S. PATENT DOCUMENTS

| | | | |
|---|---|---|---|
| 3,957,165 A | 5/1976 | Smith | |
| 4,194,584 A | 3/1980 | Kress et al. | |
| 4,269,241 A * | 5/1981 | Hickman | A01G 3/08 |
| | | | 144/34.1 |
| 4,632,630 A | 12/1986 | Maki et al. | |
| 4,775,288 A * | 10/1988 | Dimitriu | B66F 9/0655 |
| | | | 414/708 |
| 4,823,852 A | 4/1989 | Langford | |
| 5,113,958 A | 5/1992 | Holden | |
| 5,180,028 A | 1/1993 | Perrenoud, Jr. | |
| 5,632,350 A | 5/1997 | Gauvin | |
| 5,890,557 A | 4/1999 | Glass et al. | |
| 6,024,232 A | 2/2000 | Helgesson | |
| 6,408,906 B1 * | 6/2002 | Moon | A01G 23/091 |
| | | | 144/34.1 |
| 7,195,126 B2 | 3/2007 | Maruyama | |
| 7,270,046 B2 * | 9/2007 | Stephenson | B66F 9/0655 |
| | | | 137/596.16 |
| 7,690,738 B2 | 4/2010 | Wilt | |
| 7,780,197 B2 | 8/2010 | White | |
| 7,874,152 B2 * | 1/2011 | Pfaff | E02F 9/2221 |
| | | | 60/461 |
| 7,963,361 B2 | 6/2011 | Coers et al. | |
| 7,997,369 B2 | 8/2011 | Bacon et al. | |
| 8,430,621 B2 * | 4/2013 | Jantti | A01G 23/081 |
| | | | 414/699 |
| 8,504,251 B2 * | 8/2013 | Murota | B66C 15/04 |
| | | | 701/50 |
| 8,888,122 B2 | 11/2014 | Berry | |
| 9,522,708 B2 | 12/2016 | He et al. | |
| 9,630,664 B2 | 4/2017 | Hellholm et al. | |
| 9,682,736 B1 | 6/2017 | Prickel et al. | |
| 10,161,112 B2 * | 12/2018 | Paull | E02F 9/245 |
| 2010/0044124 A1 | 2/2010 | Radke et al. | |
| 2014/0099212 A1 * | 4/2014 | Dybing | E02F 9/2296 |
| | | | 417/63 |
| 2015/0096955 A1 | 4/2015 | Risen | |
| 2016/0084279 A1 * | 3/2016 | Brahmer | F15B 13/0401 |
| | | | 60/327 |
| 2017/0001846 A1 * | 1/2017 | Paavolainen | B66F 9/24 |
| 2017/0127624 A1 * | 5/2017 | Olson | A01G 23/083 |
| 2017/0217745 A1 | 8/2017 | Artoni et al. | |
| 2017/0291802 A1 | 10/2017 | Hao et al. | |
| 2018/0037278 A1 | 2/2018 | Cox | |
| 2018/0148308 A1 * | 5/2018 | Yin | B66F 17/00 |

* cited by examiner

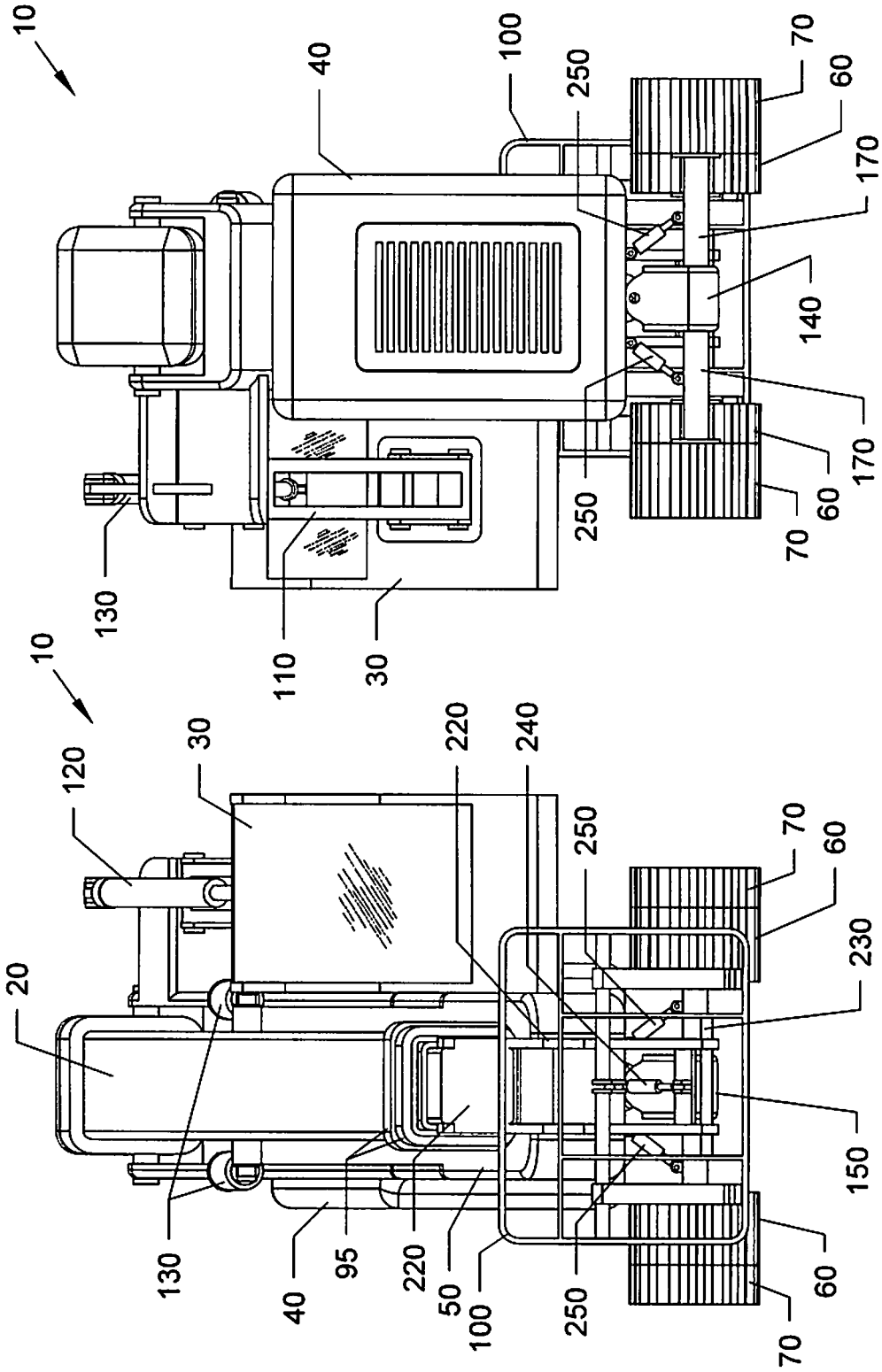

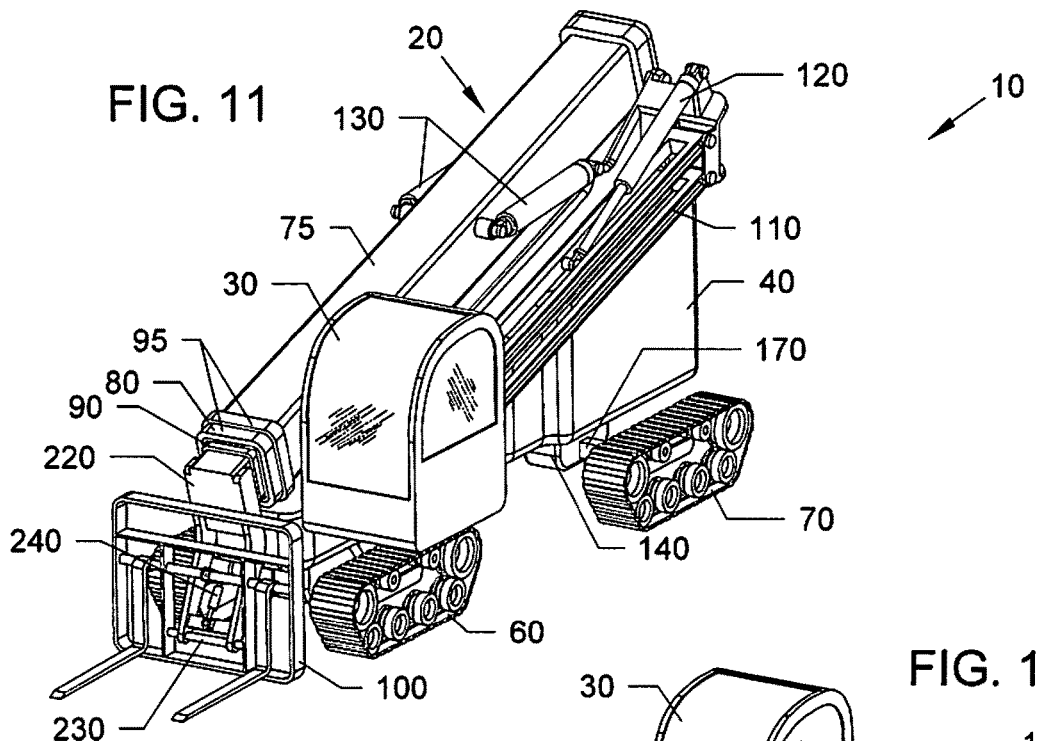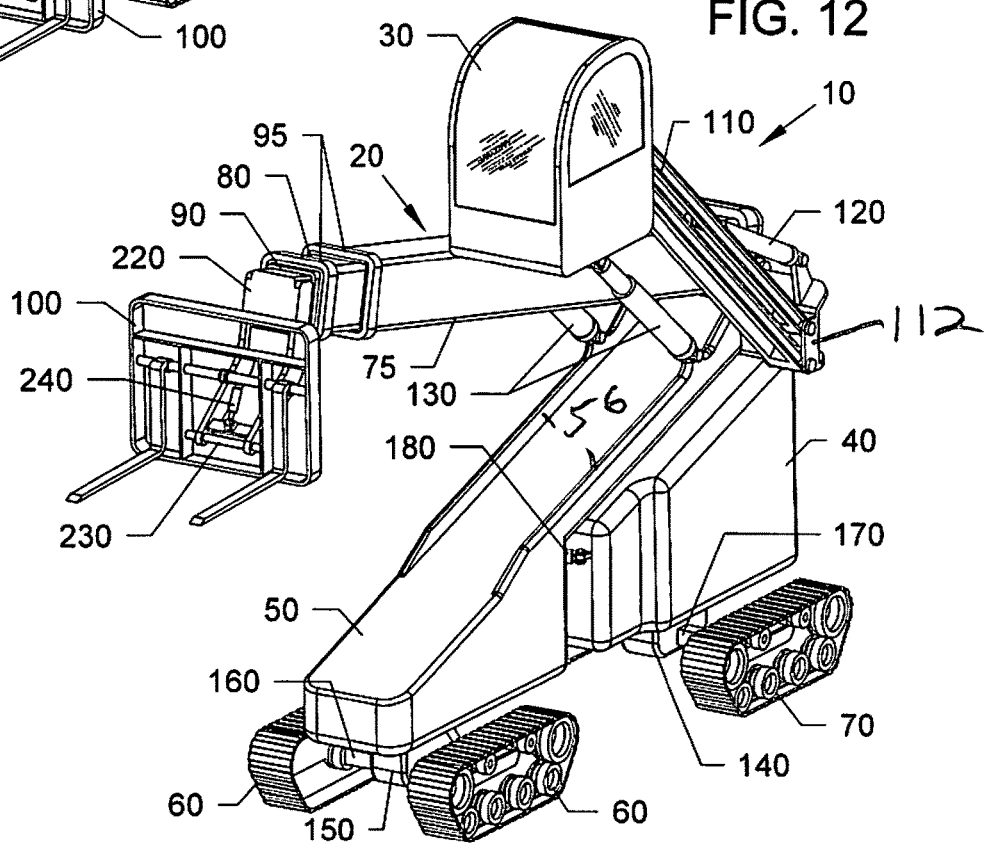

SYSTEM AND METHOD FOR A MULTIFUNCTIONAL, INTELLIGENT TELESCOPING BOOM

CROSS-REFERENCE TO RELATED APPLICATIONS

This application is related to the U.S. non-provisional application entitled "All Terrain Versatile Telescopic Fork Lift," filed on Mar. 14, 2018 and assigned application Ser. No. 15/920,617 and the U.S. non-provisional application entitled "Oscillating Track System," filed on Jun. 4, 2020 and assigned application Ser. No. 16/893,337. The entire contents of both applications are incorporated by reference.

BACKGROUND

The present solutions relate to heavy equipment, such as a telehandler, commonly used on outdoor construction sites and, more particularly, to heavy construction equipment with telescoping booms that may benefit from multifunctional utility. Heavy equipment with telescoping booms operable to accommodate multiple implements may provide equipment operators with versatility, cost effectiveness, and efficiency presently lacking in the prior art.

When a construction site requires the services of multiple different types of heavy machinery, the state of the art dictates that a construction plan and budget anticipate for all the various types of heavy machinery needed and timing of their use. Therefore, it may be advantageous for a single piece of heavy equipment to offer functional versatility that works to simplify construction planning, reduce construction costs, and accommodate changing needs on-site. And so, there is a need in the art for heavy equipment having a multifunctional, intelligent telescoping boom configured to accommodate multiple different implements.

BRIEF SUMMARY

Various embodiments, aspects and features of the present invention comprise a multifunction, intelligent telescoping boom system. The system may comprise a hydraulic circuit with a continuous, circulating flow through a circuit that includes a hydraulic pump and a configurable valve bank. Valves in the valve bank may be designated to given components of any of a multitude of implement attachments. In this way, the continuous flow of hydraulic fluid through the valve bank may be distributed, via the valves, to the hydraulic components of implements. Hydraulic flow in excess of the demand created by the hydraulic components moves on through the valve bank and returns to the pump to continue the circulation. Also returning to the pump from the valve bank is any hydraulic fluid returning to the valve bank from the hydraulic components. Advantageously, because the system provides a continuous circulation of pressurized hydraulic fluid through the bank, implements with a mix of linear and rotating hydraulic components may be simultaneously powered from the same source of pressurized flow. Moreover, different implements with different combinations of linear and rotating hydraulic components may be accommodated by the system, giving an operator of a system according to the solution flexibility to drive any number of different implements regardless of the hydraulic needs/demands of the different implements.

An exemplary embodiment of the solution comprises a telescoping boom with a base stage mechanically connected to a piece of powered heavy equipment and an end stage (and one or more middle stages). The end stage is configured to mechanically receive a plurality of implements such as a backhoe, a frontend loader, an excavator, a skidsteer, a feller buncher, a screed, a laser grader, a bucket, a mower, a forklift, a man basket, etc. A valve bank is associated with the end stage and is made up of a plurality of hydraulic valves. Any one or more of the hydraulic valves may include quick disconnect aspects for ease of disengaging and re-engaging hydraulic hoses. The hydraulic valves may be a combination of multiport valves and one or more of the valves may be operable to modulate anywhere between a fully open state and a fully closed state. Some of the hydraulic valves may be "on/off" valves configured to either be fully open or fully closed.

A hydraulic circuit providing a motive hydraulic force to the system may include a hydraulic pump and the valve bank, wherein a hydraulic supply line connects an output of the hydraulic pump with an input of the valve bank and a hydraulic return line connects an output of the valve bank with an input of the hydraulic pump. The hydraulic pump may be a variable speed positive displacement ("PD") pump so that the pressure and flow rate of the hydraulic flow generated by the pump may be varied in response to demand by the hydraulic components of the implement. In this way, at least a portion of a pressurized hydraulic flow entering the valve bank from the hydraulic pump via the hydraulic supply line is distributed to and through one or more of the plurality of hydraulic valves before returning to the hydraulic pump via the hydraulic return line.

The system may further include an implement integration module operable to designate one or more of the plurality of valves for controlling hydraulic flow to one or more hydraulically driven components of the given implement (such as hydraulic cylinders and hydraulic rotating motors). The implement integration module may include, among other microprocessor components understood in the art, a computer chip and a memory component and a modem. The module may be in electrical communication with the plurality of valves and with one or more electrical components associated with the given implement.

The exemplary system may also include a power unit controller (usually in the operator cab of the heavy equipment) that includes one or more operator-controlled actuators and one or more operator-viewable monitors (joystick, levers, switches, gauges, monitors, etc.) that is in communication with the implement integration module so that the module may associate the one or more operator-controlled actuators and the one or more operator-viewable monitors with the designated one or more plurality of valves for controlling hydraulic flow to one or more hydraulically driven components of the given implement and with the one or more electrical components associated with the given implement (such as, but not limited to, a light, a pressure sensor, an infrared sensor, a laser sensor, a temperature sensor, a strain gauge, a weight scale, an electrical motor, a vibrator, an electrical actuator, and a solenoid). The exemplary system may also include an implement controller that is physically local to the given implement and that includes similar functionality as the power unit controller. The implement integration module may associate the one or more operator-controlled actuators and the one or more operator-viewable monitors with the designated one or more plurality of valves and with the one or more electrical components based on implement-specific instructions stored in the module.

BRIEF DESCRIPTION OF THE SEVERAL VIEWS OF THE DRAWING

In the Figures, like reference numerals refer to like parts throughout the various views unless otherwise indicated. For reference numerals with letter character designations such as "110A" or "110B", the letter character designations may differentiate two like parts or elements present in the same Figure. Letter character designations for reference numerals may be omitted when it is intended that a reference numeral to encompass all parts having the same reference numeral in all Figures.

FIG. 9 is a front view of the vehicle of FIG. 5;

FIG. 10 is a rear view of the vehicle of FIG. 5;

FIG. 11 is a front right perspective view of the vehicle of FIG. 1 with boom and articulating cab fully down;

FIG. 12 is a front right perspective view of the vehicle of FIG. 12 with boom raised slightly and cab raised above boom for operator visibility;

DESCRIPTION

Figure 1:
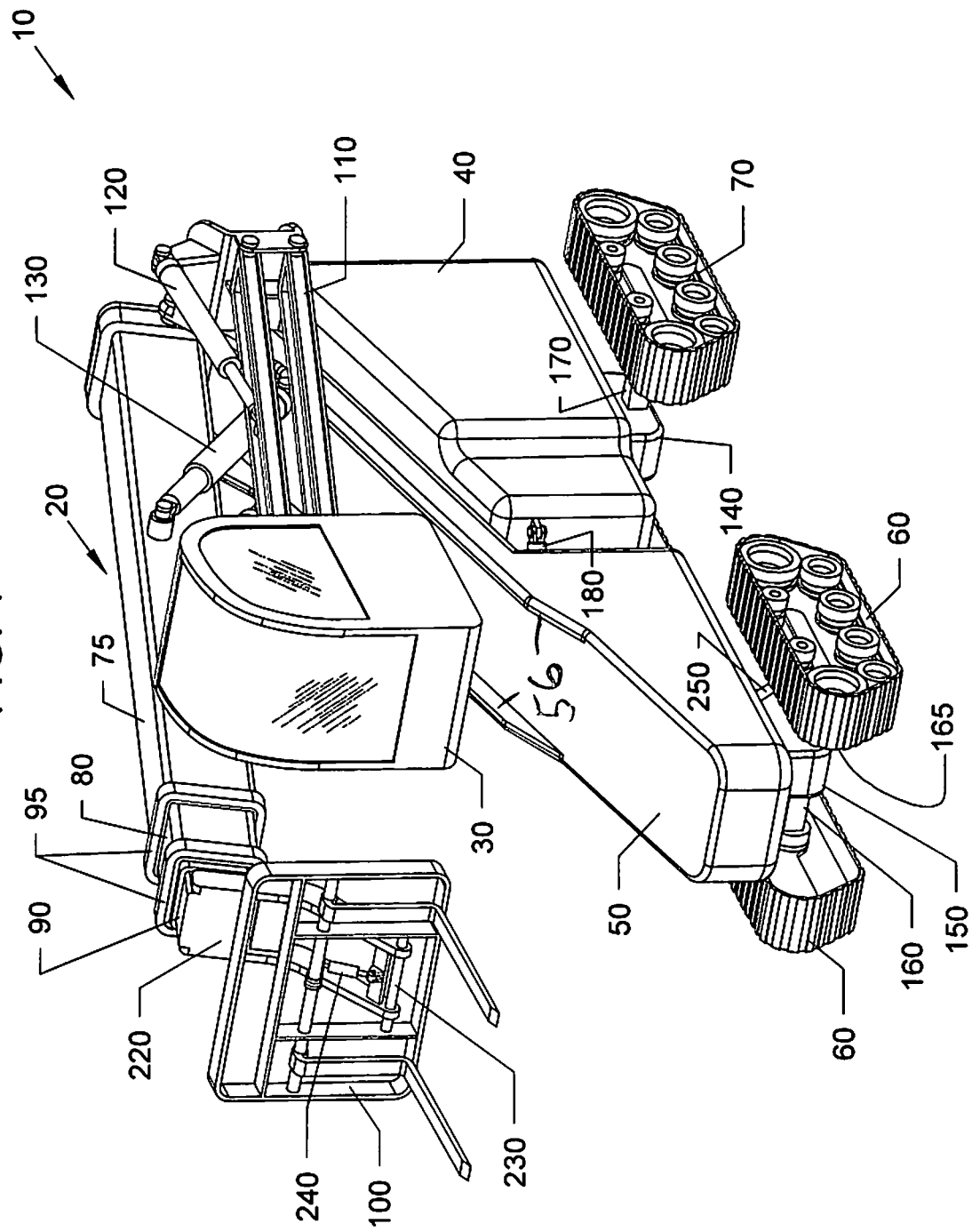
FIG. 1 is a front right perspective view of the all terrain versatile telescopic forklift vehicle with articulating cab and boom slightly raised with boom retracted.

The Figures and the related description are offered for illustrative purposes and collectively depict aspects and features of an exemplary embodiment of a unique and novel all-terrain telehandler particularly suited for payload handling on construction sites. Among other features, embodiments of the telehandler depicted and described herein may include one or more oscillating track systems comprising oscillating track lock subsystems advantageously configured to switch the oscillating track system from a free oscillating state to a locked position state, and vice versa. Details and advantages of the solution for an oscillating track system will become apparent upon review of the figures and description that follows. Notably, although an exemplary embodiment of the solution for an oscillating track system is shown and described herein within the context of a novel telehandler, it will be understood that the disclosed solution for an oscillating track system, and its variants, are not limited in application for use with telehandlers and, as such, it is envisioned that embodiments of the solution may be leveraged on any equipment that may benefit from a drivetrain that includes an oscillating track system.

In this description, the terms "database" and "module" and "modem" are intended to refer generally to a computer-related entity, either hardware, firmware, a combination of hardware and software, software, or software in execution, unless specifically limited to a certain computer-related entity. For example, a module may be, but is not limited to being, a process running on a processor, a processor, an object, an executable, a thread of execution, a program, and/or a computer. By way of illustration, both an application running on a computing device and the computing device may be a module. One or more modules, or components comprised within a module, may reside within a process and/or thread of execution, and a module may be localized on one computer or chip and/or distributed between two or more computers or chips. In addition, these modules may execute from various computer readable media having various data structures stored thereon. The modules may communicate by way of local and/or remote processes such as in accordance with a signal having one or more data packets (e.g., data from one component interacting with another component in a local system, distributed system, and/or across a network such as the Internet with other systems by way of the signal).

In this description, the term "processor" is used generally to refer to a "central processing unit ("CPU")," "digital signal processor ("DSP")," "graphical processing unit ("GPU")," or "chip," as would be understood by one of ordinary skill in the art of microprocessing. Moreover, a CPU, DSP, GPU or chip may be comprised of one or more distinct processing components generally referred to in the art as "core(s)."

In this description, label 10 refers to an all-terrain vehicle with articulating tracks, bodies, boom, and cab. Label 20 refers to a telescoping boom, label 30 refers to a cab that raises and lowers on hydraulic power, and label 40 refers to a rear body/engine compartment. 50 refers to a front body/superstructure that provides the foundation of the front tracks, the articulating boom, and the articulating cab, with the superstructure connected to the engine compartment with a hinge bracket. Label 54 is an upper portion bracket, label 56 are raised sides, and label 58 refers to the upper end brackets of the superstructure.

In this description, label 60 refers to a front oscillating track assembly. As will become more apparent from the disclosure, front oscillating track assemblies may be configured to rotate about an axle center-line and lock in a given position such that the assembly is unable to oscillate. Similarly, label 70 refers to a rear oscillating track assembly. Rear oscillating track assemblies may be configured to rotate about an axle center-line but inoperable to lock into a non-oscillating state.

In this description, label 74 refers to base boom section, label 75 refers to a large boom section, label 80 a middle boom section, and label 90 a small boom section. Label 95 refers to boom stops, label 100 a fork assembly, and label 110 a cab linkage that raises and lowers the cab while keeping it level relative to the superstructure by means of a hydraulic cylinder. Label 112 refers to a lower hinged bracket, label 118 an upper hinged bracket, and label 120 a hydraulic cylinder operable to articulate the cab. Label 130 refers to hydraulic cylinders for raising and lowering the boom.

Label 140 refers to a rear track bracket that is attached to the bottom of the engine compartment via a hinge pin. Advantageously, the rear track bracket 140 enables the rear oscillating track subassemblies and transmission to rotate in a plane perpendicular to the bottom of the engine compartment, thereby keeping the telehandler level on uneven ground. This rotation is free to follow the angle of the superstructure as it adjusts to ground level conditions. Similarly, label 150 refers to the front track bracket that is attached to the bottom of the superstructure in the same why as the rear transmission. Additionally, there may be two hydraulic cylinders linking the transmission to the superstructure. These cylinders may be controlled by the operator to keep the superstructure relatively level regardless of ground conditions. As previously mentioned, the engine compartment may be free to self-adjust and follow the orientation of the superstructure.

In this description, label 155 refers to a bracket hinge pin. Label 160 refers to a front left axle housing. The front oscillating track subassembly transmission may house two outer axle housings. Each housing may contain one extendable inner axle, one for the left axle and one for the right axle. These individual axles may telescope, thereby enabling the oscillating track subassemblies to move away from the superstructure giving them a wider footprint and adding stability to the superstructure. Label 163 refers to a front left extendable inner axle that telescopes out of an axle housing to place the oscillating track subassembly further away from the superstructure for increased stability.

In this description, label 165 refers to a front right axle housing and label 167 refers to a front right extendable inner axle. Label 170 refers to a rear axle. The rear track bracket may house one non-extendable axle for each oscillating track subassembly.

In this description, label 180 refers to a hydraulic cylinder that connects the superstructure and the engine compartment allowing the operator to control the angle orientation of one relative to the other. Label 190 refers to the superstructure hinge bracket that connects to engine compartment hinge bracket with a pivot pin so that the two can articulate about the pin. Label 200 refers to the engine compartment hinge bracket and label 210 refers to a hinge bracket pivot pin. Label refers to a fork bracket that is attached to the end of the small boom section 90. This fork bracket 220 also attaches to the fork assembly via a hinge pin so that the fork bracket may articulate forward and backward by way of a hydraulic cylinder controlled by the operator.

In this description, label 230 refers to a fork assembly hinge pin and label 240 refers to a fork assembly hydraulic cylinder. Label 250 refers to front track transmission hydraulic cylinders operable to orient the front transmission to the superstructure by about the transmission pivot pin. They may be controlled by the operator.

In this description, label 260 refers to ground that is relatively uneven or not level while label 270 refers to ground that is relatively level. Label 280 refers to ground obstacles such as, but not limited to, a log or rock.

Figure 2:
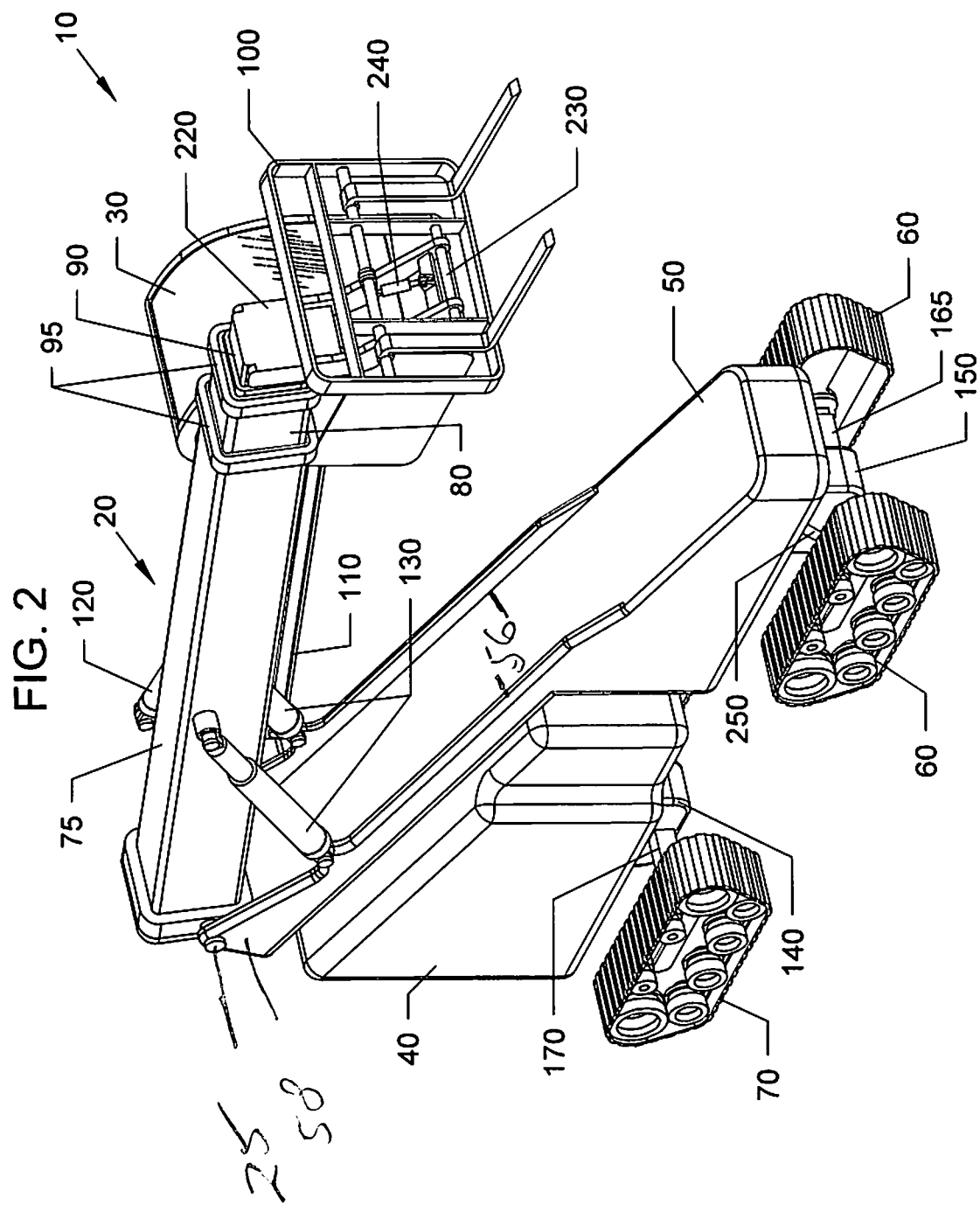
FIG. 2 is a front left perspective view of the vehicle of FIG. 1.
Figure 3:
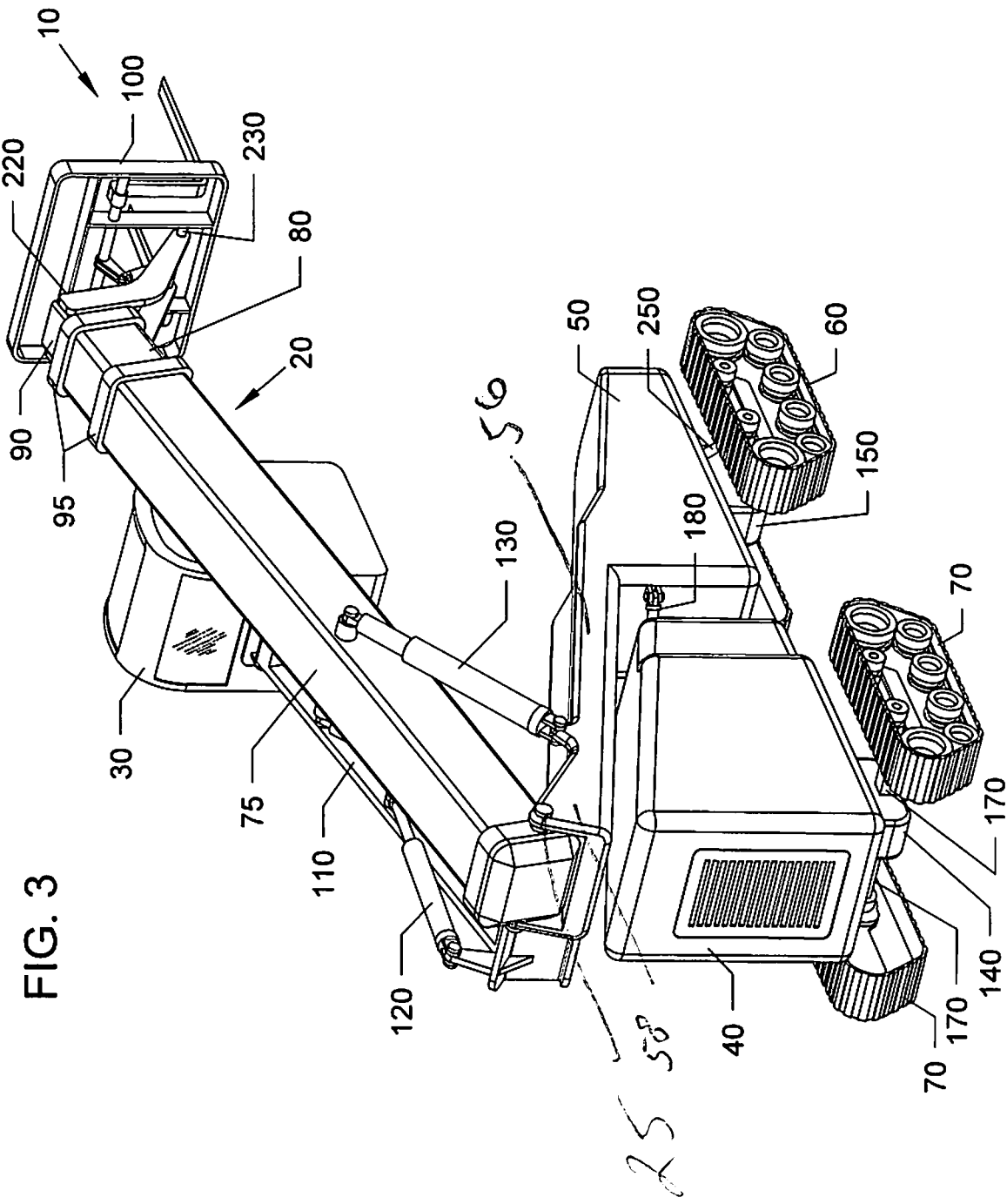
FIG. 3 is a rear right perspective view of the vehicle of FIG. 1.
Figure 4:
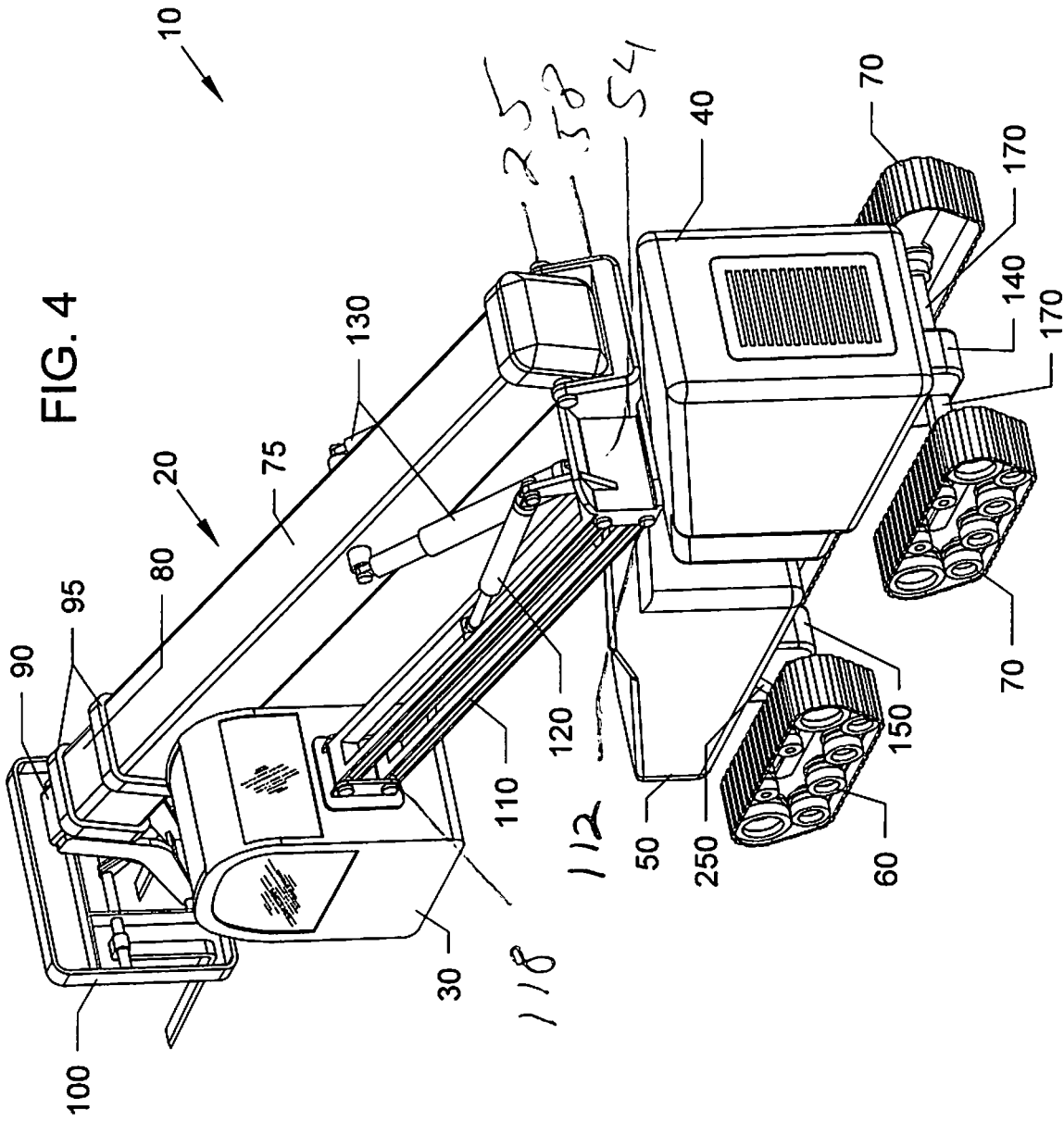
FIG. 4 is a rear left perspective view of the vehicle of FIG. 1.
Figure 5:
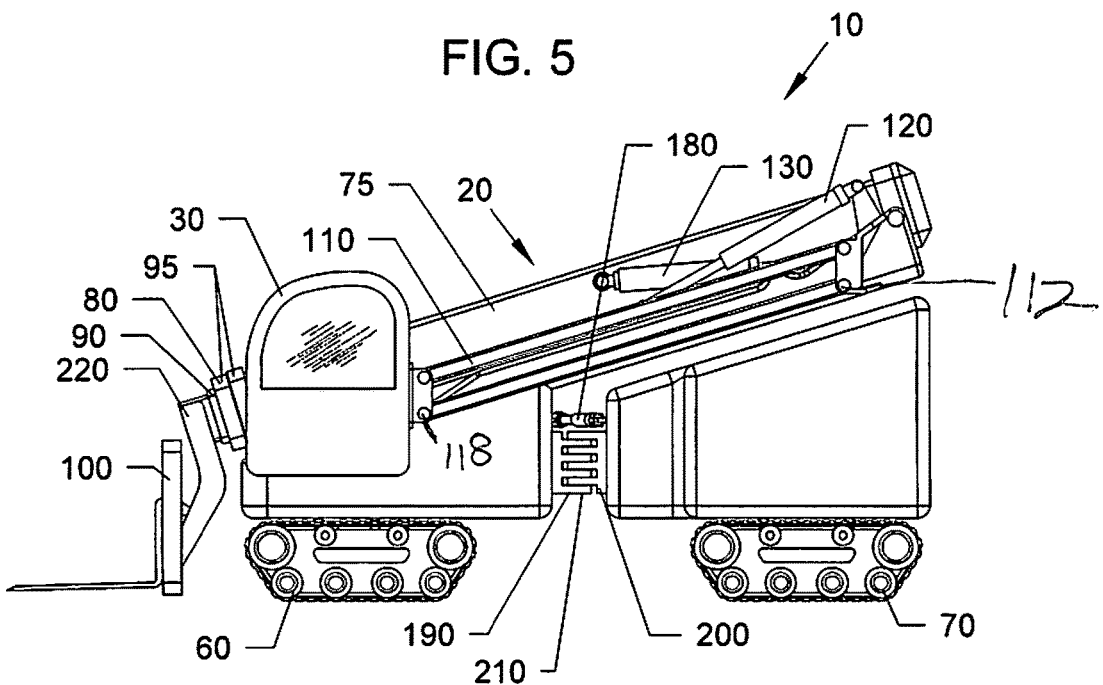
FIG. 5 is a right side view of the vehicle of FIG. 1 with cab and boom in down position.
Figure 6:
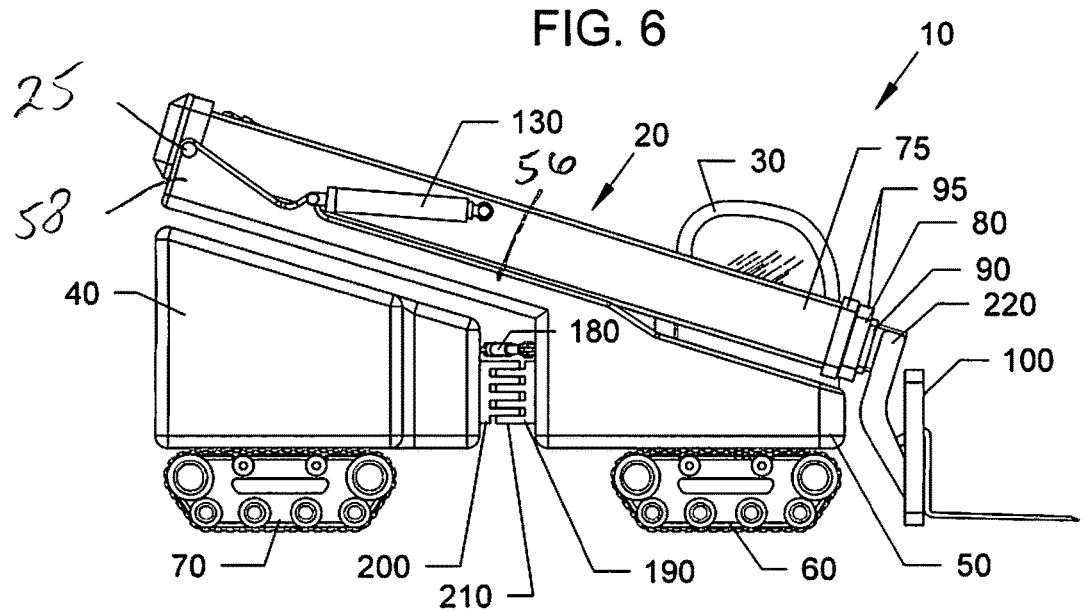
FIG. 6 is a left side view of the vehicle of FIG. 5.
Figure 7:
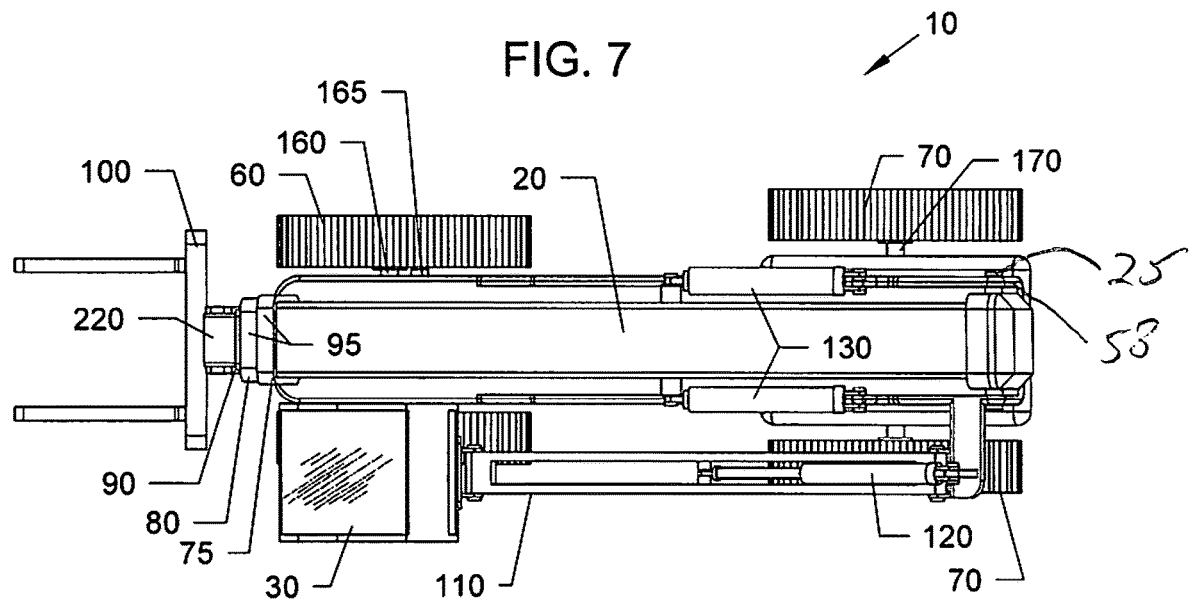
FIG. 7 is a top view of the vehicle of FIG. 5.
Figure 8:
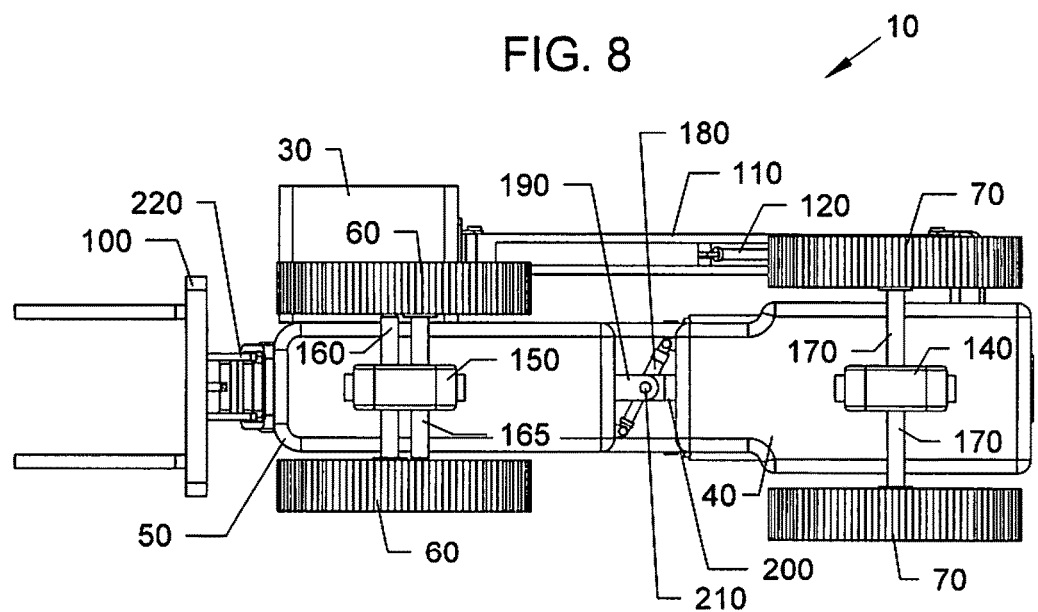
FIG. 8 is a bottom view of the vehicle of FIG. 5.

Referring now to the figures, FIG. 1 is a front right perspective view of the novel all terrain versatile telescopic forklift vehicle 10 with articulating cab 30 and telescoping boom 20 slightly raised with telescopic boom 20 in a retracted position. FIG. 2 is a front left perspective view of the vehicle 10 of FIG. 1. FIG. 3 is a rear right perspective view of the vehicle 10 of FIG. 1. FIG. 4 is a rear left perspective view of the vehicle 10 of FIG. 1. FIG. 5 is a right side view of the vehicle 10 of FIG. 1 with cab 30 and telescoping boom 20 in a down position. FIG. 6 is a left side view of the vehicle 10 of FIG. 5. FIG. 7 is a top view of the vehicle 10 of FIG. 5. FIG. 8 is a bottom view of the vehicle 10 of FIG. 5. FIG. 9 is a front view of the vehicle 10 of FIG. 5.

Figure 13:
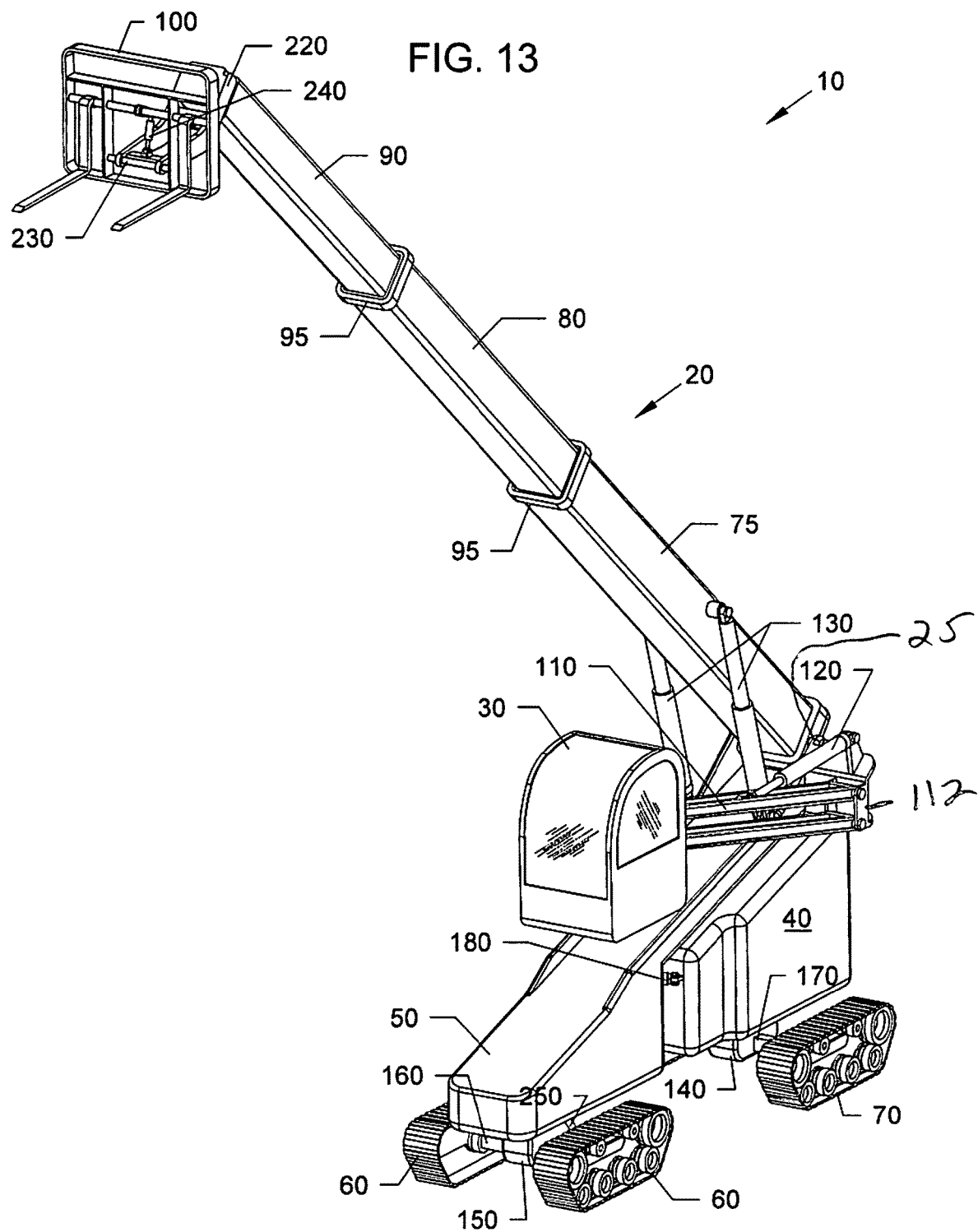
FIG. 13 is a front right perspective view of the vehicle of FIG. 12 with boom full raised and extended.
Figure 14:
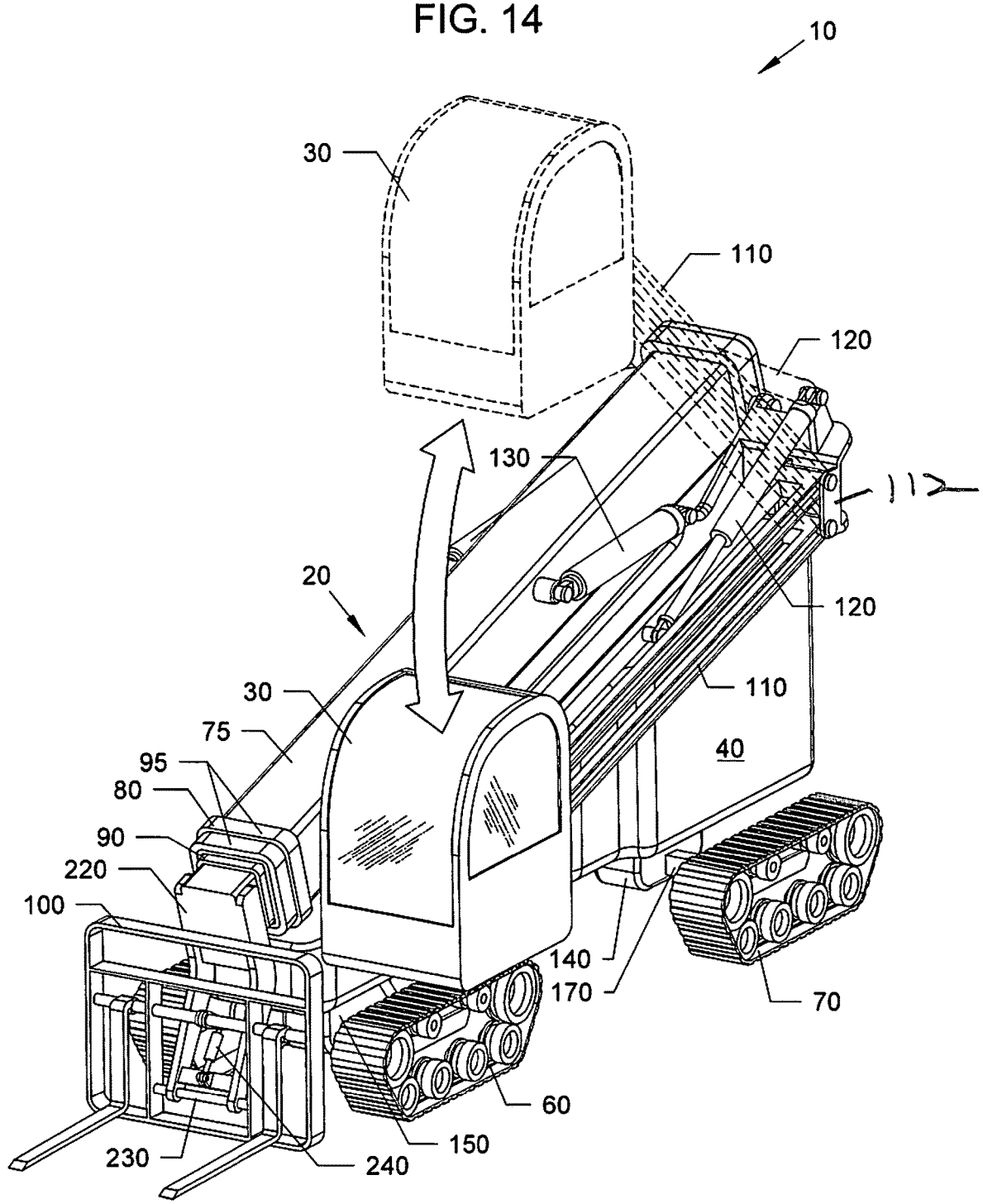
FIG. 14 is a front right perspective view of the vehicle of FIG. 11 showing range of motion of articulating cab.

FIG. 10 is a rear view of the vehicle 10 of FIG. 5. FIG. 11 is a front right perspective view of the vehicle 10 of FIG. 1 with the telescoping boom 20 and articulating cab 30 fully down. FIG. 12 is a front right perspective view of the vehicle 10 of FIG. 12 with the telescoping boom 20 raised slightly and the cab 30 raised above the telescoping boom 20 for operator visibility. FIG. 13 is a front right perspective view of the vehicle 10 of FIG. 12 with the telescoping boom 20 full raised and extended. And, FIG. 14 is a front right perspective view of the vehicle 10 of FIG. 11 showing range of motion of the articulating raiseable and lowerable cab 30.

Referring to FIGS. 1-14, the all-terrain versatile vehicle 10, shown in the form of a telehandler, may be comprised of two body parts, which includes a rear body 40 and front body 40. The rear body 40 may include an engine compartment 40, which houses the vehicle engine and is the foundation of a rear oscillating track assembly 70. The rear oscillating track assembly 70 may include a right track attached on a lower rear right side of the rear body 40 and a left track attached on a lower rear left side of the rear body 40. Similarly, the front oscillating track assembly 60 may include a right front track attached on a lower front right side of the front body 50 and a left front track attached on a lower front left side of the front body 50. More detail regarding the oscillating track assemblies 60, 70 will be provided in FIGS. 29-35 and the related description.

The front body 50 with the superstructure may be attached to the rear body 40 with engine compartment, by superstructure hinge bracket 190 which is attached to an engine compartment engine bracket 200 by a hinge bracket pivot pin 210.

Referring to FIGS. 1-13, the telescoping boom 20 may include a large boom section 75 with a middle boom section 80 that can telescope in and out of, and a small boom section 90 that can telescope in and out of the middle boom section 80. Stops 95 may limit the fully retracted positions of the middle boom section 80 within the large boom section 75, and the small boom section within the middle boom section 80. Similar internal stops, not shown, may also limit the fully extended positions of the middle boom section 80 relative to the large boom section 75, and the small boom section 90 relative to middle boom section 80.

The bottom of the large boom section 75 can include a boom hinge pin 25 which rotatably attaches the telescoping boom 20 to an upper end superstructure brackets 58, which together function as a boom hinge for allowing the telescoping boom 20 to pivot up and down relative to the upper end brackets 58 of the superstructure 50. A pair of hydraulic cylinders 130 (such as but not limited to those used in U.S. Pat. Nos.: 6,024,232 to Helgesson and 4,632,630 to Maki et al., which are both incorporated by reference in their entirety) can be used. Each of the hydraulic cylinders 130 may have outer pivotal ends that can be attached to both the large boom section 75 and the upper end superstructure brackets 58, where the telescoping hydraulic cylinders 130 can raise and lower the telescoping boom 20.

The superstructure 50 can have a side view that appears to have a generally triangular configuration, and the superstructure 50 can include an upper ramped top with raised sides 56 for capturing the telescoping boom 20 when in its most lowered position.

The outer end of small boom section 90 of the telescoping boom 20 can include a fork assembly 100 with a fork bracket 220 attached thereon, by a fork assembly hinge pin 230, where a fork assembly hydraulic cylinder 240 (such as but not limited to those described in U.S. Pat. No. 4,632,630 to Maki et al., which is incorporated by reference in its entirety) can adjust the angle of the fork bracket 220 relative to the telescoping boom 20.

Referring to FIGS. 1-14, the vehicle 10 can include a cab 30 that can be raised and lowered from an upper hinged bracket 118 attached to an upper end of parallel cab linkage arms 110 which are attached to a lower hinged bracket 112 which is attached to an upper portion bracket 54 of the superstructure 50. A hydraulic cylinder 120, such as those described in U.S. Pat. No. 5,890,557 to Glass et al., which is incorporated by reference in its entirety, can be used to control the raising and lowering of the cab 30.

Figure 15:
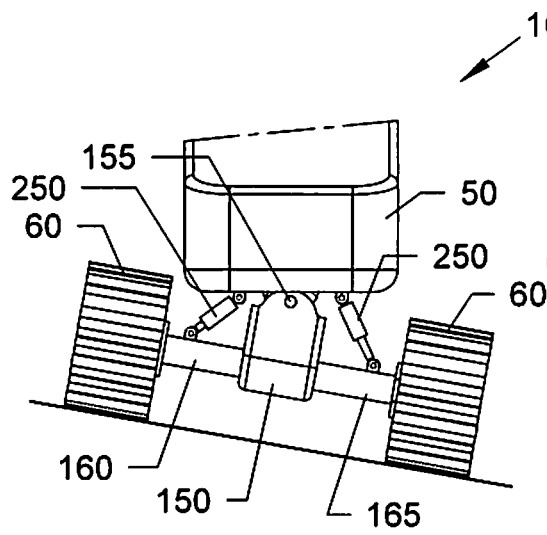
FIG. 15 is a lower front view of the front tracks, and front axle of the vehicle of the preceding figures showing how the axle is able to adjust, via pivot pin and hydraulic cylinders controlled by the operator, to ground level changes and keep the vehicle front and rear body and superstructure level.
Figure 16:
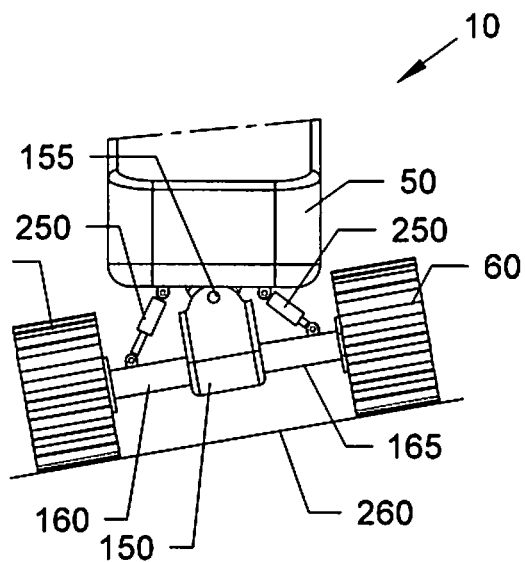
FIG. 16 is another view of FIG. 15 with the axle tilted in an opposite orientation.

FIG. 15 is a lower front view of the front track assembly 60 of the vehicle 10 which includes a front left track attached to a middle front track bracket 150 by a front left axle housing 160, and a front right track attached to the middle front track bracket by a front right axle 165, with the front track assembly tilted down to the right. FIG. 16 is another view of FIG. 15 with the front track assembly 60 tilted in an opposite orientation.

The axle housings 160, 165 are able to adjust, via bracket pivot pin 155 which attaches the bottom of the front body 50 to the middle front bracket 50. The front track assembly 60 is able to be tiltable up and down based on hydraulic cylinders 250 (such as those described in U.S. Pat. No. 5,180,028 to Perrenoud, Jr., which is incorporated by reference in it's entirety), controlled by an operator in the cab 30, to ground level changes and keep the vehicle front body 50 and rear body 40 and superstructure level. Alternatively, it is envisioned that hydraulic cylinders 250 may be automatically actuated in response to directions received from a controller. The controller may generate and transmit such actuation directions to the hydraulic cylinders 250 in view of electronic signals generated by level sensors (such as, for example, gyroscopic sensors). In such embodiments, it is an advantage that the front body 50 and/or rear body 40 may be kept level without need for manual operator input.

Figure 17:
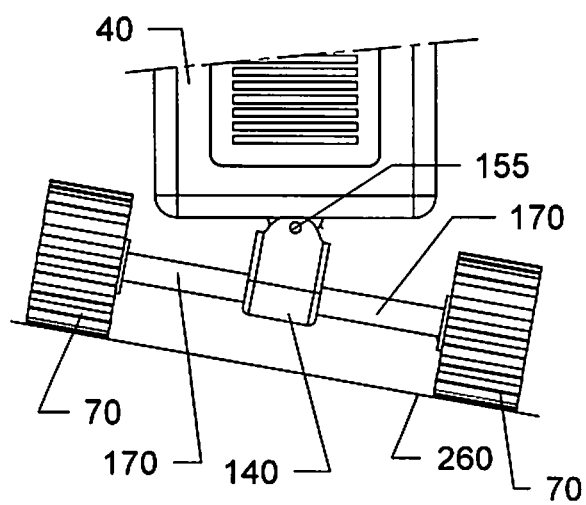
FIG. 17 is a lower rear view of the vehicle of the preceding figures of engine compartment, rear tracks, and rear axle showing how the axle is able to adjust to ground level changes via pivot pin. The engine compartment leveling feature does not have to be hydraulically powered and is free-pivoting and follows the lead of the superstructure.
Figure 18:
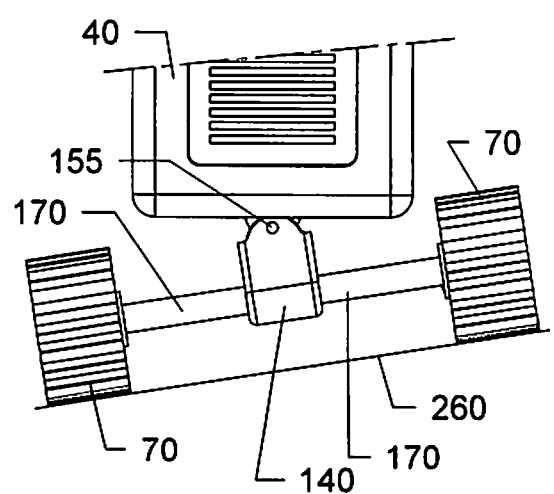
FIG. 18 is another view of FIG. 17 with the axle tilted an opposite orientation.

FIG. 17 is a lower rear view of the vehicle 10 of the preceding figures of engine compartment (rear body) 40, rear track assembly 70, and rear axle 170 showing how the axle 170 is able to adjust to ground level changes via pivot pin 155 that attached a bottom of the rear body 40 to a middle rear bracket 140. The engine compartment (rear body 40) leveling feature is not hydraulically powered and is free-pivoting and follows the lead of the superstructure (front body 50. FIG. 18 is another view of FIG. 17 with the axle 170 tilted an opposite orientation.

Figure 19:
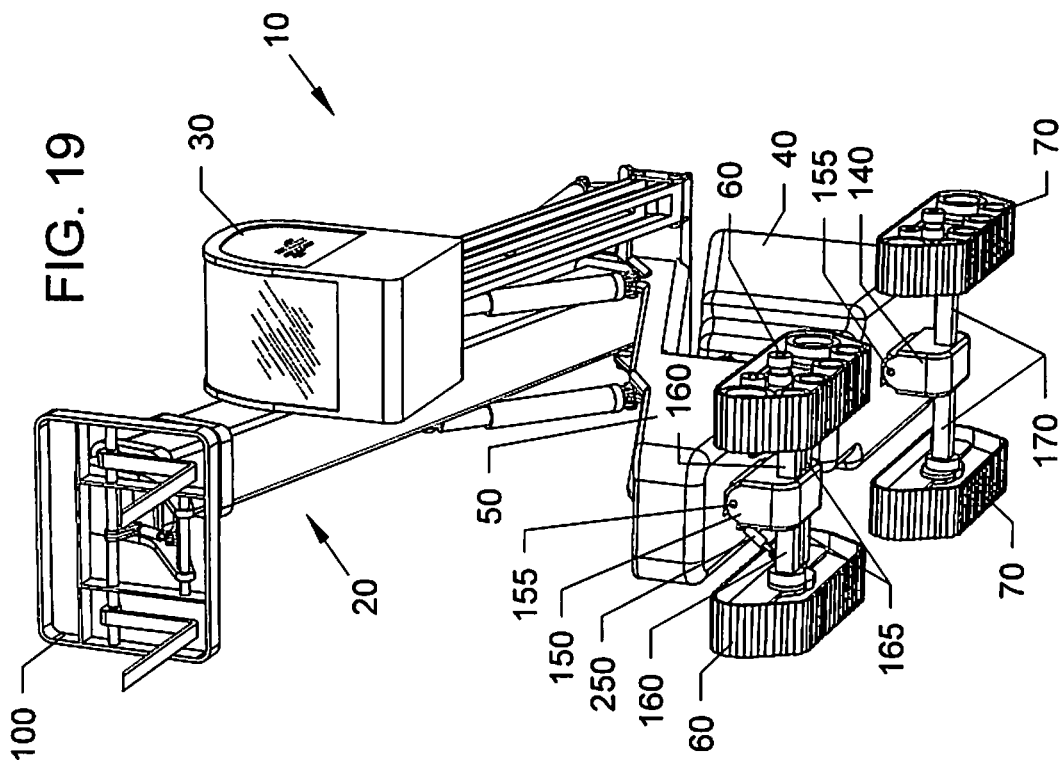
FIG. 19 is a bottom right perspective view of the vehicle of the preceding figures showing the axle's and tracks parallel to one another and parallel to the superstructure.

FIG. 19 is a bottom right perspective view of the vehicle 10 of the preceding figures showing the axle's 160, 165 and 170 and track assemblies 60, 70 parallel to one another and parallel to the superstructure (front body) 50.

Figure 20:
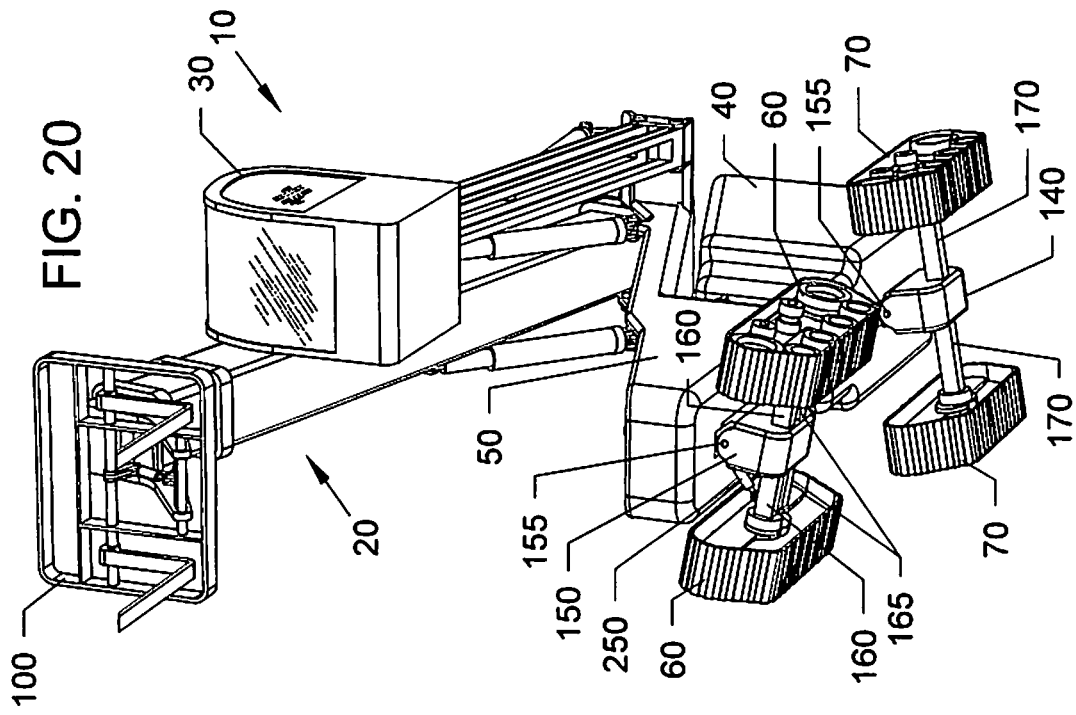
FIG. 20 is another perspective view of FIG. 19, showing how the axles and tracks rotate about the axle hinge pins.

FIG. 20 is another perspective view of FIG. 19 showing how the front track assembly 60 with axles 160, 165 and pivoting bracket 150 and rear track assembly 70 with rear axle 170 and pivoting bracket 140 rotate about the axle hinge pins 155.

Figure 21:
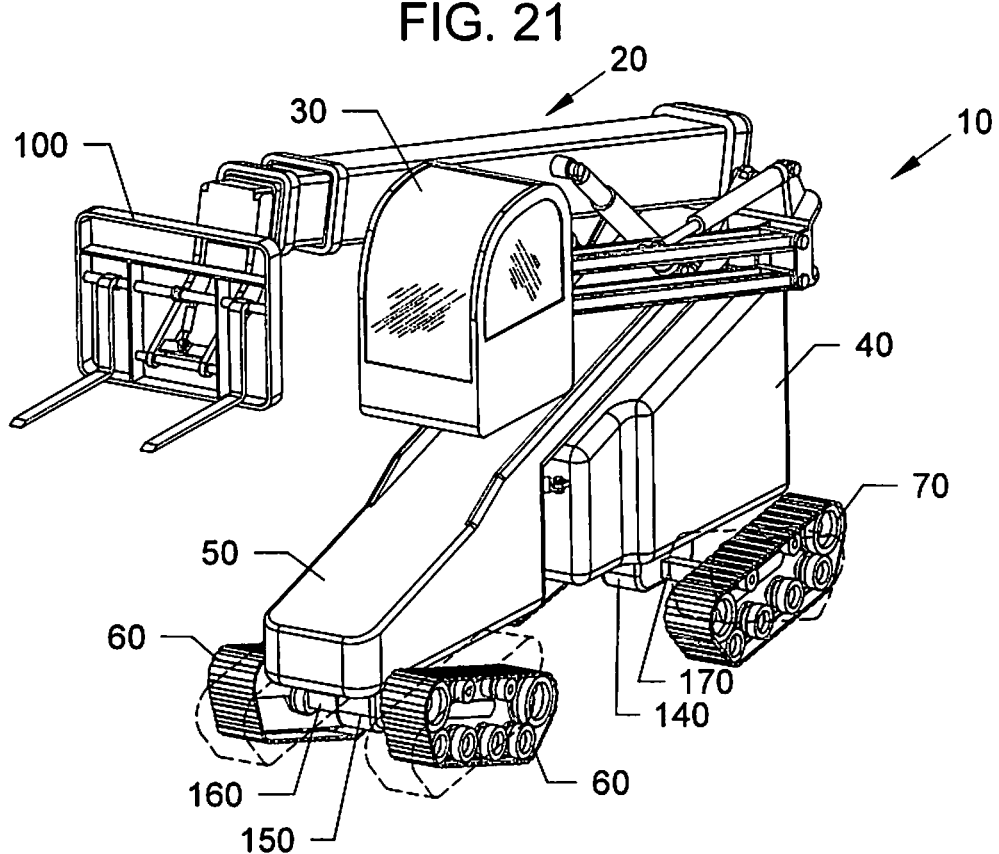
FIG. 21 is a top right perspective view of the vehicle of the preceding figures showing how the tracks articulate by rotating about and relative to their axles. The front tracks can also be locked in any position.
Figure 22:
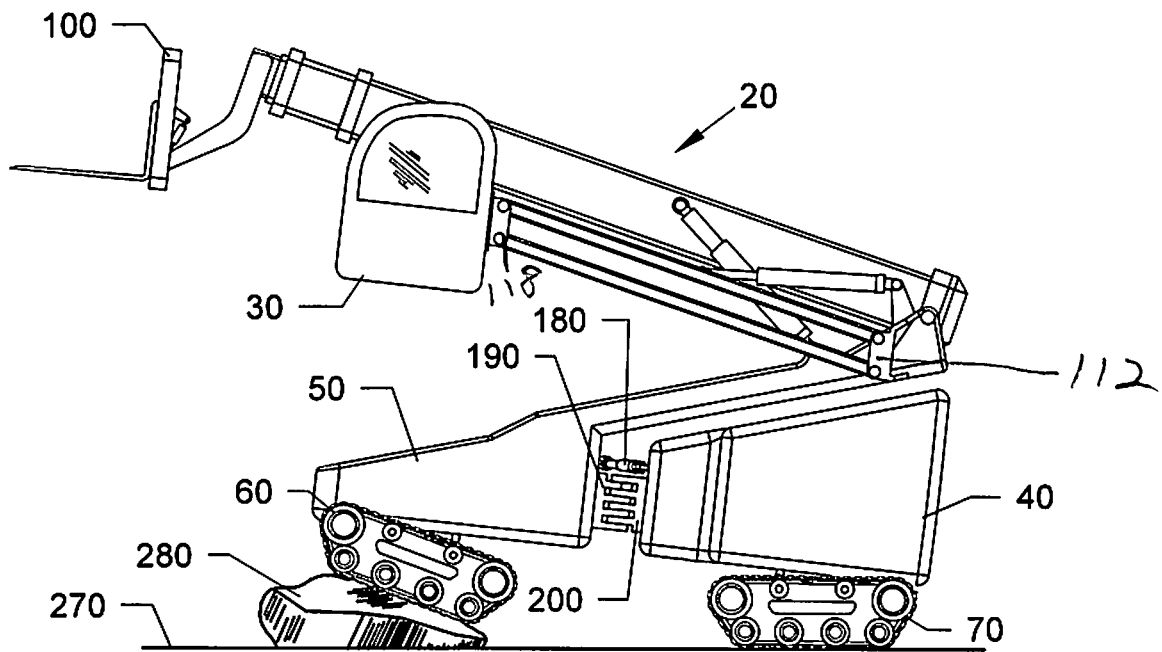
FIG. 22 is a right side view of vehicle of FIG. 21 showing the utility of the articulating tracks in overcoming an obstacle.

FIG. 21 is a top right perspective view of the vehicle 10 of the preceding figures showing how the track assemblies 60 and 70 can oscillate by rotating about and relative to their axles 160, 165, and 170, respectively. The track assemblies 60, 70 may also be locked in any oscillated position. FIG. 22 is a right side view of vehicle 10 of FIG. 21 showing the utility of the oscillating tracks of the front track assembly 60 in overcoming an obstacle 280, such as but not limited to a rock, log, or other obstacle, and the like. The oscillating track assemblies 60, 70 provide an advantage of maintaining optimum traction and stability when the vehicle traverses ground surfaces with obstacle(s) 280, and/or a relatively level ground surface 270 and/or ground surfaces that are not level such as those shown in FIGS. 15-18.

Figure 23:
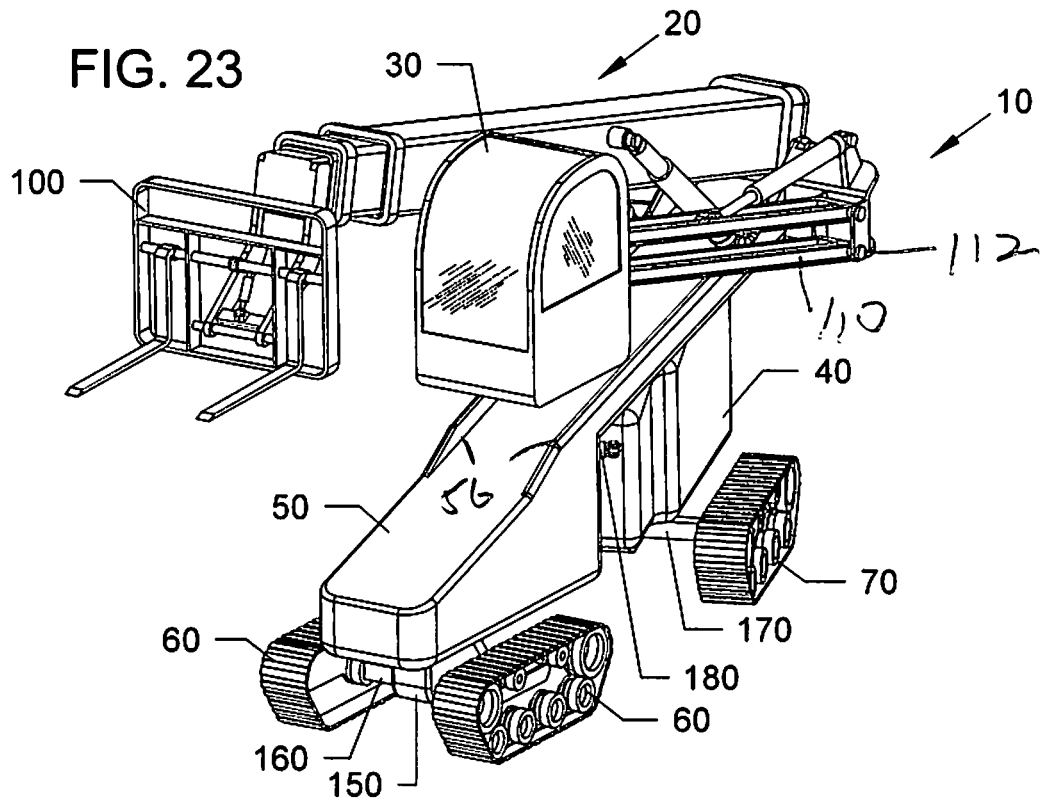
FIG. 23 is a front right perspective view of the vehicle of the preceding figures showing the rear engine compartment angled to the left relative to the superstructure on the front body.
Figure 24:
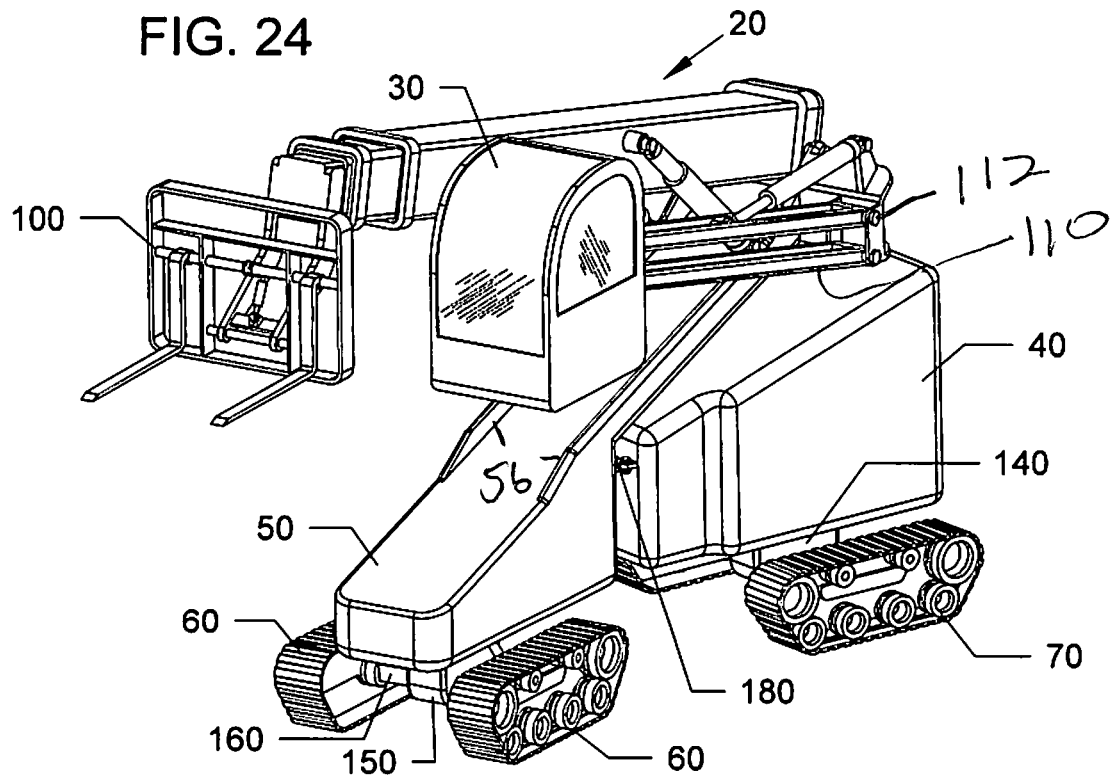
FIG. 24 is another view of FIG. 23 with the engine compartment angled to the right relative to the superstructure on the front body.

FIG. 23 is a front right perspective view of the vehicle 10 of the preceding figures showing the rear engine compartment (rear body) 40 articulated to the left relative to the superstructure on the front body 50. FIG. 24 is another view of FIG. 23 with the engine compartment (rear body) 40 articulated to the right relative to the superstructure on the front body 50.

Figure 25:
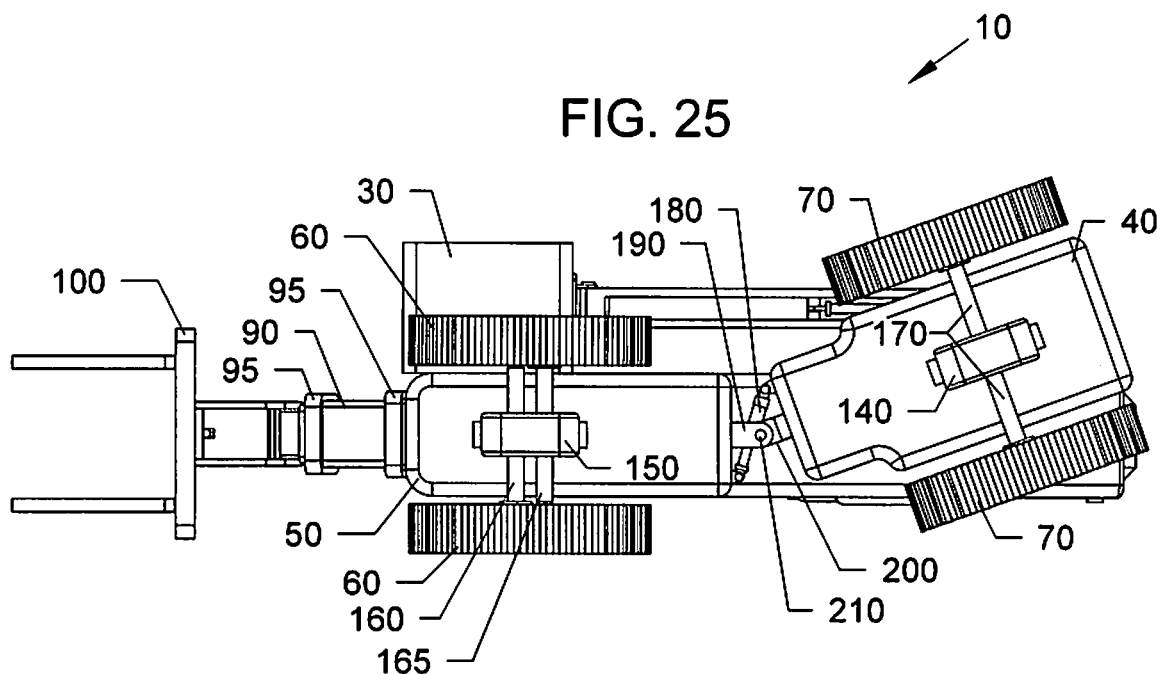
FIG. 25 is a bottom view of the vehicle of FIG. 24.
Figure 26:
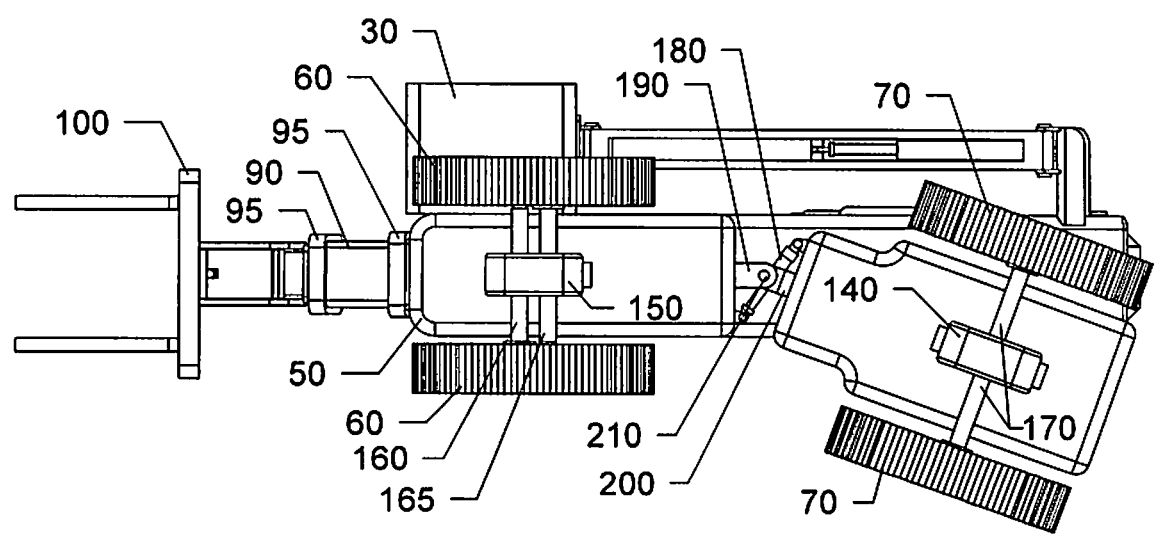
FIG. 26 is a bottom view of the vehicle of FIG. 23.

FIG. 25 is a bottom view of the vehicle 10 of FIG. 24. FIG. 26 is a bottom view of the vehicle 10 of FIG. 23.

Referring to FIGS. 5, 6, 8 and 22-26, the hinge components 190, 200, 210 allow for the front body 50 to articulate to the right or left relative to the rear body 40. A hydraulic cylinder(s), such as those previously described can be used to allow an operator in the cab 30 to manually control the angle orientation of the front body 50 to the rear body 40.

Figure 27:
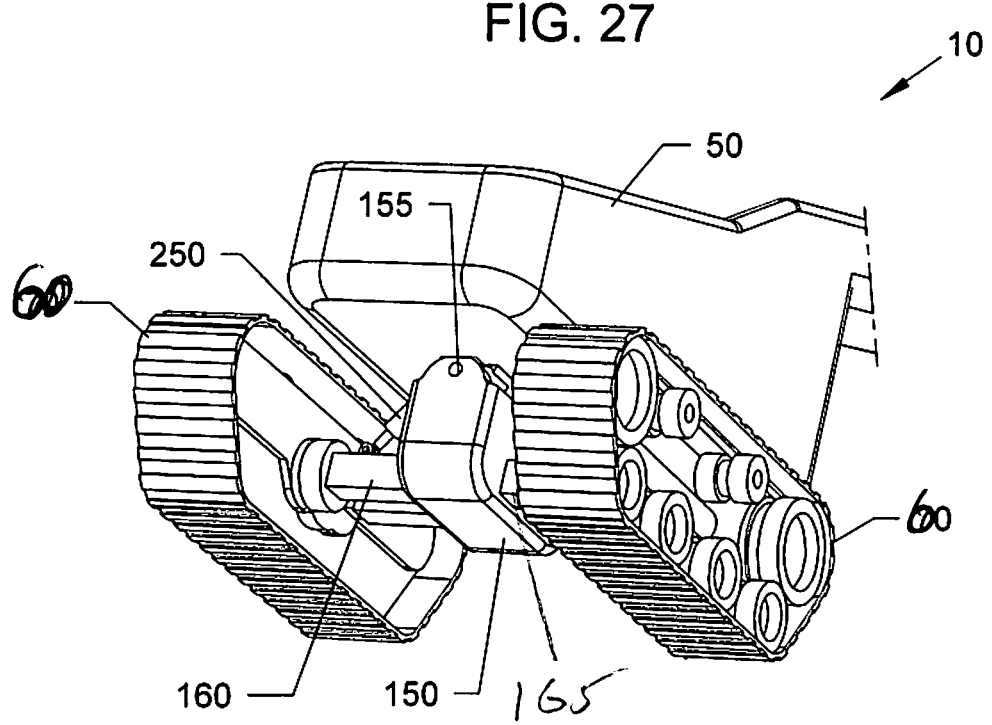
FIG. 27 is a front bottom perspective view of the front body with superstructure showing the axles and tracks, with the inner axles are retracted into the axle housings in this view.

FIG. 27 is a front bottom perspective view of the front body 50 with superstructure showing the axle housings 160, 165 and oscillating track assemblies 60 comprising the left track and the right track, with the inner telescoping axles 163, 167 (shown in FIG. 28) being retracted into the respective axle housings 160, 165 in this view.

Figure 28:
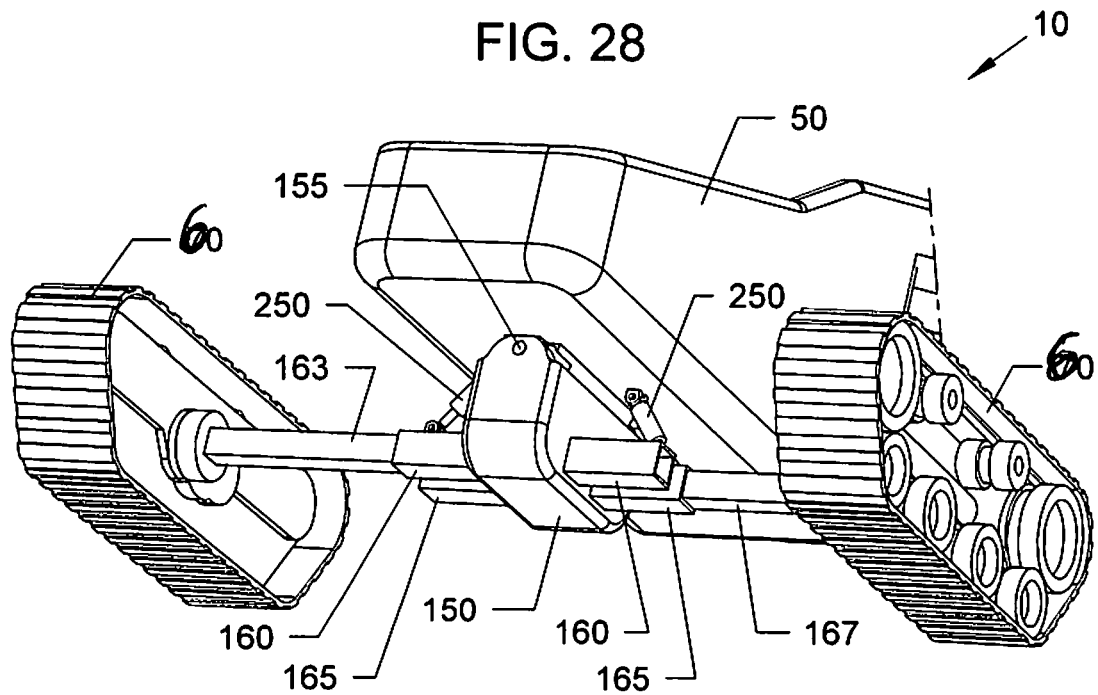
FIG. 28 is another view of FIG. 27 with the inner extendable axles fully extended. This places the tracks further away from the superstructure for increased stability.

FIG. 28 is another view of FIG. 27 with the inner extendable axles 163, 167 fully extended from their respective axle housings 160, 165, which places the right and left tracks further away from the superstructure (front body) 50 for increased stability over different ground surfaces. It is an advantage of certain embodiments that the extendable axles 163, 167 preclude any need for outrigging as used on prior art heavy equipment and machinery. By extending the extendable axles 163, 167 to maximize the distance between the tracks 60, the stability of the machinery against tipping is optimized.

Referring to FIGS. 27-28, a pair of hydraulic cylinders 250, such as those previously described can separately control each of the extendable inner axles 163, 167 as needed by the operator in the cab 30. While the levelling features shown in the preferred embodiment to not include the rear body (engine compartment) 40, the invention can also be used where both the front body (super structure) 50 and the rear body 50 both include hydraulic cylinder leveling controls.

Multifunctional, Intelligent Telescoping Boom

Turning now to FIGS. 29-36, details of an exemplary embodiment for a multifunctional, intelligent boom solution are shown and described. Importantly, not all embodiments of the overall solution necessarily include or incorporate a multifunctional, intelligent boom. As can be seen in the previous illustrations of FIGS. 1-28, the exemplary and novel telehandler comprises a three-stage boom having a large boom section or stage 75, a medium boom section or stage 80 and a small boom section or stage 90. In FIGS. 29-36, however, the exemplary embodiment of a multifunctional, intelligent boom 300 is illustrated in a four-stage arrangement that, in addition to stages 75, 80 and 90, includes a base stage 74. Notably, the particular boom configurations shown in the figures are offered for exemplary purposes only and are not meant to indicate or suggest that embodiments of the solution are limited to telescoping booms having either three or four stages. Rather, it is envisioned that embodiments of the solution may include telescopic booms having any number of stages. Further, in this description of a multifunctional, intelligent boom the terms "section" and "stage" are used interchangeably.

In the FIGS. 1-28 illustrations the exemplary heavy equipment is in the form of a telehandler, however, it is envisioned that any heavy equipment making use of a telescopic boom may employ a multifunctional, intelligent telescopic boom according to the solution and, in doing so may be operable to accommodate any number of implements, not just forks. For example, embodiments of the solution that include a multifunctional, intelligent telescopic boom may accommodate multiple different implements that collectively provide for a single heavy equipment to deliver functionality beyond just a telehandler such as, but not limited to, a backhoe, a front end loader, an excavator, a skidsteer, a feller buncher, a screed, a laser grader, a bucket, a mower, and a man basket.

Figure 29:
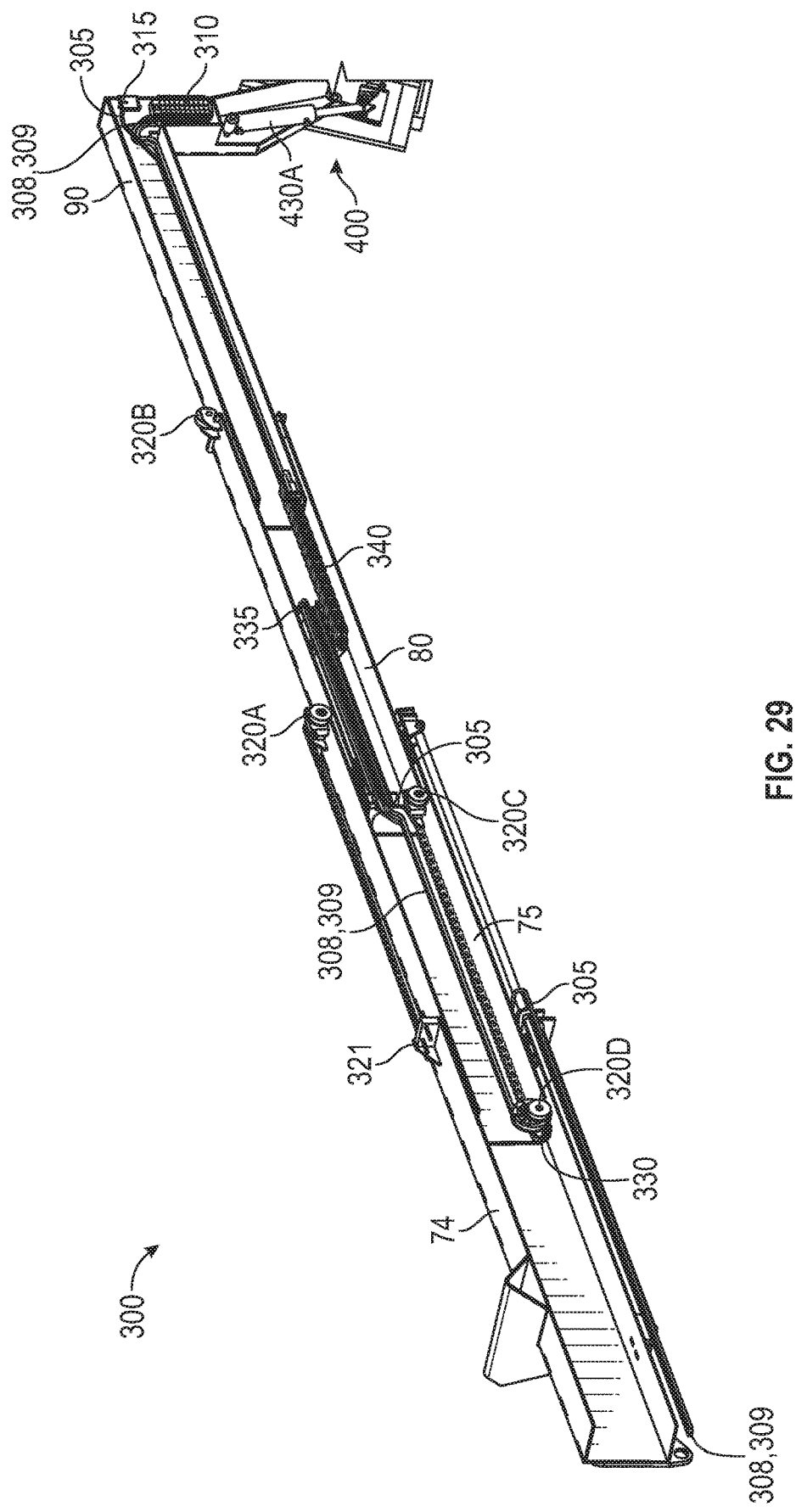
FIG. 29 is a cutaway view of an exemplary, four-stage multifunctional, intelligent telescoping boom according to the solution, shown in an extended state.
Figure 30:
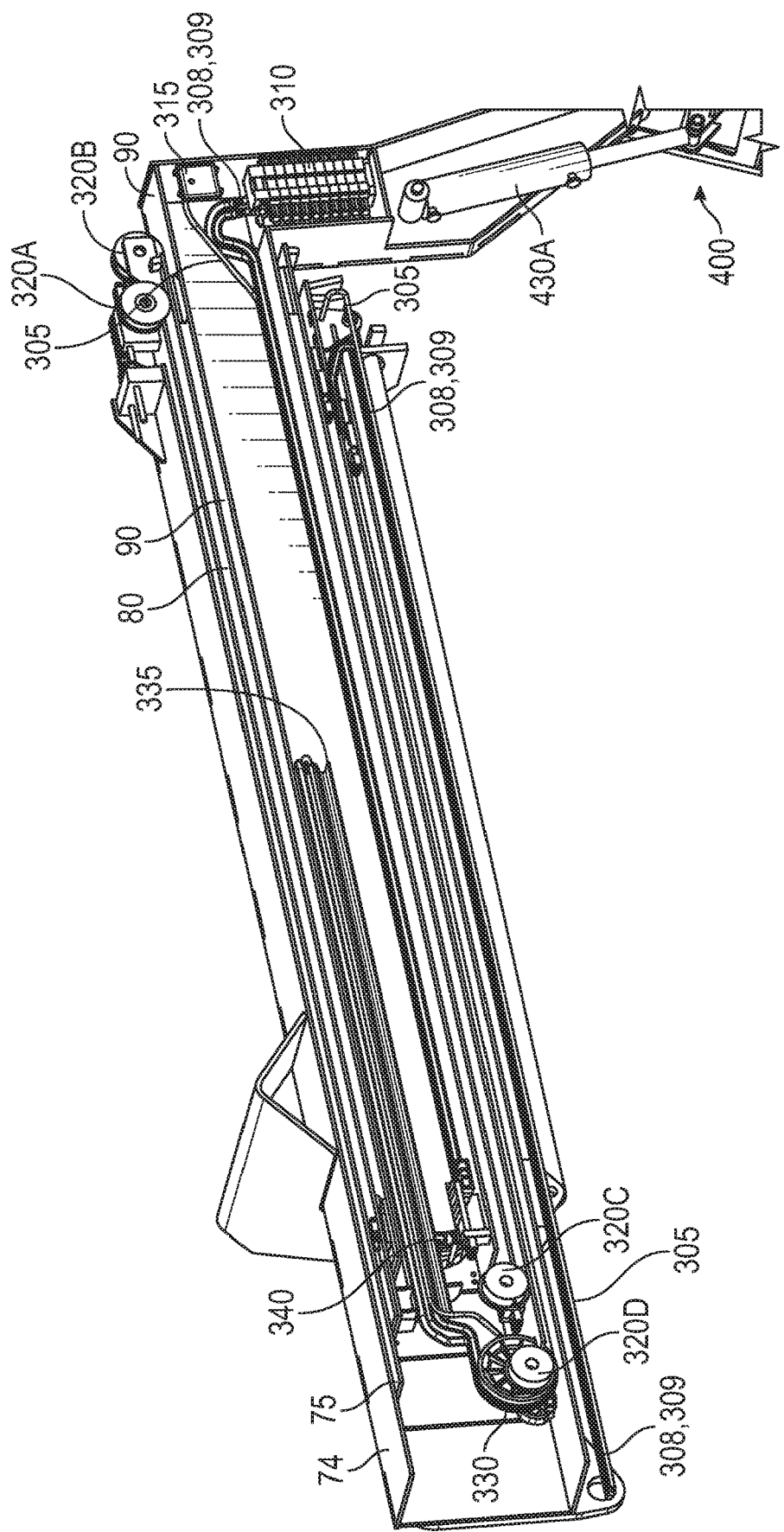
FIG. 30 is a cutaway view of the exemplary, four-stage multifunctional, intelligent telescoping boom of FIG. 29, shown in a retracted state.

FIG. 29 is a cutaway view of an exemplary, four-stage multifunctional, intelligent telescoping boom 300 according to the solution, shown in an extended state. And, FIG. 30 is a cutaway view of the exemplary, four-stage multifunctional, intelligent telescoping boom of FIG. 29, shown in a retracted state. The illustrations of FIGS. 29 and 30 will be described simultaneously.

As can be understood from the FIGS. 29 and 30 illustrations, an end stage 90, middle stage 80, and large stage 75 are anchored in base stage 74 and serially engaged, one to the other, in a telescopic fashion. Base stage 74 may be pivotally anchored to a piece of mobile heavy equipment (such as the telehandler depicted in FIGS. 1-28) such that the end stage 90 is the most distal stage to the heavy equipment. At the end of the end stage 90 an implement 400 may be mechanically mounted to end stage 90 and in electrical and fluid communication to an implement integration module 315 (see FIG. 33) via communication cable 305 and valve bank 310.

Valve bank 310 may be in fluid communication with a variable speed hydraulic pump (see FIG. 33) via a hydraulic pressure line 308 and hydraulic return line 309. As will become more clear from a review of subsequent figures and their associated descriptions, it is an advantage of embodiments of the solution over prior art hydraulic arrangements that the variable speed hydraulic pump circulates a continuous flow of hydraulic fluid through valve bank 310 and, in doing so, enables a hydraulic motive force to both linear actuators (hydraulic cylinders) 430 and rotary motors (hydraulic motors) 440 in implement 400 without dedicated supply and return lines to each actuator/motor 430, 440. In this way, embodiments of the solution, by leveraging the continuous pressurized hydraulic flow and valve bank 310, may accommodate multiple different implements 400 with multiple different component arrangements and functionalities.

Returning to the FIG. 29 and FIG. 30 illustrations, an anchor point 321 provides a fixed point of leverage associated with base stage 74. A series of motors 320 and linkages may be used to extend and retract the boom stages, as would be understood by one of ordinary skill in the art of booms.

It can be understood that the total length of hydraulic circulation lines/hoses 308, 309 and communication cable 305 must be adequate to extend the length of telescopic boom 300 when it is in an extended state, such as depicted in the FIG. 29 illustration. Consequently, embodiments of the solution incorporate cable and line management arrangements internal to the stages 75, 80, 90 for preventing entanglement or damage to the lines 308, 309 and cable 305 when the telescopic boom is transitioning between extended and retracted stages. Hydraulic pressure and return lines 308, 309, and communication cable 305 may run external along base stage 74 before entering the interior space of large boom stage 75. Within the interior of stage 75, the lines/cable 305, 308, 309 may be received by and around a pulley(s) 330 and directed toward middle stage 80. Subsequently, within middle stage 80 the lines/cable 305, 308, 309 may be received along and around a carriage 335 that is approximately half the length of stage 80.

The carriage 335 supports a first length of the lines/cable 305, 308, 309 such that a second length of the lines/cable 305, 308, 309 may be received into a flexible conduit 340. A near end of the flexible conduit 340 is anchored in association with a distal end of carriage 335, as can be understood from the illustrations. And, a distal end of flexible conduit 340 may be anchored in association with a near end of end boom stage 90. The lines/cable 305, 308, 309 continue out of the distal end of flexible conduit 340 and run through the interior space of end boom stage 90 where the cable 305 terminates at the implement integration module 315 and the hydraulic hoses 308, 309 terminate in connection with the valve bank 310. Notably, as the end boom stage 90 is retracted into middle boom stage 80, the flexible conduit 340 may "roll" beneath or behind carriage 335 in order to prevent lines/cable 305, 308, 309 from entangling.

Figure 31:
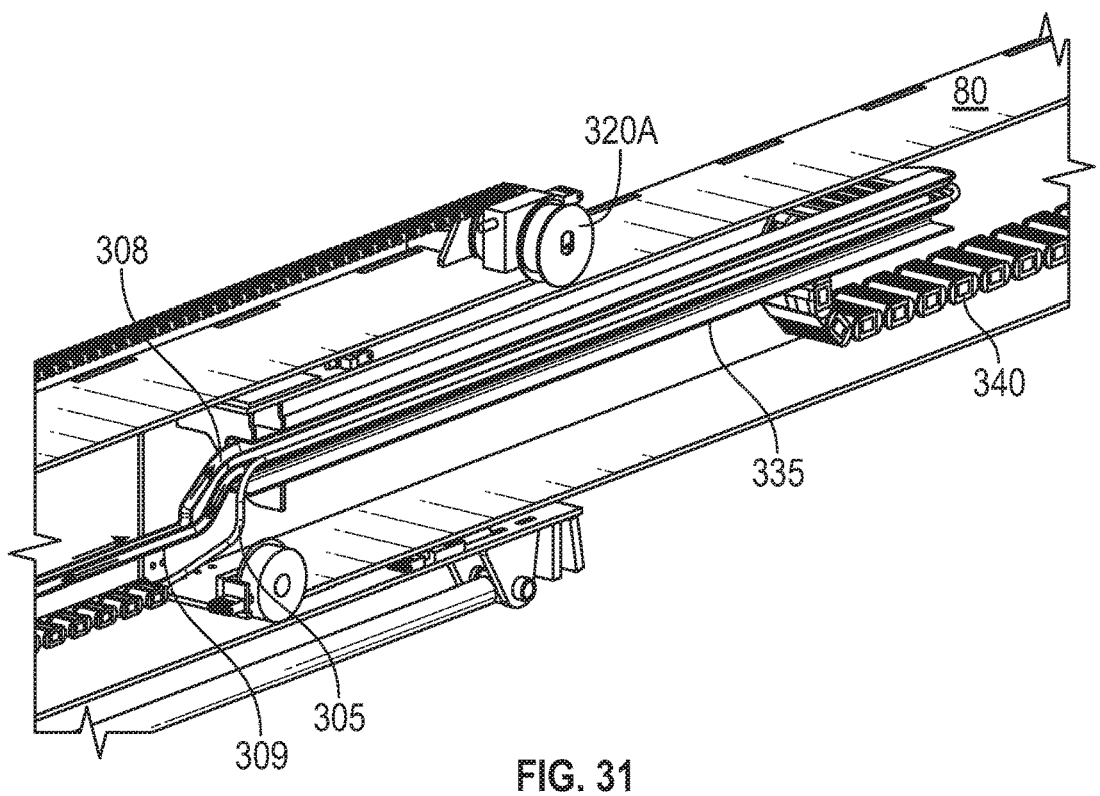
FIG. 31 is a close-up, cutaway view of the middle stage of the exemplary four-stage multifunctional, intelligent telescoping boom of FIG. 29.

FIG. 31 is a close-up, cutaway view of the middle stage 80 of the exemplary four-stage multifunctional, intelligent telescoping boom 300 of FIG. 29. In the FIG. 31 illustration, it can be better seen how the flexible conduit 340 retracts and rolls, as well as extends and rolls, beneath and behind the carriage 335.

Figure 32:
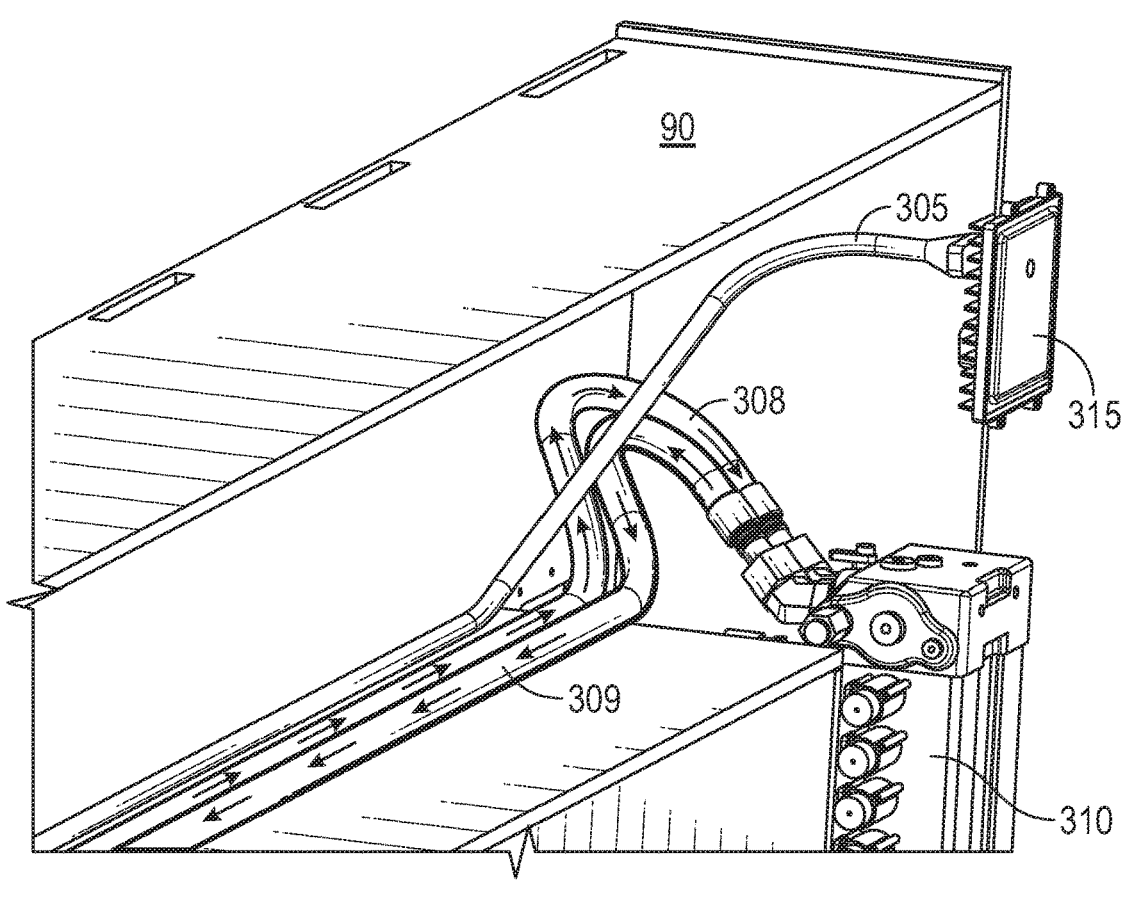
FIG. 32 is a close-up, cutaway view of the end stage of the exemplary four-stage multifunctional, intelligent telescoping boom of FIG. 29.

FIG. 32 is a close-up, cutaway view of the distal end of end stage 90 of the exemplary four-stage multifunctional, intelligent telescoping boom 300 of FIG. 29. As previously described, the communication cable 305 terminates in communication with implement integration module 315. Hydraulic pressure line 308 provides a flow of pressurized hydraulic fluid to valve bank 310 while hydraulic return line 309 circulates hydraulic fluid back to a variable speed hydraulic pump associated with the heavy equipment. More detail regarding exemplary embodiments of the module 315 and valve bank 310 will be provided with subsequent figures.

Figure 33:
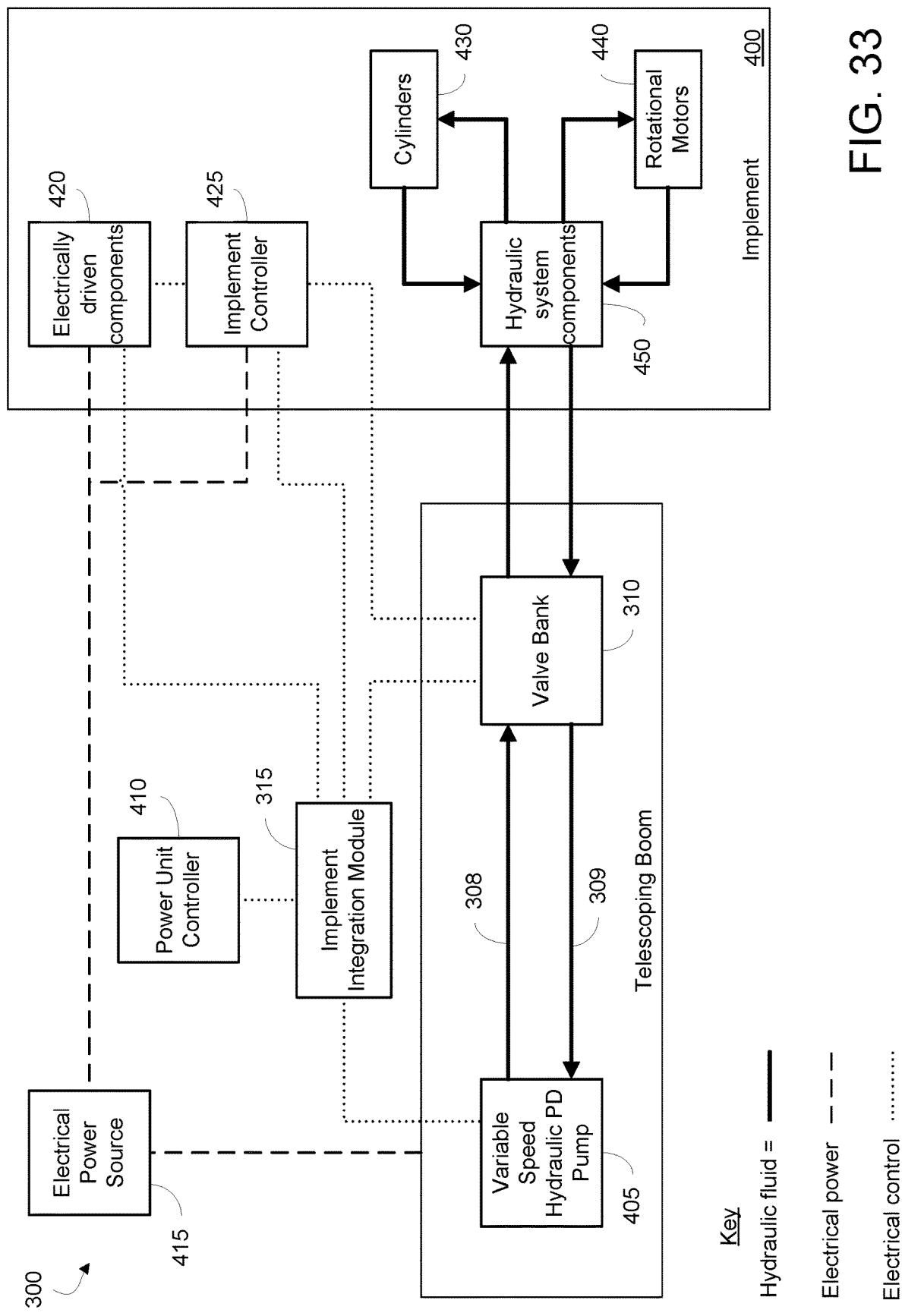
FIG. 33 is a functional block diagram illustrating various exemplary components comprised within an exemplary embodiment of a multifunctional, intelligent telescoping boom system according to the solution.

Turning now to FIG. 33, illustrated is a functional block diagram illustrating various exemplary components comprised within an exemplary embodiment of a multifunctional, intelligent telescoping boom system 300 according to the solution. An electrical power source 415 associated with the heavy equipment to which the intelligent boom 300 is a part may drive a variable speed hydraulic pump 405. Notably, in the FIG. 33 illustration, the variable speed hydraulic pump 405 is depicted as a part of the telescoping boom, however, it is envisioned that the hydraulic pump 405 may be associated with the heavy equipment itself (such as telehandler 10).

The variable speed hydraulic pump 405 pressurizes and circulates hydraulic fluid to and through valve bank 310. Hydraulic supply line 308 takes pressurized hydraulic fluid from the variable speed pump 405 to the valve bank 308. The hydraulic fluid is distributed by the valve bank 308 to any number of cylinders 430 and/or hydraulically driven rotational motors 440 associated with a given implement 400 mounted to the end stage 90 of the boom. The hydraulic fluid returns from the cylinders 430 and/or hydraulically driven rotational motors 440 back through the valve bank 310 and to variable speed hydraulic pump 405 via return line 309. Advantageously, the variable speed hydraulic pump 405 may increase pressure/flow in response to increased demand from cylinders 430 and/or hydraulically driven rotational motors 440 or decrease pressure/flow in response to decreased demand from cylinders 430 and/or hydraulically driven rotational motors 440. In this way, unlike prior art solutions that require dedicated hydraulic lines for every hydraulically driven component, embodiments of the present solution leverage a continuous circulating hydraulic flow that is marshaled through a valve bank 310 and increased or decreased in response to demand.

One of ordinary skill in the art of hydraulics would understand that hydraulic systems may require any number, combinations and arrangements of hydraulic system components 450 in addition to the hydraulic motors 430, 440 driven by the system. The hydraulic system components 450 represented in the FIG. 33 illustration may be associated with the implement 400, the intelligent boom system 300 and/or the heavy equipment. As such, even though the hydraulic system components 450 are illustrated to reside within implement 400, it will be understood that various hydraulic system components 450 may reside outside of implement 400 without departing from the scope of the solution. The hydraulic system components 450 may include, but are not limited to including nor required to include, hydraulic fuses, shutoff valves, control valves, accumulators, reservoirs, pressure relief valves, check valves, filters, coolers and heaters.

In addition to cylinders 430, motors 440 and hydraulic system components 450, the implement 400 may include electrically driven components 420 such as, but not limited to, lights, sensors (e.g., pressure sensor(s), infrared sensor(s), laser(s), temperature sensor(s), strain gauge(s), weight scale(s), etc.), electrical motors, instrumentation, vibrators, actuators, solenoids, etc. The electrically driven components 420 may be powered by electrical power source 415 and may generate output signals to indicate readings or measurable. The output signals may be in the form of 4-20 mA, 0-10 Vdc, etc., as would be understood by one of ordinary skill in the art of control systems.

The implement 400 may also have associated with it an implement controller 425 that provides an operator with a control station that is physically local to the implement 400, as opposed to the power unit controller 410 that may be located within the cab 30 of the heavy equipment 10. An implement controller 425 may be useful when, for example, the implement 400 is of a type that requires an operator "on the ground" such as a screed. When the implement 400 is being operated through use of implement controller 425, the implement controller 425 may control extension and retraction of the boom (as well as other functionality) by and through communication with implement integration module 315. The implement controller 425 may control and communicate with electrically driven components 420 directly and with hydraulic components 430, 440, 450 by and through valve bank 310. Moreover, when the implement 400 is being operated through use of implement controller 425, the implement integration module 315 may cause controls associated with power unit controller 410 to be overridden or otherwise deactivated.

The implement integration controller 315 may include computer processor(s), memory chip(s), and modem(s) as well as other computer hardware and software. Advantageously, the implement integration controller 315 may be configured to execute any number of algorithms and/or logic for selectively configuring the system 300 to operate a particular implement 400. As will be better understood from subsequent figures, the implement 400 may take any number of forms such as, but not limited to, a screed, a bucket, a scraper, a laser grader, a mower, a man basket, etc. As would be understood by one of ordinary skill in the art, each different type of implement leverages a different combination of hydraulic and/or electrical components. As such, it is an advantage of the solution that a wide variety of implements 400 may be mechanically mounted to the end boom stage 90 and hydraulically driven through valve bank 310.

The implement integration module 315 may be configured to select a control scheme that is associated with a given implement 400. Selection of the control scheme may be in response to communications received by the module 315 from power unit controller 410. The power unit controller 410 may include an interface accessible by a user in the cab 30 of the heavy equipment. Moreover, and as would be understood by one of ordinary skill in the art, the power unit controller 410 may include switches, displays, feedback monitors, etc. for providing an equipment operator with the ability to control the heavy equipment 10, boom 300, and implement 400.

The control scheme may be in the form of executable instructions stored in a memory of implement integration module 315. Based on the control scheme instructions, the implement integration module 315 may communicate with valve bank 310 to activate and/or deactivate select valves in the bank 310 associated with hydraulic cylinders 430 and/or hydraulic rotational motors 440 of the given implement 400. Further, the implement integration module 315 may communicate with power unit controller 410 to change functionality of the various switches, joysticks, feedback displays, etc. to be applicable to, and work with, the various hydraulic and electrical functionalities of the given implement 400.

Figure 34:
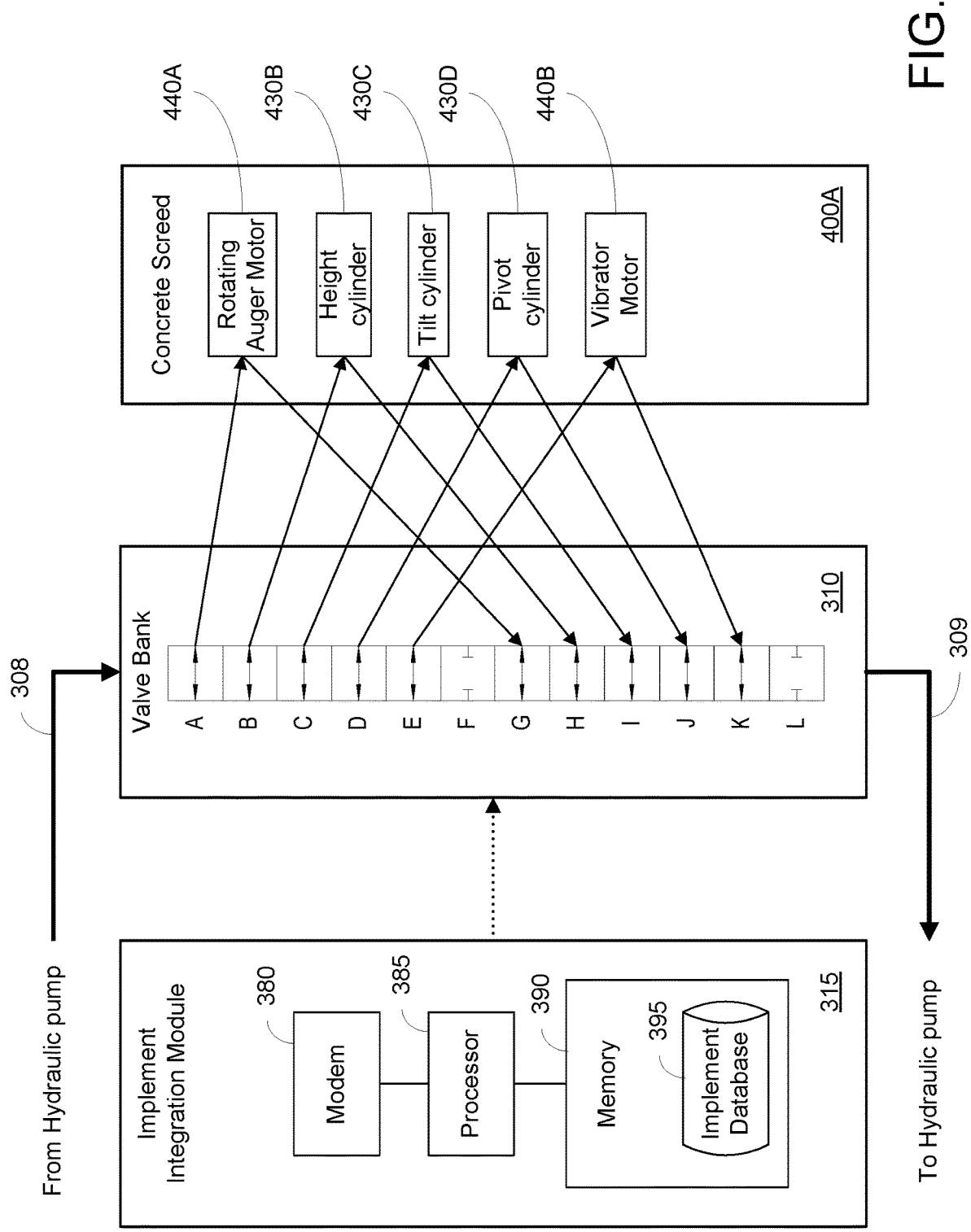
FIG. 34 is a functional block diagram demonstrating the interconnection of an exemplary implement in the form of a concrete screed with the valve bank and implement integration module of an exemplary embodiment of the solution.

Turning now to FIG. 34, illustrated is a functional block diagram demonstrating the interconnection of an exemplary implement 400A in the form of a concrete screed with the valve bank 310 and implement integration module 315 of an exemplary embodiment of the solution for a multifunctional, intelligent telescoping boom 300. As previously described, the valve bank 315 receives a circulating flow of pressurized hydraulic fluid from the variable speed pump 405. Pressurized hydraulic fluid enters the valve bank 310 from supply hose 308 and returns to the pump to via return hose 309.

The valve bank 310 includes a plurality of valves (depicted in the illustration as valves A-L, although it is envisioned that any number of valves may be comprised within an exemplary valve bank 310) and is configured to distribute hydraulic fluid to various components (such as cylinders and rotary motors) associated with given valves. It is an advantage of embodiments of the solution that cylinders and rotary motors may be simultaneously powered from a common hydraulic flow.

The valve bank 310 may be configured to receive hydraulic fluid back from the various components and direct it back through dedicated return line 309 to pump 405. In this way, the hydraulic fluid constantly circulates, providing a motive force for both cylinders 430 and motors 440. Notably, although the valves A-L in the illustration are depicted as two-way valves that are in either an open or closed state, for ease of illustration, it is envisioned and likely that embodiments of a valve bank 310 according to the solution may incorporate multi-port valves to achieve the described functionality. Exemplary valve arrangements that may be leveraged by a valve bank 310 will be illustrated and described in more detail in FIGS. 37A-42B.

The valves within a valve bank 310 may be actuated by solenoids, as would be understood by one of ordinary skill in the art, and may be "on/off" or proportional in control. One or more valves within valve bank 310 may comprise a "quick disconnect" feature or aspect, as is known in the art of hydraulic valves, to facilitate quick and convenient changeover of implements 400. Depending on the particular valve arrangement being used and the associated component 430, 440 in the implement 400, the implement integration module 315, working with the power unit controller 410 and/or the implement controller 425, may actuate the valves between open and closed states or, if the valve is operable to do so, proportionally control the valve by modulating it between a fully open and a fully closed state. As one of ordinary skill in the art of valves would understand, a proportionally controlled valve (I.e., a control valve) may be used to modulate fluid flow and/or pressure downstream of the valve. In this way, an implement integration module 315 may respond to increases and decreases in hydraulic demand by components 430, 440 of implement 400 by modulating one or more valves in valve bank 310 in addition to, or in lieu of, varying the speed of positive displacement pump 405.

The implement integration module 315 may include a processor 385 in communication with memory 390 and modem 380. The modem 380 may be required for communication with the power unit controller 410, the implement controller 425, the valve bank 310 and/or the electrically driven components 420. The memory 390 may include stored instructions executable by the processor 385. The processor may be a multi-core processor, as would be understood by those of skill in the art of computer processing. The memory 390 may be comprised of DDR, cache, RAM, etc., as would be understood by those of skill in the art of computer processing. Moreover, the memory 390 may house an implement database 395 for storing the various algorithms and instructions associated with given types of implements 400.

Returning to the FIG. 34 illustration, the implement integration module 315 may leverage the implement database 395 to identify and select a certain set of stored instructions associated with the screed 400A. Based on the queried instructions, the implement integration module 315 may communicate with the valve bank 310 to designate certain valves of valves A-L to be associated with hydraulic components of screed 400A. At the same time, the implement integration module 315 may work with the power unit controller 410 to associate the outputs of various operator accessible switches and actuators (e.g., joystick) in cab 30 with the hydraulic components of screed 400A as well as the indications of various gauges and feedback monitors with the electrically driven components 420 of screed 400A. The implement integration module 315 may similarly work with the local implement controller 425, if need be, to associate the outputs of various operator accessible switches and actuators (e.g., joystick) of the implement controller 425 with the hydraulic components of screed 400A as well as the indications of various gauges and feedback monitors with the electrically driven components 420 of screed 400A.

In the illustration of FIG. 34, the exemplary concrete screed implement 400A includes hydraulically driven components in the forms of rotating auger motor 440A, height adjustment cylinder 430B, tilt cylinder 430C, pivot cylinder 430D and vibrator motor 440B. As those of ordinary skill in the art of screeds would understand, a screed is an implement used to level and smooth concrete, pavement, or other surfaces at the time of being poured. A screed may include a number of sensors such as auger rotation speed, auger rotation direction, tilt degree, pitch degree, crown degree, temperature, laser level, etc. A screed may also include hydraulically driven motors and cylinders for adjusting the various operations, settings and functions of the screed.

Advantageously, embodiments of the solution for a multifunctional, intelligent telescoping boom may be operable to accommodate a screed such as the exemplary screed 400A. With certain valves of valve bank 310 assigned to the various cylinders and motors of screed 400A, the continuous flow of hydraulic fluid circulated by hydraulic PD pump 405 to and from valve bank 310 may be used to drive the various components. Feedback from the electrically driven components 420 to implement integration module 315 may be leveraged by module 315 to vary the speed of the variable speed pump 405 and/or proportionally control one or more of the valves in valve bank 310 and, in doing so, maintain a consistent and useful pressure in lines 308, 309 regardless of the varying hydraulic demand associated with the cylinders 430 and motors 440.

Figure 35:
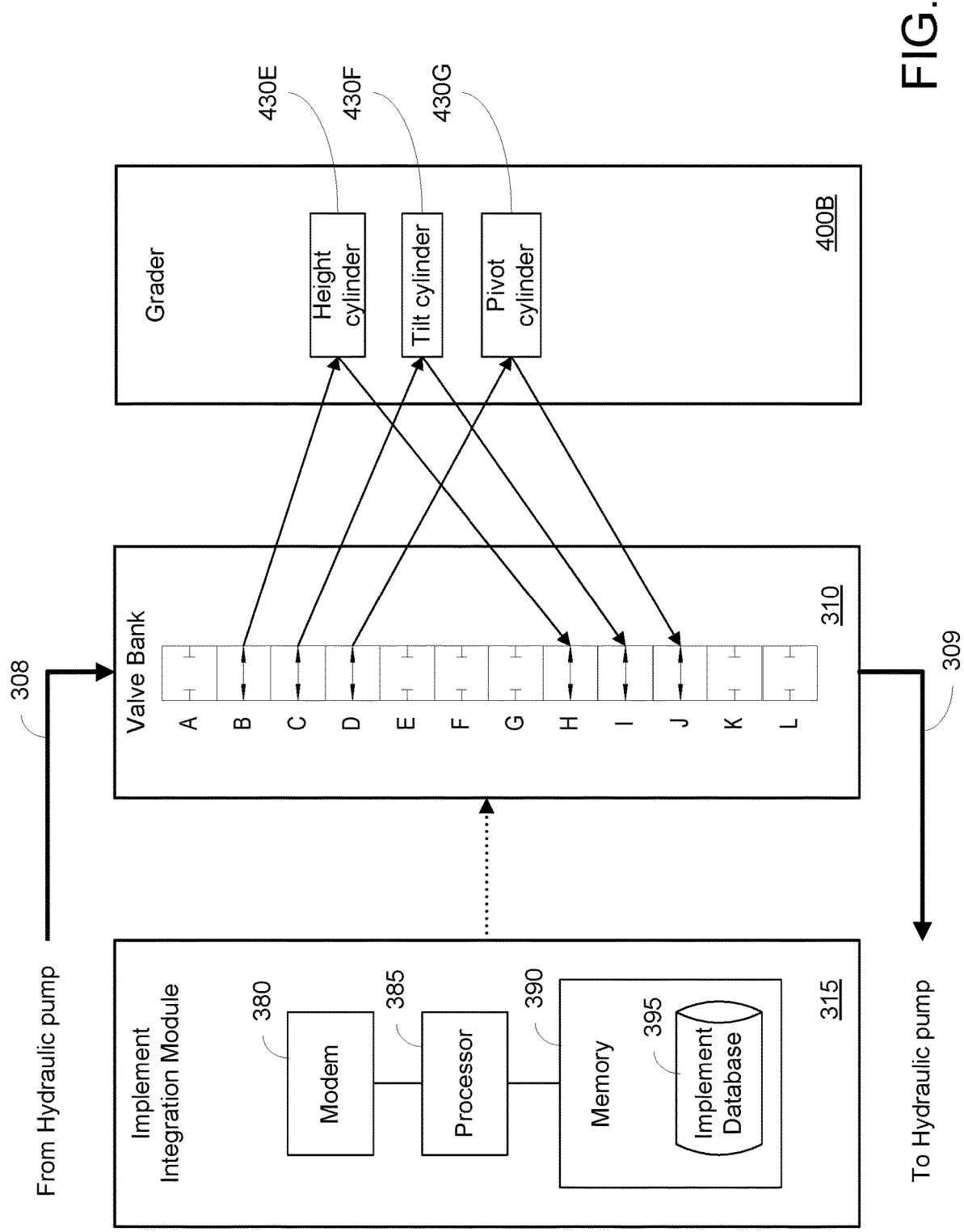
FIG. 35 is a functional block diagram demonstrating the interconnection of an exemplary implement in the form of a grader with the valve bank and implement integration module of an exemplary embodiment of the solution.

Turning now to FIG. 35, illustrated is a functional block diagram demonstrating the interconnection of an exemplary implement 400B in the form of a grader with the valve bank 310 and implement integration module 315 of an exemplary embodiment of the solution for a multifunctional, intelligent telescoping boom 300. As can be understood from a comparison of the FIG. 34 illustration with the FIG. 35 illustration, different implements 400 may have different combinations of electrically driven components, hydraulic cylinders, and hydraulic motors. It is an advantage of the solution that the valve bank 310 may include enough valves to accommodate the hydraulic demands of multiple different implements 400. The exemplary grader implement 400B requires less of the valves of valve bank 310 than does exemplary concrete screed implement 400.

Briefly referring back to the FIG. 34 illustration, valves A and G were allocated to rotating auger motor 440A, valves B and H were allocated to height adjustment cylinder 430B, valves C and I were allocated to tilt adjustment cylinder 430C, valves D and J allocated to pivot adjustment cylinder 430D, and valves E and K allocated to vibrator motor 440B. By contrast, exemplary grader implement 400B has less hydraulic components and so has need of fewer valves in the valve bank 310. For the exemplary grader implement 400B, valves B and H are allocated to height adjustment cylinder 430E, valves C and I allocated to tilt adjustment cylinder 430F, and valves D and J allocated to pivot cylinder 430G.

A "switch out" of concrete screed 400A for grader 400B may first require physical disconnection of the concrete screed 400A from the end stage boom 900 including disconnection of hydraulic connections to valve bank 310 and implement integration module 315. Subsequently, the grader implement 400B may be mechanically mounted to end stage boom 90, its hydraulic components 430E-G connected to valve bank 310 and its electrically driven components 420 placed in electrical communication with electrical power source 415 and implement integration module 315. Selection and execution of the applicable set of instructions from implement database 395 by implement integration module 315 may subsequently associate the appropriate valves of valve bank 310 with hydraulic components 430E-G as well as associate the controls and displays of power unit controller 410 with hydraulic components 430E-G and electrically driven components 420.

Figure 36:
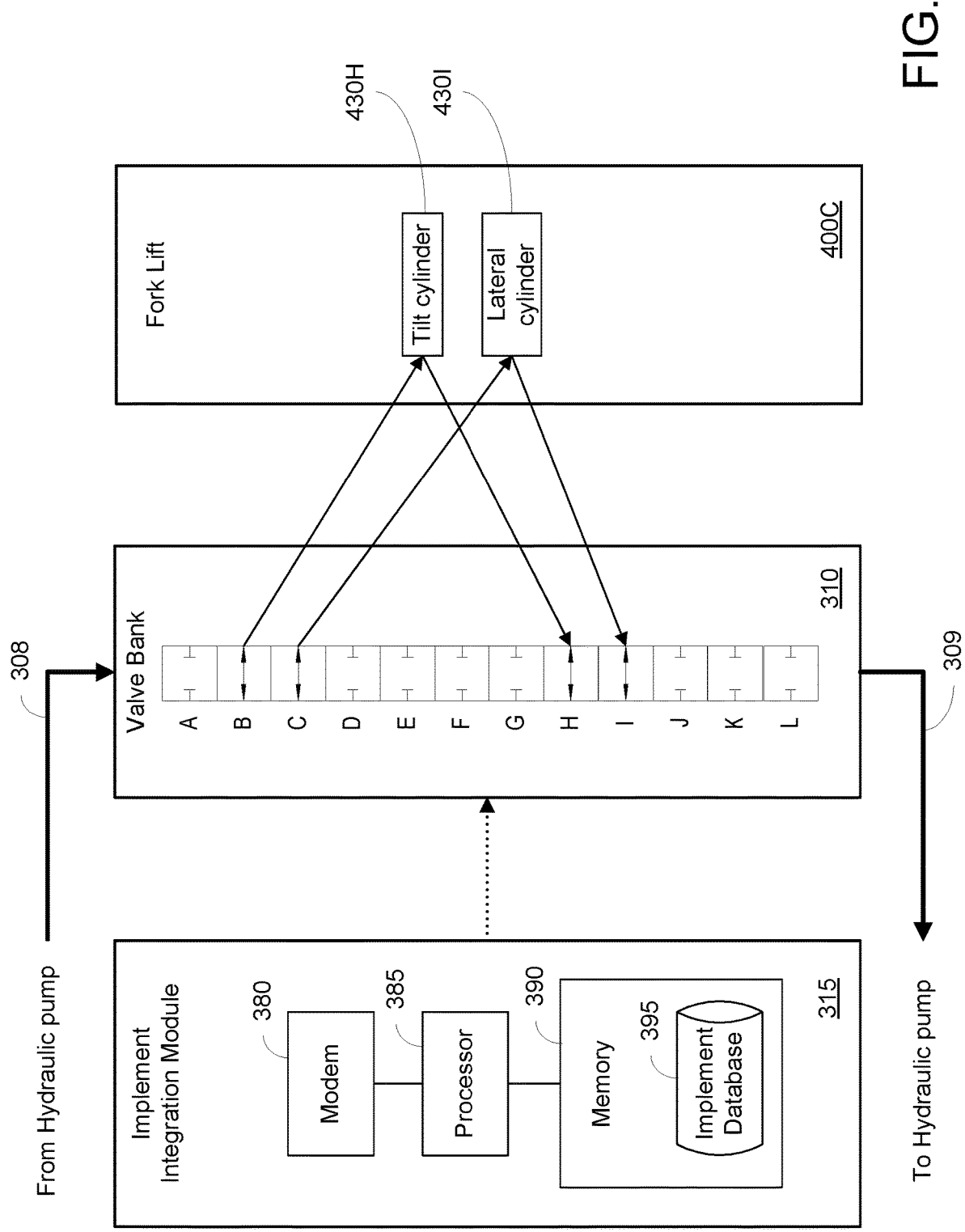
FIG. 36 is a functional block diagram demonstrating the interconnection of an exemplary implement in the form of a forklift with the valve bank and implement integration module of an exemplary embodiment of the solution.

Turning now to FIG. 36, illustrated is a functional block diagram demonstrating the interconnection of an exemplary implement 400C in the form of a forklift with the valve bank 310 and implement integration module 315 of an exemplary embodiment of the solution for a multifunctional, intelligent telescoping boom 300. As compared to the concrete screed 400A and the grader implement 400B, the forklift implement 400C has relatively simple hydraulic controls. As one of ordinary skill in the art would understand, a forklift implement generally makes use of a tilt cylinder 430H to "pitch" the forks forward or backward and a lateral cylinder 430I to "slide" the forks laterally. When used on the end of a telescoping boom, such as the multifunctional, intelligent telescoping boom 300, the forks are raised and lowered with a load by raising and lowering the boom. Consequently, few valves of a valve bank 310 may be leveraged to accommodate the hydraulic cylinders of a typical forklift implement. It is an advantage, however, of embodiments of the solution that implements ranging in complexity from a forklift 400C to a concrete screed 400A may be accommodated by a single multifunctional, intelligent telescopic boom.

Turning now to FIGS. 37A-42B, exemplary portions valve bank 310 arrangements will be illustrated and described. It should be understood that a valve bank 310 according to the solution may include and utilize any combination of multi-port valves in order to control the various functionalities of a given implement 400. And so, the arrangements illustrated in FIGS. 37A-42B are exemplary in nature and are not meant to suggest that all embodiments of a valve bank 310 according to the solution will necessarily exclusively utilize one or more of the exemplary valve arrangements.

Figure 37A:
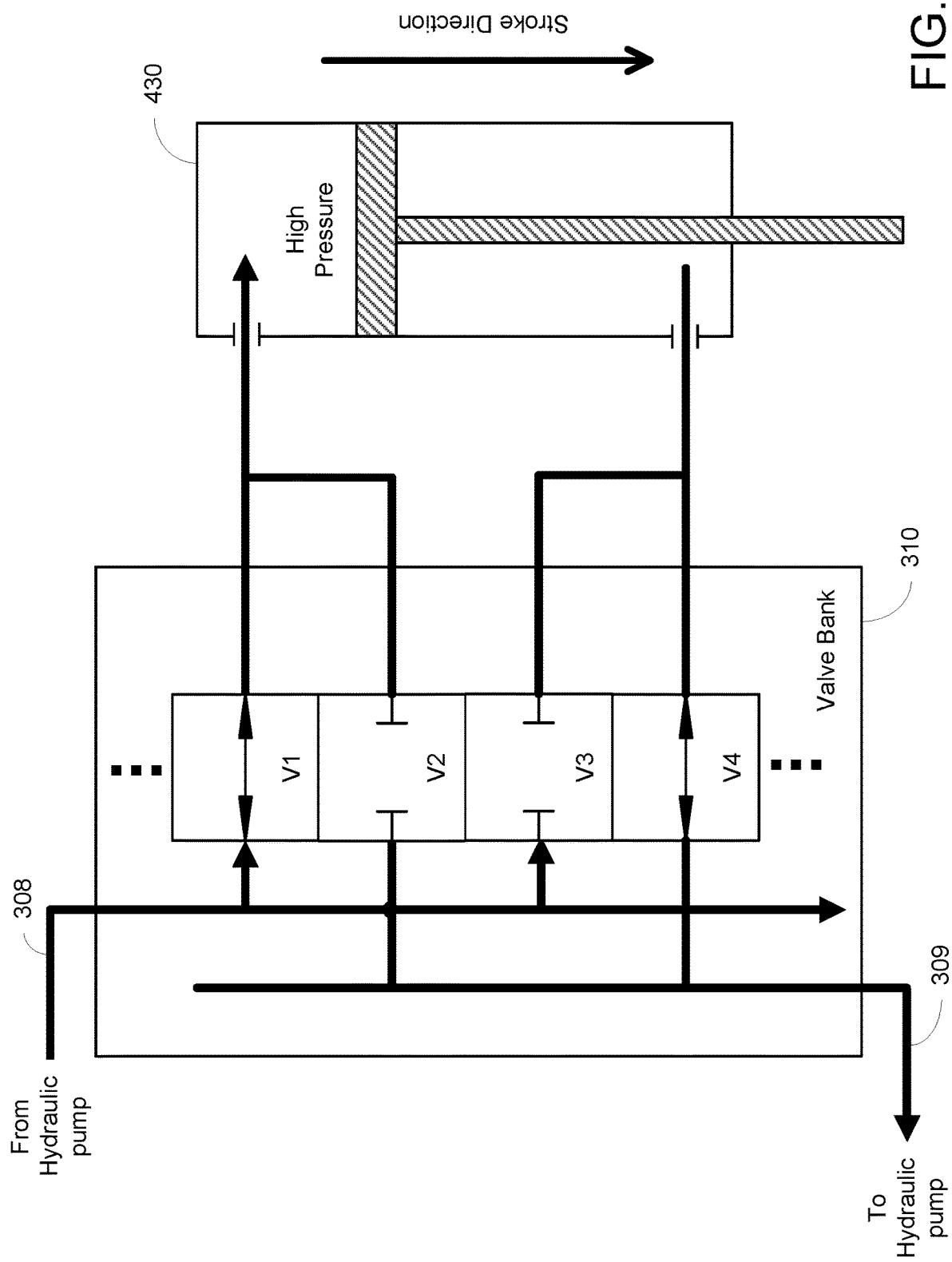
FIGS. 37A-37C illustrate an exemplary portion of a valve bank arrangement utilizing two-way valves to actuate a hydraulic cylinder with a continuous hydraulic flow through the valve bank.
Figure 37B:
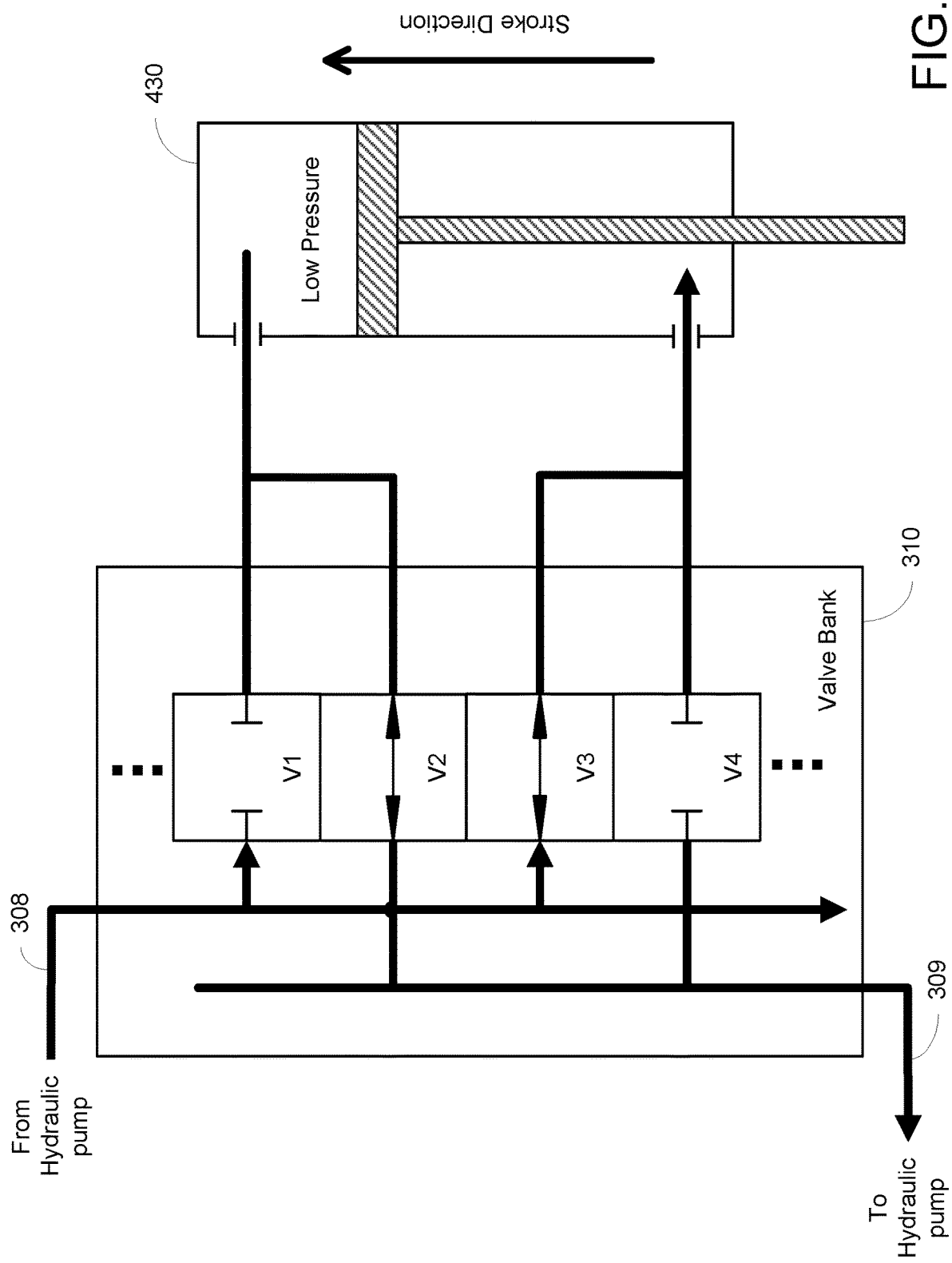
Figure 37C:
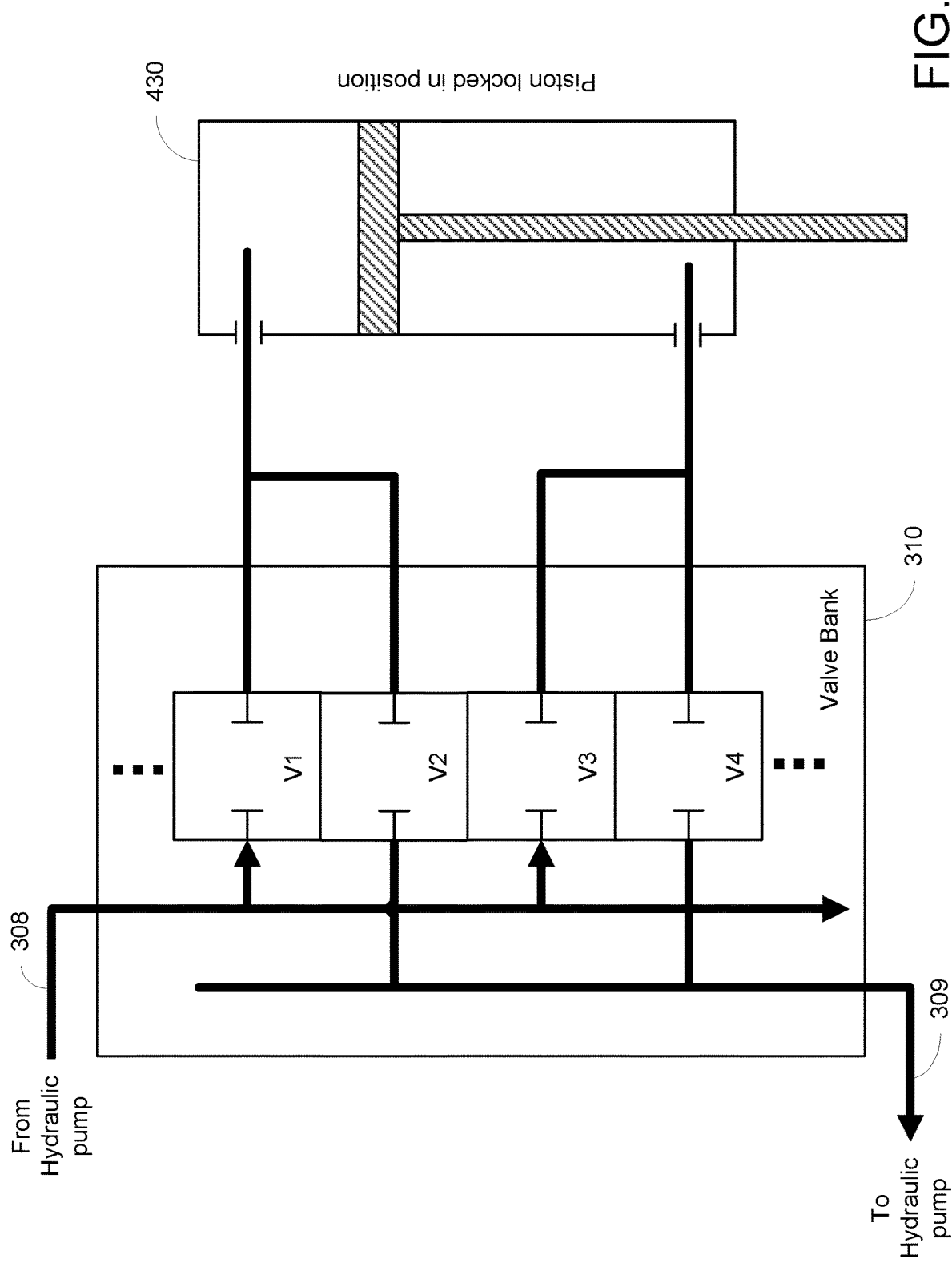

FIGS. 37A-37C illustrate an exemplary portion of a valve bank arrangement utilizing two-way valves V1-V4 to actuate a hydraulic cylinder 430 with a continuous hydraulic flow through the valve bank 310. As previously shown and described, a pressurized hydraulic flow 308 from pump 405 enters valve bank 310, is distributed to components of implement 400, and returns back through valve bank 310 to pump 405 via return flow 309. In the illustration, hydraulic cylinder 430 may reside in association with an implement 400.

As can be understood from the FIG. 37A illustration, the pressurized supply 308 enters valve bank 310 and is distributed to, inter alia, valves V1 and V3. The downstream sides of valves V1 and V3 are in fluid connection to the upper and lower portions, respectively, of cylinder 430. Valve V1 is in an open state in order to supply the pressurized fluid to the upper portion of cylinder 430, thereby providing a motive force to move the piston of cylinder 430 in a downward stroke direction. In order for the piston to move in a downward stroke direction, however, fluid residing beneath the piston must be allowed to exit. Accordingly, fluid may exit through valve V4 which is in fluid connection with the lower portion of cylinder 430. Valve V4 is in an open state such that it allows fluid exiting from the lower portion of cylinder 430 to return to pump 405 via return line 309. Notably, valve V2 is in a closed state, thereby preventing pressurized fluid supplied to the upper portion of cylinder 430 from returning to return line 309. Similarly, valve V3 is in a closed state, thereby preventing pressurized fluid distributed from supply 308 to enter the lower cavity of cylinder 430.

Turning now to FIG. 37B, the stroke direction of the piston in cylinder 430 is reversed from the FIG. 37A illustration. To do so, valves V1 and V4 may be actuated to a closed state in response to a command issued by the implement integration module 315. Simultaneously, valves V2 and V3 may be transitioned to an open state. Consequently, pressurized flow from supply 308 may be provided to the lower portion of cylinder 430 via valve V3 and fluid residing in the upper portion of cylinder 430 returned to the return line 309 via valve V2. Valves V1 and V4 may remain in a closed state while valves V2 and V3 are open, thereby allowed the motive force from the pressurized hydraulic fluid to stroke the cylinder 430 in an upward direction.

In the FIG. 37C illustration, all valves V1-V4 have been actuated to a closed state. With all four valves closed, no hydraulic flow is allowed into or out of cylinder 430, thereby locking the position of the piston in place. Notably, even though valves V1-V4 are in closed states, the hydraulic fluid flow generated by pump 405 may continue to flow through valve bank 310 and circulate back to pump 405.

Figure 38A:
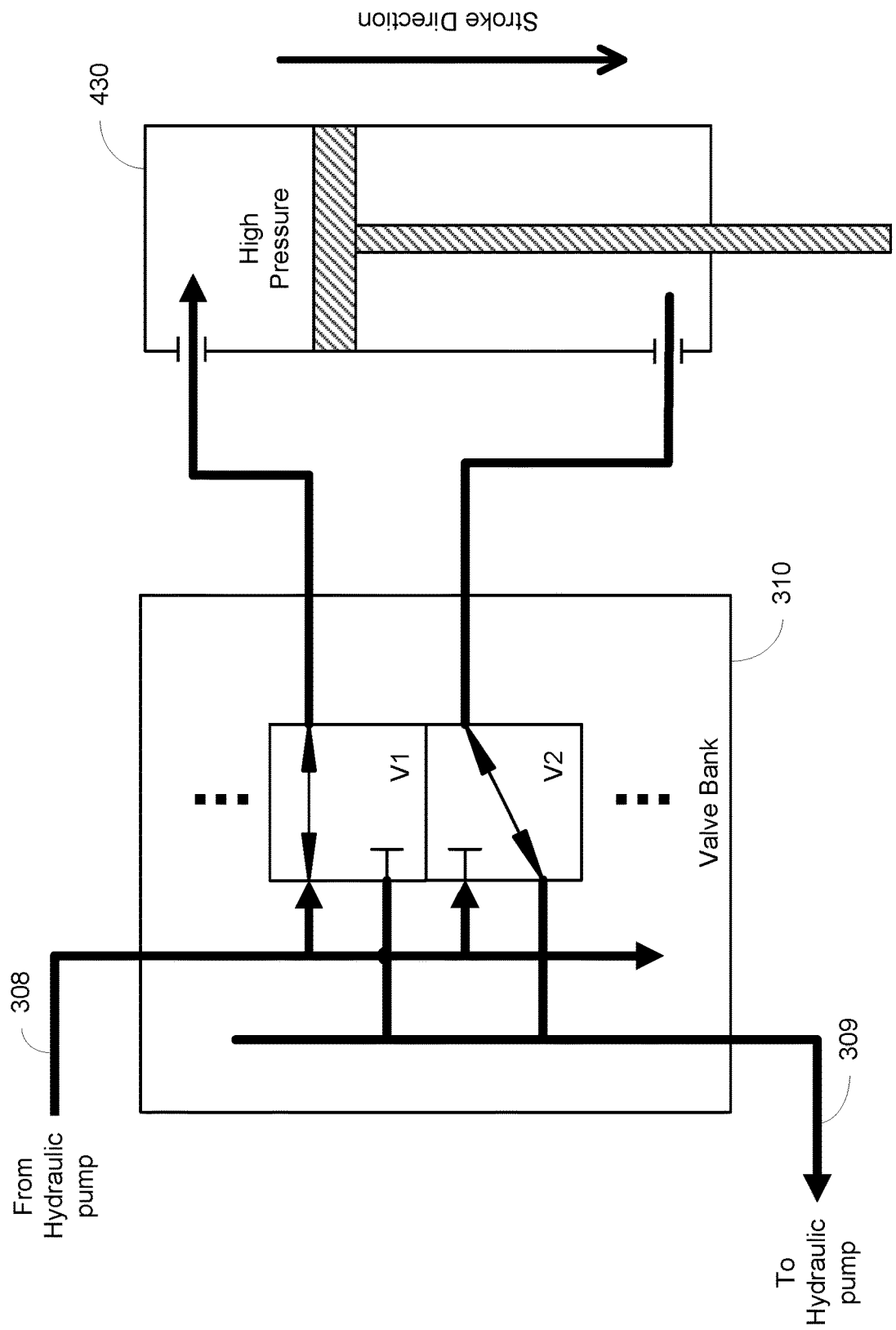
FIGS. 38A-38C illustrate an exemplary portion of a valve bank arrangement utilizing three-way valves to actuate a hydraulic cylinder with a continuous hydraulic flow through the valve bank.
Figure 38B:
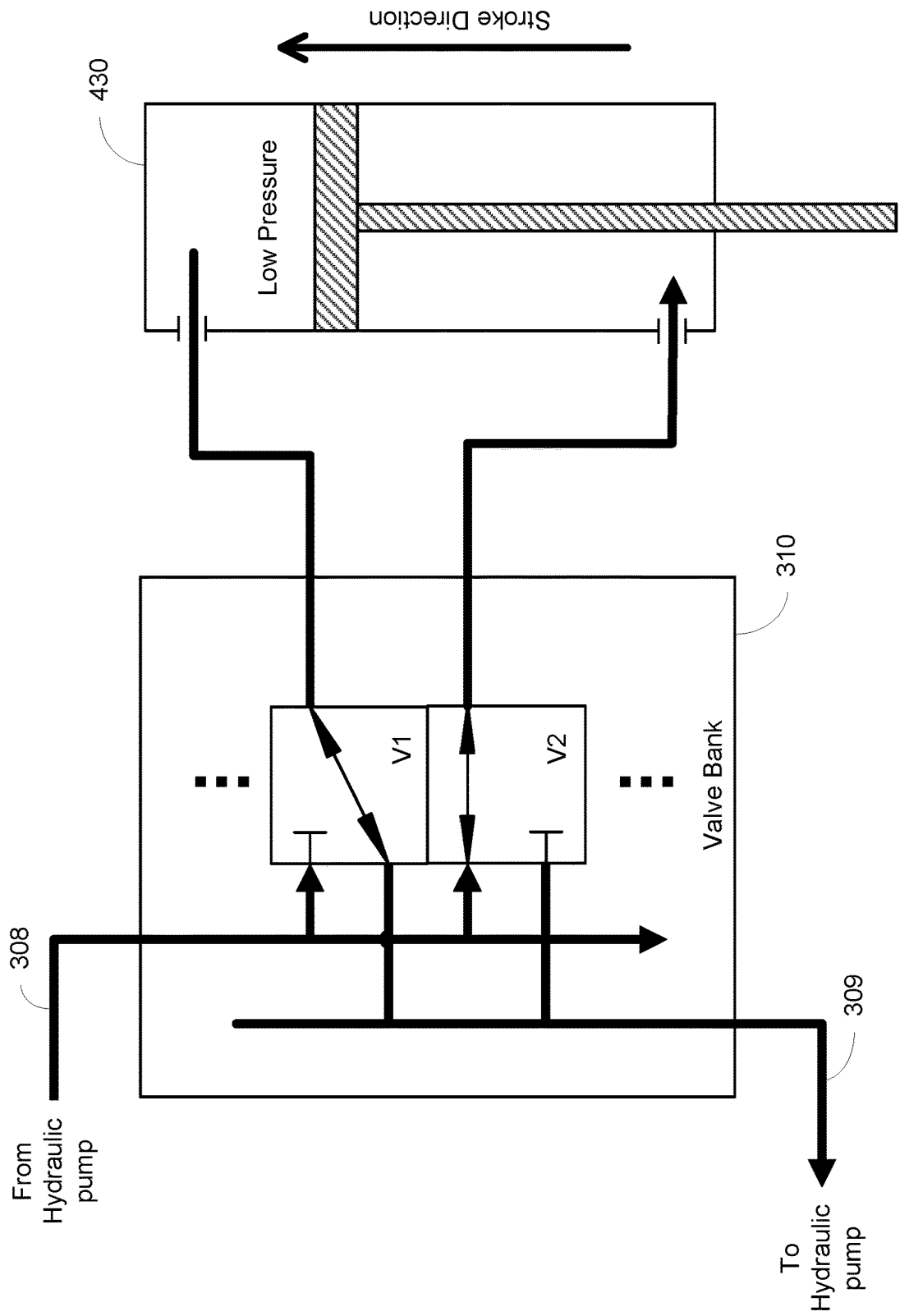
Figure 38C:
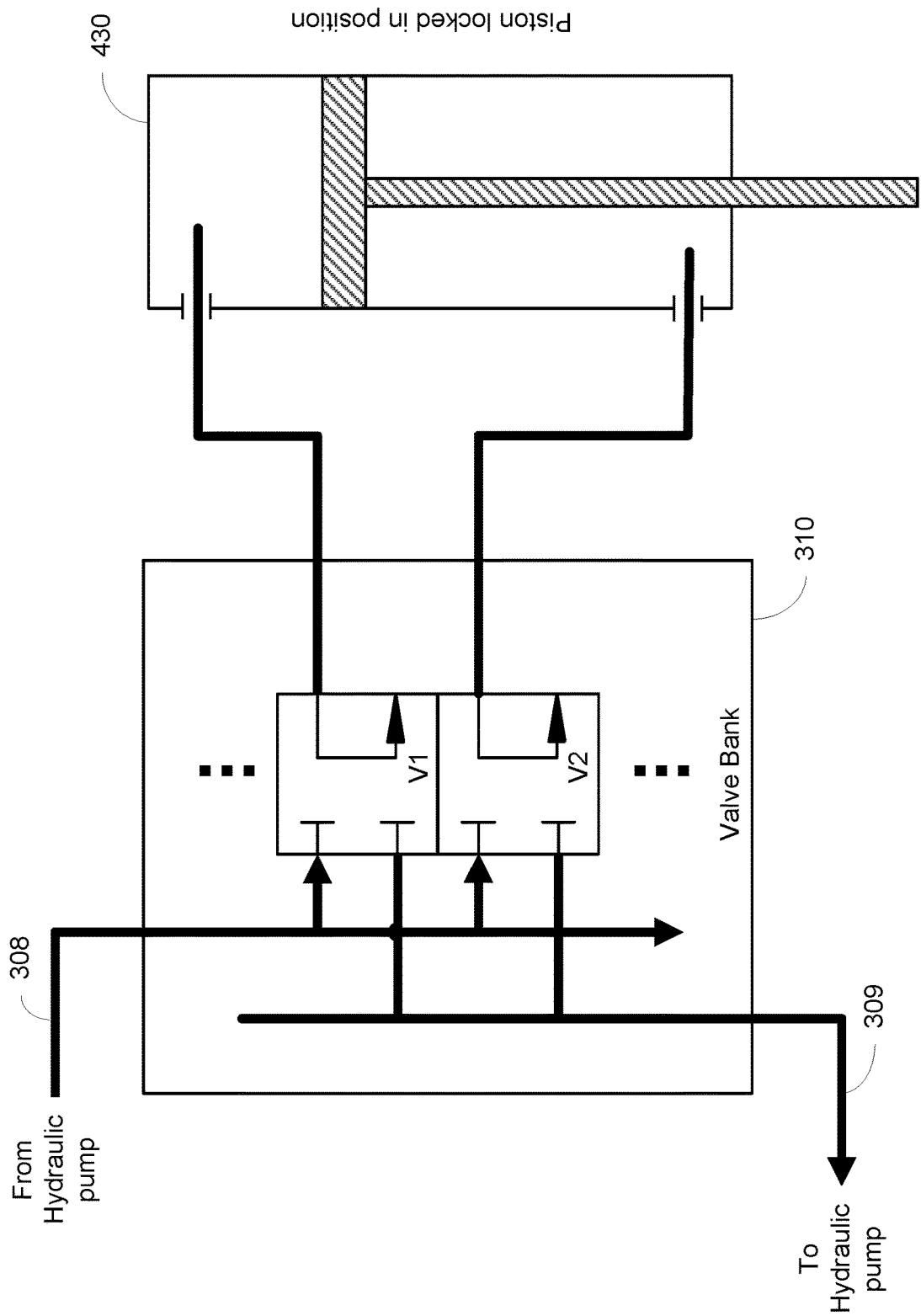

FIGS. 38A-38C illustrate an exemplary portion of a valve bank arrangement utilizing three-way valves to actuate a hydraulic cylinder 430 with a continuous hydraulic flow through the valve bank 310. As previously shown and described, a pressurized hydraulic flow 308 from pump 405 enters valve bank 310, is distributed to components of implement 400, and returns back through valve bank 310 to pump 405 via return flow 309. In the illustration, hydraulic cylinder 430 may reside in association with an implement 400.

As can be understood from the FIG. 38A illustration, the pressurized supply 308 enters valve bank 310 and is distributed to, inter alia, valves V1 and V2. The downstream sides of valves V1 and V2 are in fluid connection to the upper and lower portions, respectively, of cylinder 430. Valve V1 is in a first open state that allows pressurized fluid from supply 308 to enter the upper portion of cylinder 430, thereby providing a motive force to move the piston of cylinder 430 in a downward stroke direction. In order for the piston to move in a downward stroke direction, however, fluid residing beneath the piston must be allowed to exit. Accordingly, fluid may exit through valve V2 which is in fluid connection with the lower portion of cylinder 430. Valve V2 is also in a first open state such that it allows fluid exiting from the lower portion of cylinder 430 to return to pump 405 via return line 309.

Turning now to FIG. 38B, the stroke direction of the piston in cylinder 430 is reversed from the FIG. 38A illustration. To do so, valves V1 and V2 may be actuated to their respected second open states in response to a command issued by the implement integration module 315. Consequently, pressurized flow from supply 308 may be provided to the lower portion of cylinder 430 via valve V2 and fluid residing in the upper portion of cylinder 430 returned to the return line 309 via valve V1. In this way, the motive force from the pressurized hydraulic fluid strokes the cylinder 430 in an upward direction.

In the FIG. 38C illustration, both valves V1 and V2 have been actuated to a closed state. With both valves closed, no hydraulic flow is allowed into or out of cylinder 430, thereby locking the position of the piston in place. Notably, even though valves V1 and V2 are in closed states, the hydraulic fluid flow generated by pump 405 may continue to flow through valve bank 310 and circulate back to pump 405.

Figure 39A:
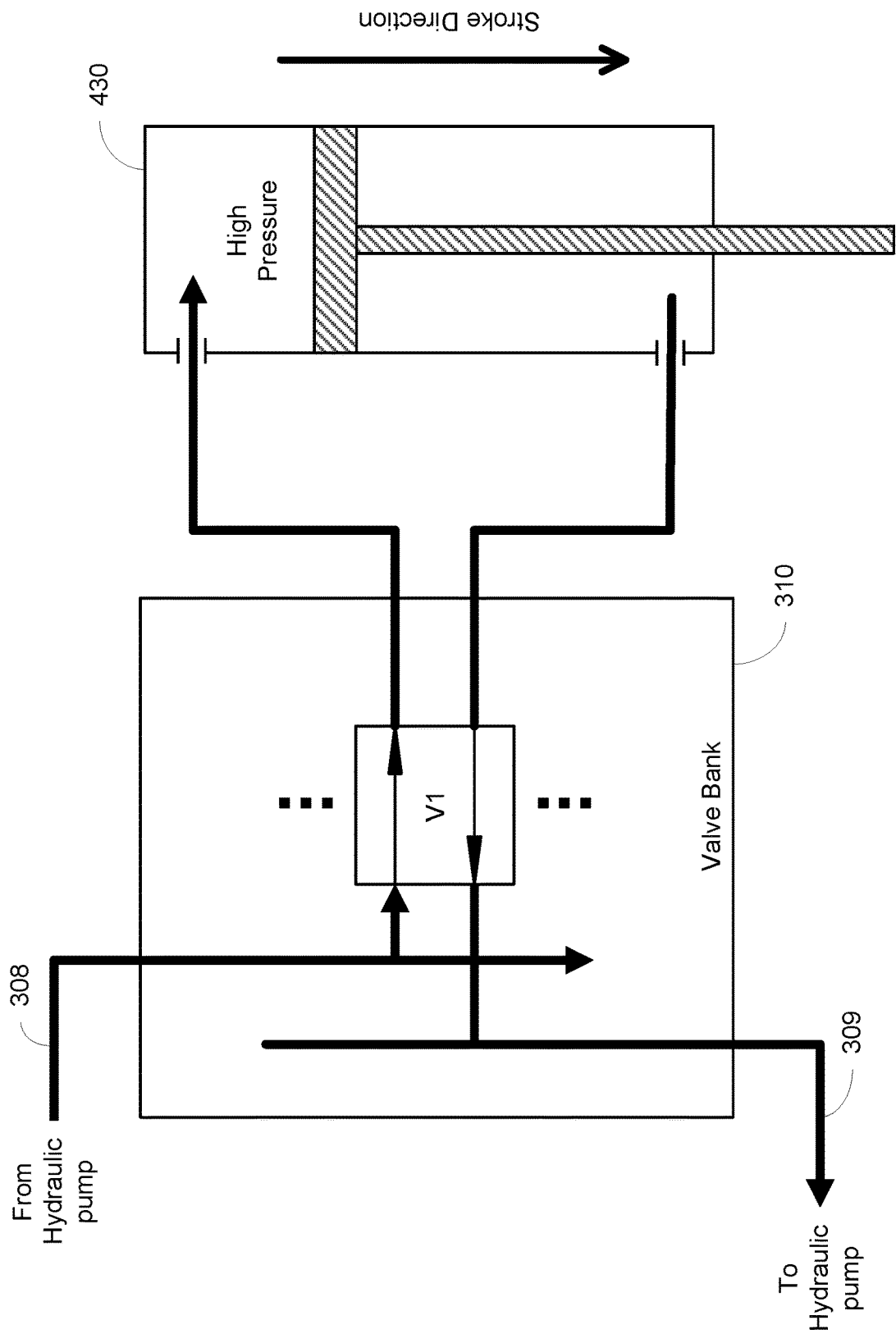
FIGS. 39A-39C illustrate an exemplary portion of a valve bank arrangement utilizing a four-way valve to actuate a hydraulic cylinder with a continuous hydraulic flow through the valve bank.
Figure 39B:
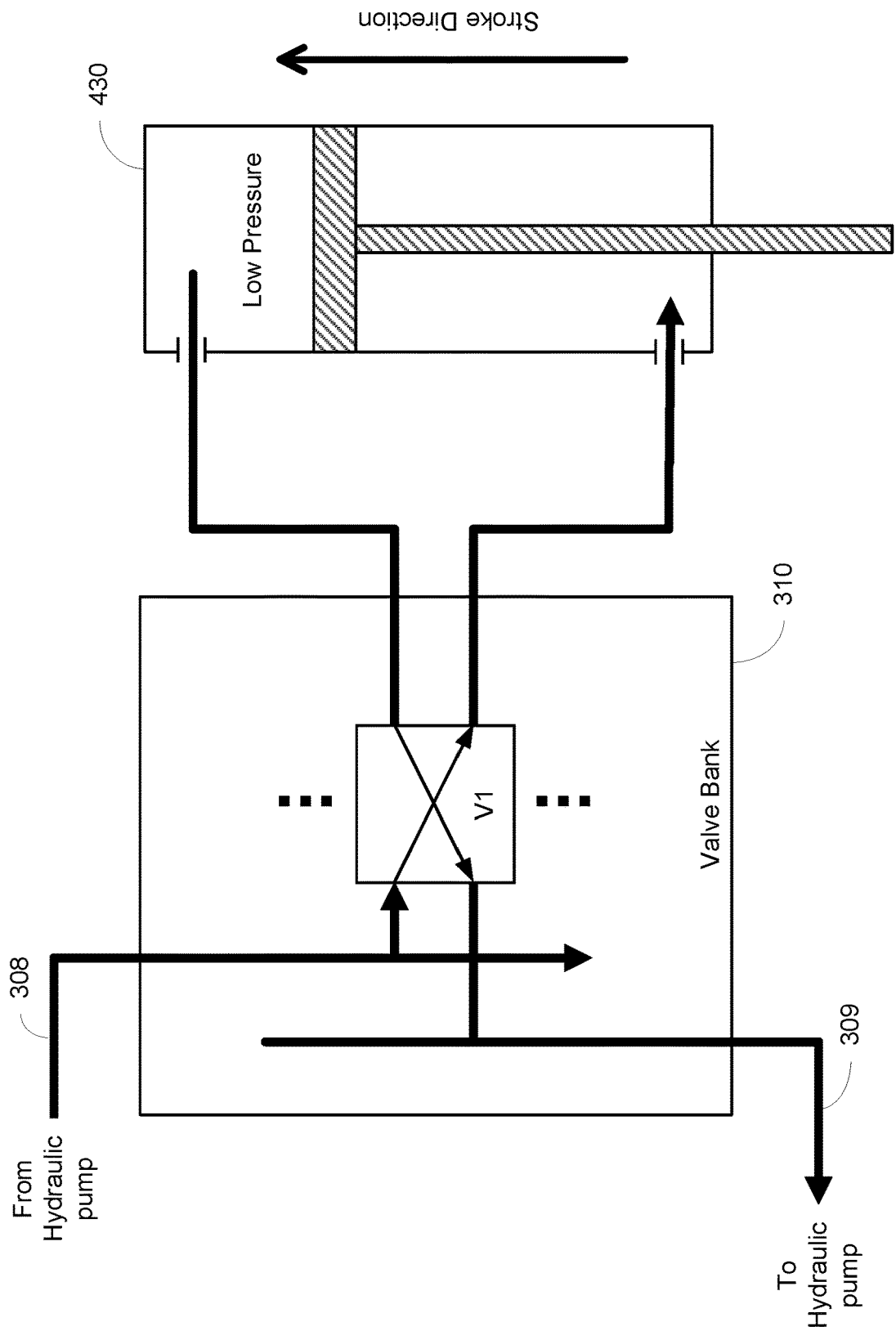
Figure 39C:
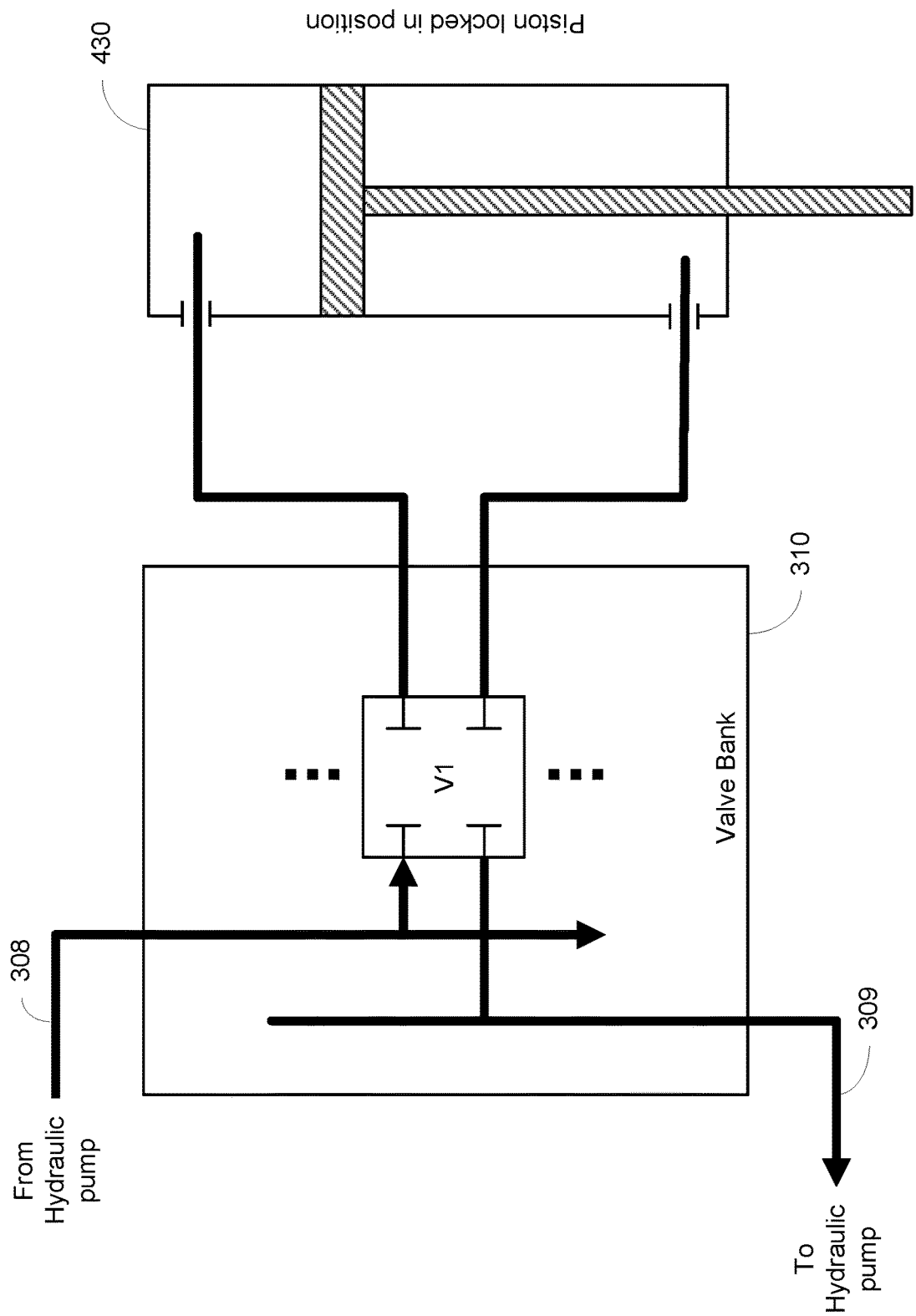

FIGS. 39A-39C illustrate an exemplary portion of a valve bank 310 arrangement utilizing a four-way valve to actuate a hydraulic cylinder 430 with a continuous hydraulic flow through the valve bank 310. As previously shown and described, a pressurized hydraulic flow 308 from pump 405 enters valve bank 310, is distributed to components of implement 400, and returns back through valve bank 310 to pump 405 via return flow 309. In the illustration, hydraulic cylinder 430 may reside in association with an implement 400.

As can be understood from the FIG. 39A illustration, the pressurized supply 308 enters valve bank 310 and is distributed to, inter alia, valve V1. The downstream side of valve V1 is in fluid connection to the upper and lower portions of cylinder 430. Valve V1 is in a first open state that allows pressurized fluid from supply 308 to enter the upper portion of cylinder 430, thereby providing a motive force to move the piston of cylinder 430 in a downward stroke direction. In order for the piston to move in a downward stroke direction, however, fluid residing beneath the piston must be allowed to exit. Accordingly, fluid may also exit from the lower portion of cylinder 430 through valve V1 to return line 309 when valve V1 is in the first open state.

Turning now to FIG. 39B, the stroke direction of the piston in cylinder 430 is reversed from the FIG. 39A illustration. To do so, valve V1 may be actuated to a second open state in response to a command issued by the implement integration module 315. Consequently, pressurized flow from supply 308 may be provided to the lower portion of cylinder 430 and fluid residing in the upper portion of cylinder 430 returned to the return line 309. In this way, the motive force from the pressurized hydraulic fluid strokes the cylinder 430 in an upward direction.

In the FIG. 39C illustration, valve V1 been actuated to a closed state. With all ports of valve V1 closed, no hydraulic flow is allowed into or out of cylinder 430, thereby locking the position of the piston in place. Notably, even though valve V1 is in a closed state, the hydraulic fluid flow generated by pump 405 may continue to flow through valve bank 310 and circulate back to pump 405.

Figure 40A:
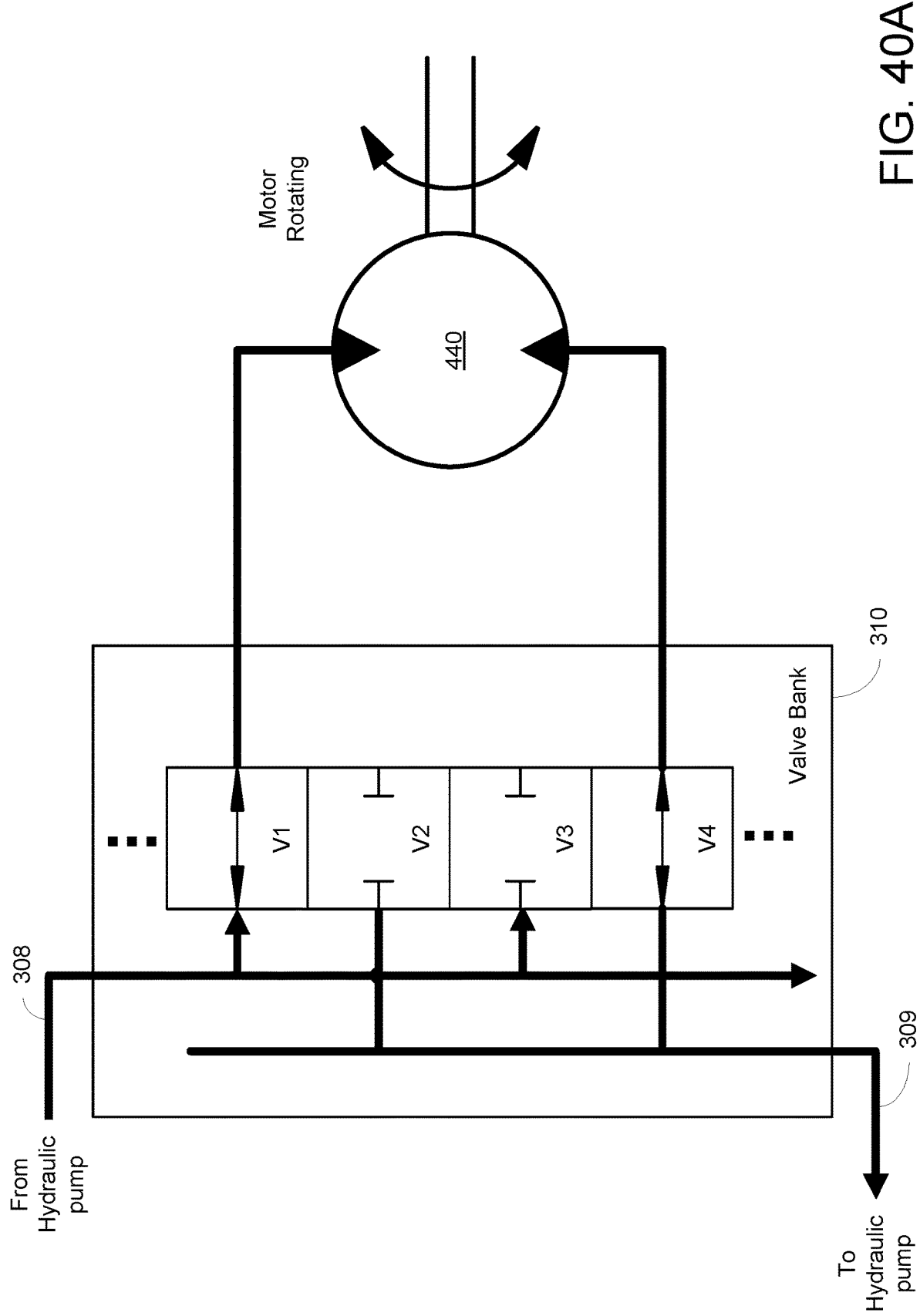
FIGS. 40A-40B illustrate an exemplary portion of a valve bank arrangement utilizing two-way valves to actuate a hydraulic motor with a continuous hydraulic flow through the valve bank.
Figure 40B:
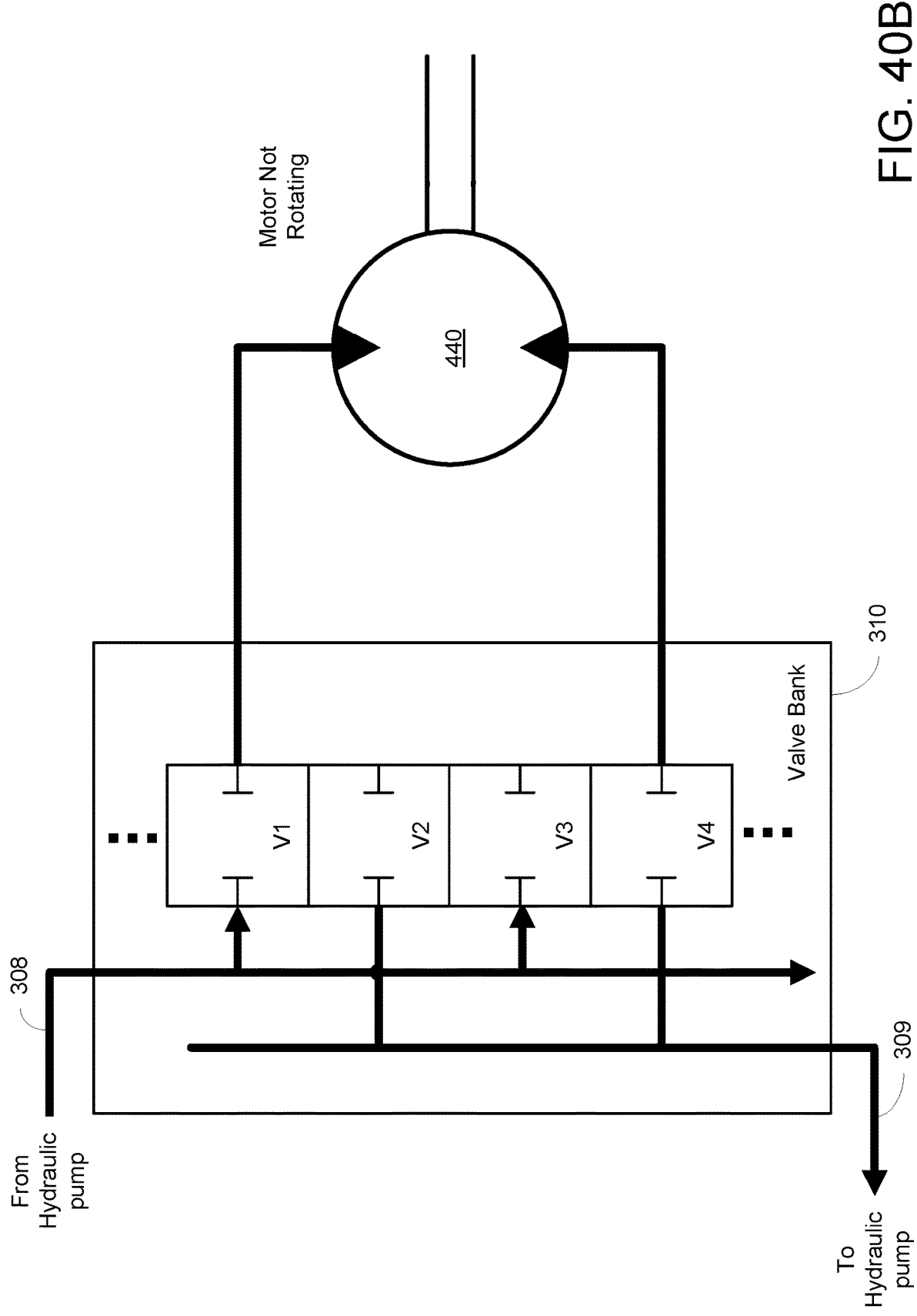

FIGS. 40A-40B illustrate an exemplary portion of a valve bank 310 arrangement utilizing two-way valves to actuate a hydraulic motor 440 with a continuous hydraulic flow through the valve bank 310. As previously shown and described, a pressurized hydraulic flow 308 from pump 405 enters valve bank 310, is distributed to components of implement 400, and returns back through valve bank 310 to pump 405 via return flow 309. In the illustration, hydraulic cylinder 430 may reside in association with an implement 400.

As can be understood from the FIG. 40A illustration, valves V1 and V4 are being used to control hydraulic flow to and through motor 440. Valves V2 and V3 may be available for other component functions. The pressurized hydraulic fluid is supplied from line 308 to motor 440 through valve V1 which is in an open state. The hydraulic fluid provides a motive force to motor 440 in order to rotate a shaft, as would be understood by one of ordinary skill in the art. A motor such as 440 may be used to rotate an auger, for example, such as may be comprised in a concrete screed implement. The hydraulic fluid exits motor 440 and returns to return line 309 through valve V4 which is also in an open state.

Notably, in the current valve arrangement, the direction of rotation for motor 440 may fixed since a reverse flow to motor 440 could not be provided through valve V4. It is envisioned, however, that the speed of rotation for motor 440 may be varied by the implement integration module 315 through varying the speed of pump 405 and/or modulating valve V1 and/or valve V4.

In the FIG. 40B illustration, both valves V1 and V4 have been transitioned to closed states. Consequently, no hydraulic flow can be provided to motor 440 and so motor 440 may not rotate. Notably, even though valves V1 and V4 are in closed states, the hydraulic fluid flow generated by pump 405 may continue to flow through valve bank 310 and circulate back to pump 405.

Figure 41A:
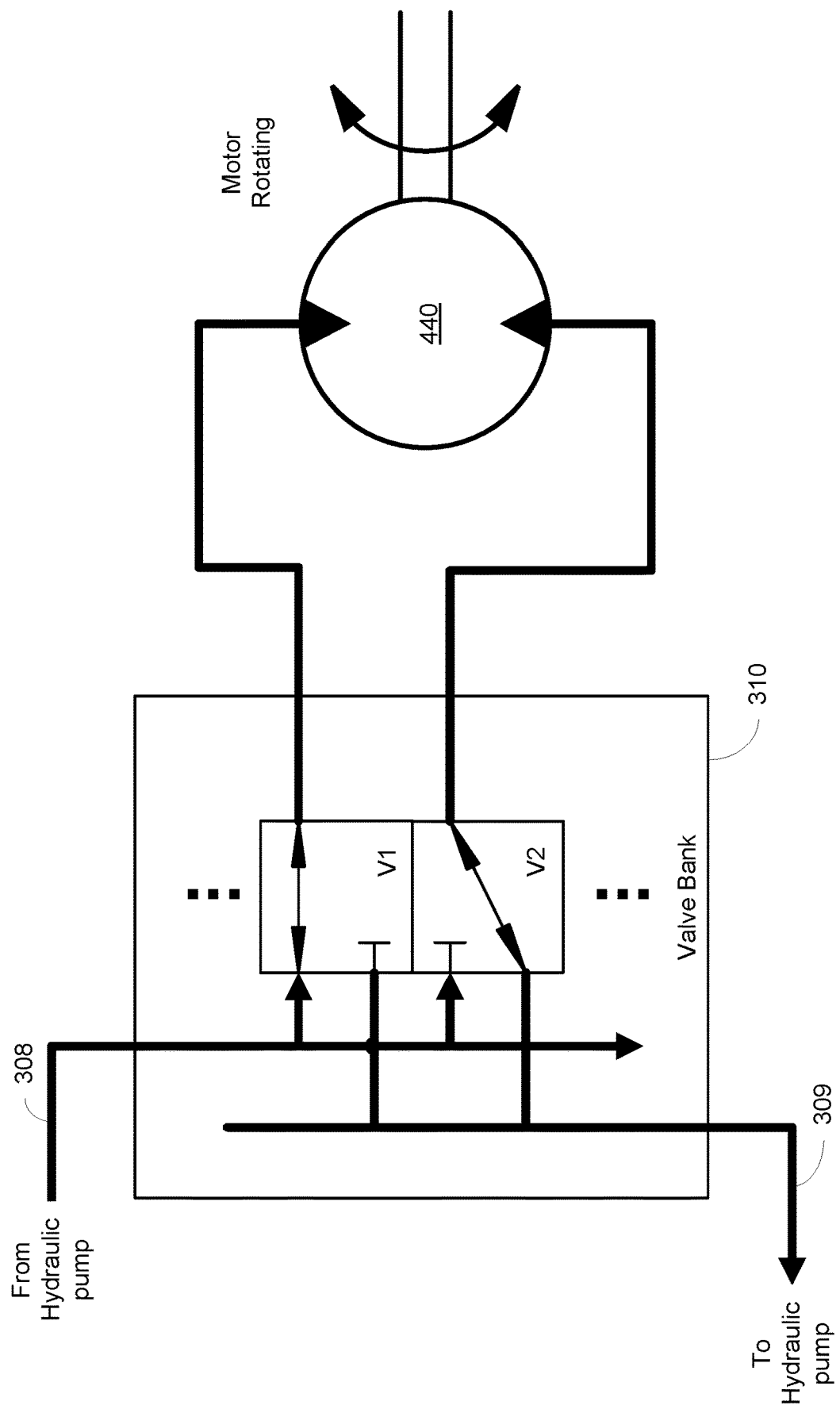
FIGS. 41A-41B illustrate an exemplary portion of a valve bank arrangement utilizing three-way valves to actuate a hydraulic motor with a continuous hydraulic flow through the valve bank.
Figure 41B:
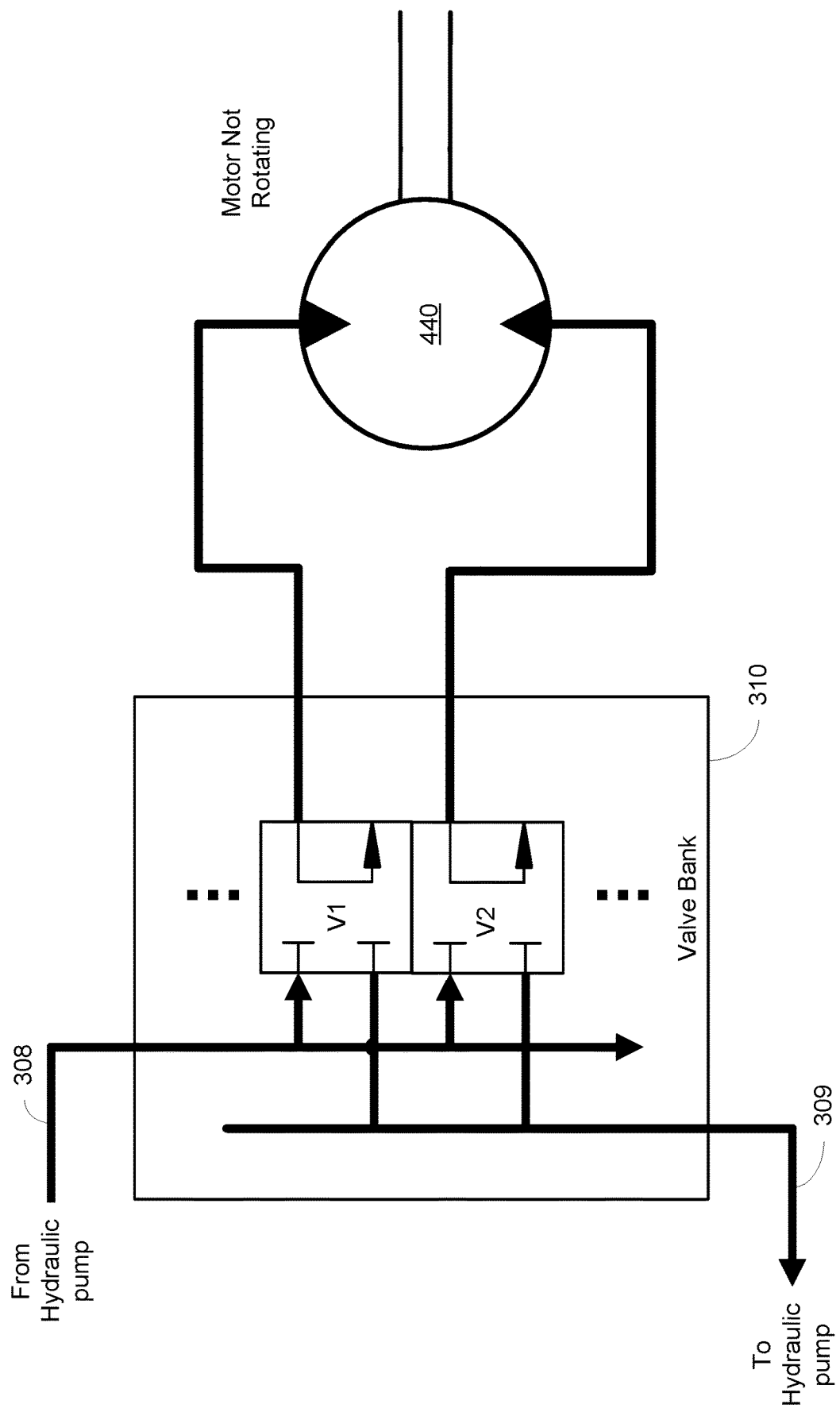

FIGS. 41A-41B illustrate an exemplary portion of a valve bank arrangement utilizing three-way valves to actuate a hydraulic motor 440 with a continuous hydraulic flow through the valve bank 310. As previously shown and described, a pressurized hydraulic flow 308 from pump 405 enters valve bank 310, is distributed to components of implement 400, and returns back through valve bank 310 to pump 405 via return flow 309. In the illustration, hydraulic cylinder 430 may reside in association with an implement 400.

As can be understood from the FIG. 41A illustration, valves V1 and V2 are being used to control hydraulic flow to and through motor 440. The pressurized hydraulic fluid is supplied from line 308 to motor 440 through valve V1 which is in a first open state. The hydraulic fluid provides a motive force to motor 440 in order to rotate a shaft, as would be understood by one of ordinary skill in the art. A motor such as 440 may be used to rotate an auger, for example, such as may be comprised in a concrete screed implement. The hydraulic fluid exits motor 440 and returns to return line 309 through valve V2 which is also in a first open state.

It can be understood that both valves V1 and V2 could be transitioned to their second open states which would cause the pressurized fluid from supply 308 to be delivered to the opposite side of motor 440 via valve V2. Valve V1, in its second open state would allow for fluid exiting from motor 440 to enter return line 309. In this way, with both valves V1 and V2 in their first open states (as shown in the FIG. 41A illustration) may provide for the motor 440 to rotate a shaft in a first direction and, when both valves V1 and V2 are in their second open states (not shown in the illustration), the motor 440 may rotate its shaft in an opposite direction.

The ability to reverse the direction of rotation of motor 440 may be advantageous for certain implements 400 that employ hydraulic motor(s) 440. Moreover, it is envisioned that the speed of rotation for motor 440 may be varied by the implement integration module 315 through varying the speed of pump 405 and/or modulating valve V1 and/or valve V2 when in their open states.

In the FIG. 41B illustration, both valves V1 and V2 have been transitioned to closed states. Consequently, no hydraulic flow can be provided to motor 440 and so motor 440 may not rotate. Notably, even though valves V1 and V2 are in closed states, the hydraulic fluid flow generated by pump 405 may continue to flow through valve bank 310 and circulate back to pump 405.

Figure 42A:
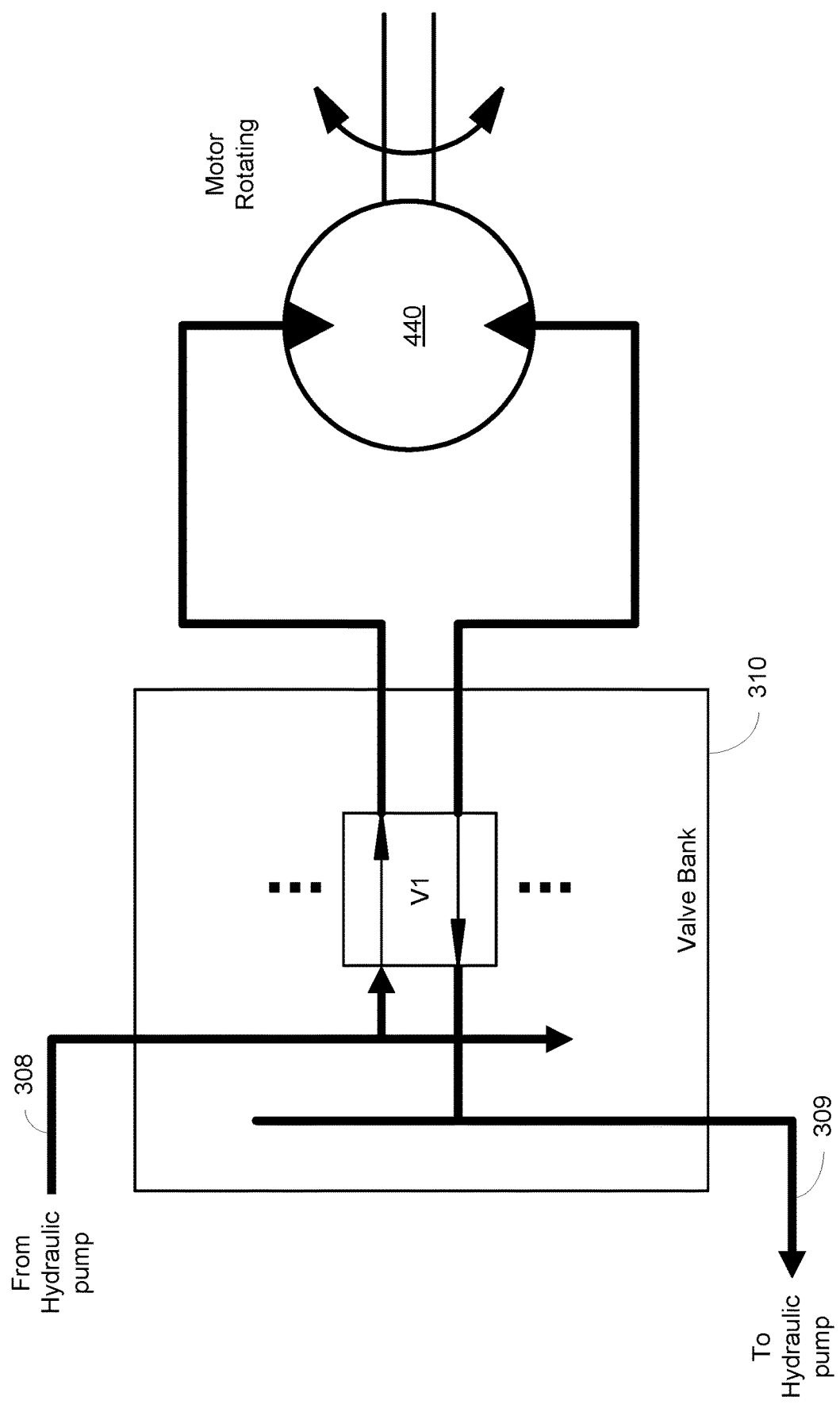
FIGS. 42A-42B illustrate an exemplary portion of a valve bank arrangement utilizing a four-way valve to actuate a hydraulic motor with a continuous hydraulic flow through the valve bank.
Figure 42B:
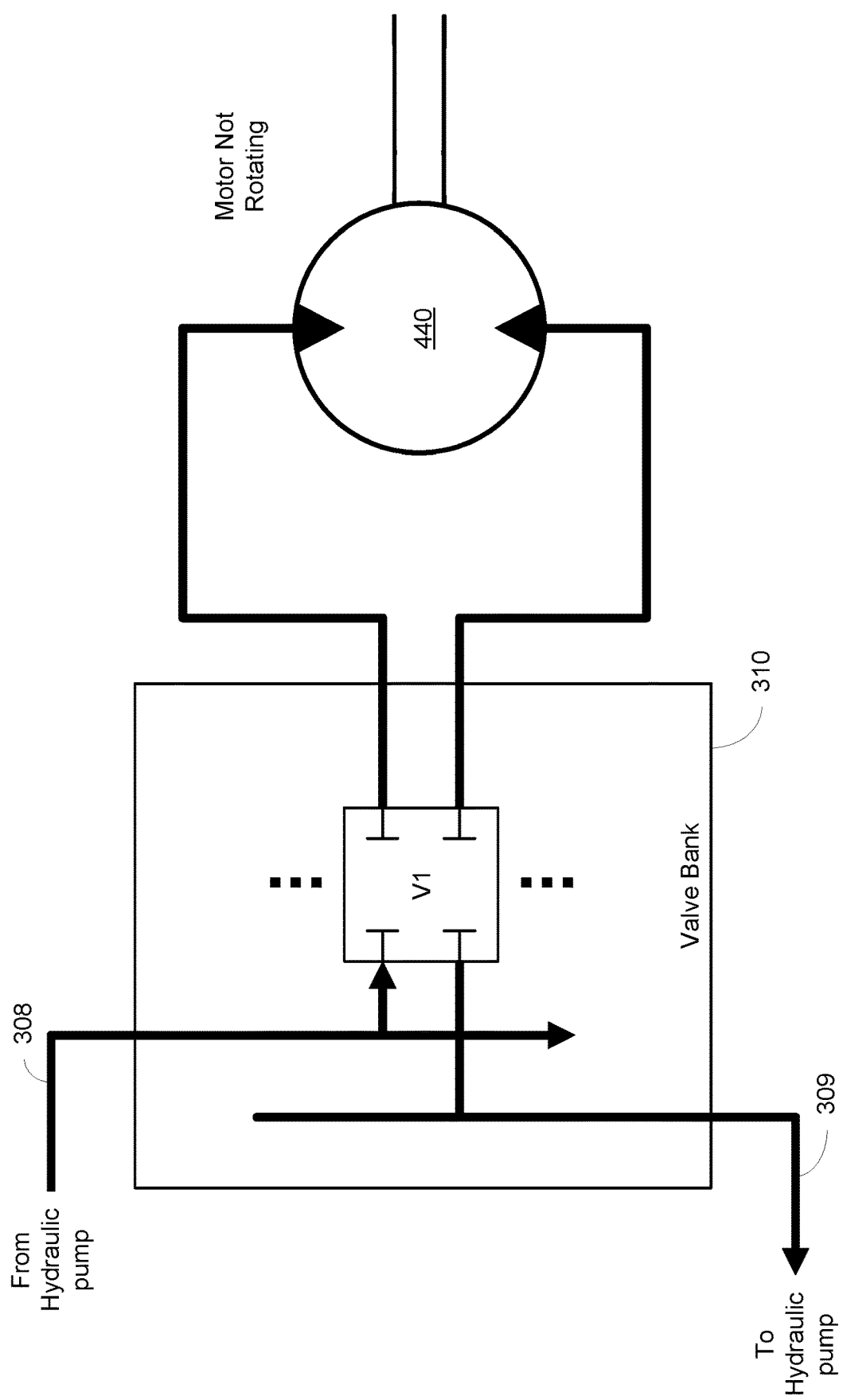

FIGS. 42A-42B illustrate an exemplary portion of a valve bank arrangement utilizing a four-way valve to actuate a hydraulic motor 440 with a continuous hydraulic flow through the valve bank 310. As previously shown and described, a pressurized hydraulic flow 308 from pump 405 enters valve bank 310, is distributed to components of implement 400, and returns back through valve bank 310 to pump 405 via return flow 309. In the illustration, hydraulic cylinder 430 may reside in association with an implement 400.

As can be understood from the FIG. 42A illustration, valve V1 is being used to control hydraulic flow to and through motor 440. The pressurized hydraulic fluid is supplied from line 308 to motor 440 through valve V1 which is in a first open state. The hydraulic fluid provides a motive force to motor 440 in order to rotate a shaft, as would be understood by one of ordinary skill in the art. A motor such as 440 may be used to rotate an auger, for example, such as may be comprised in a concrete screed implement. The hydraulic fluid exits motor 440 and returns to return line 309 through valve V1.

It can be understood that valve V1 could be transitioned to a second open state which would reverse the ports of valve V1 and cause the pressurized fluid from supply 308 to be delivered to the opposite side of motor 440. Valve V1, in its second open state would allow for fluid exiting from motor 440 to enter return line 309. In this way, depending on the particular open state of four-way valve V1, the direction of rotation for motor 440 may be reversible.

The ability to reverse the direction of rotation of motor 440 may be advantageous for certain implements 400 that employ hydraulic motor(s) 440. Moreover, it is envisioned that the speed of rotation for motor 440 may be varied by the implement integration module 315 through varying the speed of pump 405 and/or modulating valve V1 in its open states.

In the FIG. 42B illustration, valve V1 has been transitioned to a closed state. Consequently, no hydraulic flow can be provided to motor 440 and so motor 440 may not rotate. Notably, even though valve V1 is in a closed state, the hydraulic fluid flow generated by pump 405 may continue to flow through valve bank 310 and circulate back to pump 405.

Systems, devices and methods for a multifunctional, intelligent telescoping boom have been described using detailed descriptions of embodiments thereof that are provided by way of example and are not intended to limit the scope of the disclosure. The described embodiments comprise different features, not all of which are required in all embodiments of a multifunctional, intelligent telescoping boom. Some embodiments of a multifunctional, intelligent telescoping boom utilize only some of the features or possible combinations of the features. Variations of embodiments of a multifunctional, intelligent telescoping boom that are described and embodiments of a multifunctional, intelligent telescoping boom comprising different combinations of features noted in the described embodiments will occur to persons of the art.

It will be appreciated by persons skilled in the art that systems, devices and methods for the provision of a multifunctional, intelligent telescoping boom is not limited by what has been particularly shown and described herein above. Rather, the scope of systems, devices and methods for the provision of a multifunctional, intelligent telescoping boom is defined by the claims that follow.

What is claimed is:

1. A multifunction, intelligent telescoping boom system, the system comprising:
a telescoping boom comprising a base stage mechanically connected to a heavy equipment and an end stage, wherein:
the end stage is configured to interchangeably receive any one of a plurality of implements;
each of the plurality of implements comprises one or more hydraulically driven components;
at least one of the plurality of implements comprises the hydraulically driven component in the form of a hydraulic motor; and
at least one of the plurality of implements comprises the hydraulically driven component in the form of a hydraulic cylinder;
a valve bank positioned on the end stage, wherein the valve bank is comprised of a plurality of hydraulic valves;
a hydraulic circuit comprised of a hydraulic pump and the valve bank, wherein a hydraulic supply line connects an output of the hydraulic pump with an input of the valve bank and a hydraulic return line connects an output of the valve bank with an input of the hydraulic pump;
wherein a first portion of a pressurized hydraulic flow entering the valve bank from the hydraulic pump via the hydraulic supply line is distributed to and through one or more of the plurality of hydraulic valves before returning to the hydraulic pump via the hydraulic return line and a second portion of the pressurized hydraulic flow entering the valve bank from the hydraulic pump via the hydraulic supply line returns to the hydraulic pump via the hydraulic return line without passing through any of the plurality of hydraulic valves;
an implement integration module positioned on the end stage and operable to designate one or more of the plurality of hydraulic valves for controlling hydraulic flow to the one or more hydraulically driven components of the received implement, wherein the implement integration module comprises a computer chip and a memory component and is in electrical communication with the one or more of the plurality of hydraulic valves of the valve bank and with one or more electrical components associated with the received implement; and
an implement controller that is physically local to the given implement and that includes one or more operator-controlled actuators and one or more operator-viewable monitors, wherein the implement integration module is further in electrical communication with the implement controller and operable to associate the one or more operator-controlled actuators and the one or more operator-viewable monitors with the designated one or more plurality of hydraulic valves for controlling the hydraulic flow to the one or more hydraulically driven components of the received implement and with the one or more electrical components associated with the received implement.

2. The system of claim 1, further comprising a power unit controller that includes one or more operator-controlled actuators and one or more operator-viewable monitors, wherein the implement integration module is further in electrical communication with the power unit controller and operable to associate the one or more operator-controlled actuators and the one or more operator-viewable monitors with the designated one or more plurality of hydraulic valves for controlling the hydraulic flow to the one or more hydraulically driven components of the received implement and with the one or more electrical components associated with the received implement.

3. The system of claim 1, wherein the hydraulic pump is a variable speed positive displacement pump and the implement integration module is in electrical communication with the variable speed positive displacement pump such that the speed of the pump may be varied according to electrical commands issued by the implement integration module.

4. The system of claim 1, wherein one or more of the designated one or more plurality of valves is operable to modulate and the implement integration module is configured to control the amount of modulation.

5. The system of claim 1, wherein the one or more electrical components comprises one or more of a light, a pressure sensor, an infrared sensor, a laser sensor, a temperature sensor, a strain gauge, a weight scale, an electrical motor, a vibrator, an electrical actuator, and a solenoid.

6. The system of claim 1, wherein the plurality of hydraulic valves comprises at least one two port valve.

7. The system of claim 1, wherein the plurality of hydraulic valves comprises at least one three port valve.

8. The system of claim 1, wherein the plurality of hydraulic valves comprises at least one four port valve.

9. The system of claim 1, wherein the plurality of hydraulic valves comprises at least one five port valve.

10. The system of claim 1, wherein the plurality of implements comprises one or more of a backhoe, a front end loader, an excavator, a skidsteer, a feller buncher, a screed, a laser grader, a bucket, a mower, a forklift, and a man basket.

* * * * *